(12) United States Patent
Wengreen et al.

(10) Patent No.: US 10,832,569 B2
(45) Date of Patent: Nov. 10, 2020

(54) VEHICLE DETECTION SYSTEMS

(71) Applicant: DRIVENT LLC, Bellevue, WA (US)

(72) Inventors: Eric John Wengreen, Sammamish, WA (US); Wesley Edward Schwie, Minneapolis, MN (US)

(73) Assignee: Drivent LLC, Bellevue, WA (US)

( * ) Notice: Subject to any disclaimer, the term of this patent is extended or adjusted under 35 U.S.C. 154(b) by 0 days.

(21) Appl. No.: 16/673,560

(22) Filed: Nov. 4, 2019

(65) Prior Publication Data
US 2020/0320864 A1 Oct. 8, 2020

Related U.S. Application Data

(63) Continuation-in-part of application No. 16/373,474, filed on Apr. 2, 2019, now Pat. No. 10,474,154, and a continuation-in-part of application No. 16/372,915, filed on Apr. 2, 2019, now Pat. No. 10,481,606.

(51) Int. Cl.
| | |
|---|---|
| *G01C 22/00* | (2006.01) |
| *G05D 1/00* | (2006.01) |
| *G08G 1/01* | (2006.01) |
| *G01S 13/58* | (2006.01) |
| *G08G 1/16* | (2006.01) |
| *G08G 1/017* | (2006.01) |
| *G08G 1/052* | (2006.01) |
| *G01S 17/58* | (2006.01) |

(52) U.S. Cl.
CPC ............ *G08G 1/0129* (2013.01); *G01S 13/58* (2013.01); *G01S 17/58* (2013.01); *G08G 1/0175* (2013.01); *G08G 1/052* (2013.01); *G08G 1/162* (2013.01)

(58) Field of Classification Search
CPC .... G08G 1/0129; G08G 1/0175; G08G 1/052; G08G 1/162; G01S 13/58; G01S 17/58
USPC .......................................................... 701/26
See application file for complete search history.

(56) References Cited

U.S. PATENT DOCUMENTS

| | | | |
|---|---|---|---|
| 4,212,069 A | 7/1980 | Baumann | |
| 5,769,471 A | 6/1998 | Suzuki | |
| 5,798,695 A | 8/1998 | Metalis | |
| 5,871,063 A | 2/1999 | Young | |
| 5,945,919 A | 8/1999 | Trask | |
| 5,960,523 A | 10/1999 | Husby | |
| 5,986,420 A | 11/1999 | Kato | |
| 6,011,478 A | 1/2000 | Suzuki | |
| 6,081,088 A | 6/2000 | Ishihara | |
| 6,530,251 B1 | 3/2003 | Dimig | |
| 6,894,606 B2 | 5/2005 | Forbes | |

(Continued)

FOREIGN PATENT DOCUMENTS

KR 20090094569 A 9/2009

OTHER PUBLICATIONS

Marijuana, Alcohol, and Actual Driving Performance—Downloaded on May 25, 2019 from https://rosap.ntl.bts.gov/view/dot/1649/dot_1649_DS1.pdf.

(Continued)

*Primary Examiner* — Mahmoud S Ismail

(57) ABSTRACT

A vehicle monitoring system can include a detection system having a camera, radar, and lidar. The vehicle monitoring system can detect a vehicle, generate numerical position data indicative of a first serpentine path of the vehicle as the vehicle drives on a road, numerically analyze the first numerical position data, and in response, take actions to protect lives.

25 Claims, 15 Drawing Sheets

(56) References Cited

U.S. PATENT DOCUMENTS

| | | |
|---|---|---|
| 7,093,515 B2 | 8/2006 | Yamanoi |
| 7,298,250 B2 | 11/2007 | Inoue |
| 7,413,357 B2 | 8/2008 | Badalian |
| 7,541,943 B2 | 6/2009 | Manor |
| 7,698,078 B2 | 4/2010 | Kelty |
| 7,777,619 B2 | 8/2010 | Yopp |
| 7,891,456 B2 | 2/2011 | Takahashi |
| 7,999,701 B1 | 8/2011 | Xu |
| 8,078,359 B2 | 12/2011 | Small |
| 8,180,379 B2 | 5/2012 | Forstall |
| 8,255,124 B2 | 8/2012 | Van Houtan |
| 8,325,025 B2 | 12/2012 | Morgan |
| 8,433,934 B1 | 4/2013 | On |
| 8,634,980 B1 | 1/2014 | Urmson |
| 8,686,844 B1 | 4/2014 | Wine |
| 8,700,251 B1 | 4/2014 | Zhu |
| 8,818,608 B2 | 8/2014 | Cullinane |
| 8,849,494 B1 | 9/2014 | Herbach |
| 8,874,305 B2 | 10/2014 | Dolgov |
| 8,948,993 B2 | 2/2015 | Schulman |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,019,107 B2 | 4/2015 | Biondo |
| 9,026,300 B2 | 5/2015 | Ferguson |
| 9,119,038 B2 | 8/2015 | Woods |
| 9,120,484 B1 | 9/2015 | Ferguson |
| 9,120,485 B1 | 9/2015 | Dolgov |
| 9,139,133 B2 | 9/2015 | Eng |
| 9,194,168 B1 | 11/2015 | Lu |
| 9,262,914 B2 | 2/2016 | Purushothaman |
| 9,272,713 B1 | 3/2016 | Dvoskin |
| 9,290,174 B1 | 3/2016 | Zagorski |
| 9,429,947 B1 | 8/2016 | Wengreen |
| 9,459,622 B2 | 10/2016 | Abhyanker |
| 9,514,623 B1 | 12/2016 | Urrutia |
| 9,527,217 B1 | 12/2016 | Lowy |
| 9,562,785 B1 | 2/2017 | Racah |
| 9,646,326 B2 | 5/2017 | Goralnick |
| 9,646,356 B1 | 5/2017 | Schwie |
| 9,685,058 B2 | 6/2017 | Schmidt |
| 9,701,307 B1 | 7/2017 | Newman |
| 9,733,096 B2 | 8/2017 | Colijn |
| 9,894,484 B1 | 2/2018 | Pao |
| 9,915,949 B2 | 3/2018 | Schwie |
| 9,916,703 B2 | 3/2018 | Levinson |
| 9,953,283 B2 | 4/2018 | Sweeney |
| 9,953,539 B1 | 4/2018 | Gkiotsalitis |
| 10,036,642 B2 | 7/2018 | Ross |
| 10,050,760 B2 | 8/2018 | Ross |
| 10,082,789 B1 | 9/2018 | Szybalski |
| 10,093,324 B1 | 10/2018 | Szybalski |
| 10,115,029 B1 | 10/2018 | Day |
| 10,127,795 B1 | 11/2018 | Hwang |
| 10,176,517 B2 | 1/2019 | Goralnick |
| 10,223,844 B1 | 3/2019 | Schwie |
| 10,240,938 B1 | 3/2019 | Wengreen |
| 10,255,648 B2 | 4/2019 | Wengreen |
| 10,268,192 B1 | 4/2019 | Wengreen |
| 10,274,950 B1 | 4/2019 | Wengreen |
| 10,282,625 B1 | 5/2019 | Wengreen |
| 10,286,908 B1 | 5/2019 | Wengreen |
| 10,289,922 B1 | 5/2019 | Wengreen |
| 10,299,216 B1 | 5/2019 | Wengreen |
| 10,303,181 B1 | 5/2019 | Wengreen |
| 10,377,342 B1 | 8/2019 | Wengreen |
| 10,466,057 B1 | 11/2019 | Schwie |
| 10,471,804 B1 | 11/2019 | Wengreen |
| 10,474,154 B1 | 11/2019 | Wengreen |
| 10,479,319 B1 | 11/2019 | Wengreen |
| 10,481,606 B1 | 11/2019 | Wengreen |
| 10,493,952 B1 | 12/2019 | Schwie |
| 2002/0077876 A1 | 6/2002 | O'Meara |
| 2002/0121291 A1 | 9/2002 | Daum |
| 2003/0195696 A1 | 10/2003 | Jones |
| 2003/0214585 A1 | 11/2003 | Bakewell |
| 2004/0068354 A1 | 4/2004 | Tabe |
| 2004/0076280 A1 | 4/2004 | Ando |
| 2004/0219933 A1 | 11/2004 | Faith |
| 2005/0156726 A1 | 1/2005 | Rubel |
| 2007/0096447 A1 | 5/2007 | Tabe |
| 2007/0132567 A1 | 6/2007 | Schofield |
| 2007/0198144 A1 | 8/2007 | Norris |
| 2008/0030906 A1 | 2/2008 | Sato |
| 2008/0144944 A1 | 6/2008 | Breed |
| 2009/0140886 A1 | 6/2009 | Bender |
| 2009/0287367 A1 | 11/2009 | Salinger |
| 2010/0169199 A1 | 7/2010 | Fuller |
| 2011/0059341 A1 | 3/2011 | Matsumoto |
| 2011/0098017 A1 | 4/2011 | Berry |
| 2011/0267186 A1 | 11/2011 | Rao |
| 2012/0009845 A1 | 1/2012 | Schmelzer |
| 2012/0083960 A1 | 4/2012 | Zhu |
| 2012/0158251 A1 | 8/2012 | Van Houtan |
| 2013/0085817 A1 | 4/2013 | Pinkus |
| 2013/0132140 A1 | 5/2013 | Amin |
| 2013/0138460 A1 | 5/2013 | Schumann, Jr. |
| 2013/0197674 A1 | 8/2013 | Lowry |
| 2013/0231824 A1 | 9/2013 | Wilson |
| 2013/0246301 A1 | 9/2013 | Radhakrishnan |
| 2013/0335213 A1 | 12/2013 | Sherony |
| 2014/0129132 A1 | 5/2014 | Yoshizu |
| 2014/0129951 A1 | 5/2014 | Amin |
| 2014/0172727 A1 | 6/2014 | Abhyanker |
| 2014/0207307 A1* | 7/2014 | Jonsson ............ B60W 50/14 701/1 |
| 2014/0207541 A1 | 7/2014 | Nerayoff |
| 2014/0253314 A1 | 9/2014 | Rambadt |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0046080 A1 | 2/2015 | Wesselius |
| 2015/0066284 A1 | 3/2015 | Yopp |
| 2015/0088421 A1 | 3/2015 | Foster |
| 2015/0120504 A1 | 4/2015 | Todasco |
| 2015/0148077 A1 | 5/2015 | Jelle |
| 2015/0149283 A1 | 5/2015 | Horstemeyer |
| 2015/0185034 A1 | 7/2015 | Abhyanker |
| 2015/0199619 A1 | 7/2015 | Ichinose |
| 2015/0206206 A1 | 7/2015 | Puente |
| 2015/0248689 A1 | 9/2015 | Paul |
| 2015/0271290 A1 | 9/2015 | Tao |
| 2015/0295949 A1 | 10/2015 | Chizeck |
| 2015/0339923 A1 | 11/2015 | Konig |
| 2015/0339928 A1 | 11/2015 | Ramanujam |
| 2015/0346727 A1 | 12/2015 | Ramanujam |
| 2015/0348221 A1 | 12/2015 | Pedersen |
| 2016/0027306 A1 | 1/2016 | Lambert |
| 2016/0027307 A1 | 1/2016 | Abhyanker |
| 2016/0034828 A1 | 2/2016 | Sarawgi |
| 2016/0034845 A1 | 2/2016 | Hiyama |
| 2016/0046261 A1 | 2/2016 | Gulash |
| 2016/0071056 A1 | 3/2016 | Ellison |
| 2016/0092976 A1 | 3/2016 | Marusyk |
| 2016/0116293 A1 | 4/2016 | Grover |
| 2016/0125735 A1 | 5/2016 | Tuukkanen |
| 2016/0140835 A1 | 5/2016 | Smith |
| 2016/0129880 A1 | 6/2016 | Cuddihy |
| 2016/0182170 A1 | 6/2016 | Daoura |
| 2016/0187150 A1 | 6/2016 | Sherman |
| 2016/0209220 A1 | 7/2016 | Laetz |
| 2016/0209843 A1 | 7/2016 | Meuleau |
| 2016/0216130 A1 | 7/2016 | Abramson |
| 2016/0227193 A1 | 8/2016 | Osterwood |
| 2016/0247095 A1 | 8/2016 | Scicluna |
| 2016/0247106 A1 | 8/2016 | Dalloro |
| 2016/0247109 A1 | 8/2016 | Scicluna |
| 2016/0264021 A1 | 9/2016 | Gillett |
| 2016/0277560 A1 | 9/2016 | Gruberman |
| 2016/0301698 A1 | 10/2016 | Katara |

(56) References Cited

U.S. PATENT DOCUMENTS

| | | |
|---|---|---|
| 2016/0339928 A1 | 11/2016 | Mankin |
| 2016/0342934 A1 | 11/2016 | Michalik |
| 2016/0360382 A1 | 12/2016 | Gross |
| 2016/0364812 A1 | 12/2016 | Cao |
| 2016/0364823 A1 | 12/2016 | Coa |
| 2016/0370194 A1 | 12/2016 | Colijn |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0129399 A1 | 5/2017 | Appukutty |
| 2017/0132540 A1 | 5/2017 | Haparnas |
| 2017/0144774 A1 | 5/2017 | Pollard |
| 2017/0147951 A1 | 5/2017 | Meyer |
| 2017/0147959 A1 | 5/2017 | Sweeney |
| 2017/0169535 A1 | 6/2017 | Tolkin |
| 2017/0190251 A1 | 7/2017 | Wu |
| 2017/0213165 A1 | 7/2017 | Stauffer |
| 2017/0248949 A1 | 8/2017 | Moran |
| 2017/0248950 A1 | 8/2017 | Moran |
| 2017/0256147 A1 | 9/2017 | Shanahan |
| 2017/0277191 A1 | 9/2017 | Fairfield |
| 2017/0300053 A1 | 10/2017 | Wengreen |
| 2017/0301220 A1* | 10/2017 | Jarrell .............. H04L 67/125 |
| 2017/0313321 A1 | 11/2017 | Jefferies |
| 2017/0316516 A1 | 11/2017 | Goldman-Shenhar |
| 2017/0316533 A1 | 11/2017 | Goldman-Shenhar |
| 2017/0316621 A1 | 11/2017 | Jefferies |
| 2017/0327082 A1 | 11/2017 | Kamhi |
| 2017/0337437 A1 | 11/2017 | Kanagaraj |
| 2017/0344010 A1 | 11/2017 | Rander |
| 2017/0352250 A1 | 12/2017 | de Barros Chapiewski |
| 2017/0357973 A1 | 12/2017 | Van Os |
| 2017/0363430 A1 | 12/2017 | Al-Dahle |
| 2017/0365030 A1 | 12/2017 | Shoham |
| 2017/0372394 A1 | 12/2017 | Chan |
| 2017/0372431 A1 | 12/2017 | Perl |
| 2018/0060778 A1 | 3/2018 | Guo |
| 2018/0061242 A1 | 3/2018 | Bavar |
| 2018/0075380 A1 | 3/2018 | Perl |
| 2018/0075565 A1 | 3/2018 | Myers |
| 2018/0096601 A1 | 4/2018 | Chow |
| 2018/0108103 A1 | 4/2018 | Li |
| 2018/0109934 A1 | 4/2018 | Grube |
| 2018/0115924 A1 | 4/2018 | Harris |
| 2018/0126960 A1 | 5/2018 | Reibling |
| 2018/0130161 A1 | 5/2018 | Wengreen |
| 2018/0137693 A1 | 5/2018 | Raman |
| 2018/0156625 A1 | 6/2018 | Mangal |
| 2018/0157268 A1 | 6/2018 | Mangal |
| 2018/0189717 A1 | 7/2018 | Cao |
| 2018/0191596 A1 | 7/2018 | Bhaya |
| 2018/0196417 A1 | 7/2018 | Iagnemma |
| 2018/0211540 A1 | 7/2018 | Bedegi |
| 2018/0211541 A1 | 7/2018 | Rakah |
| 2018/0220189 A1 | 8/2018 | Hodge |
| 2018/0225749 A1 | 8/2018 | Shoen |
| 2018/0225890 A1 | 8/2018 | Jales Costa |
| 2018/0300816 A1 | 10/2018 | Perl |
| 2018/0356239 A1 | 12/2018 | Marco |
| 2018/0357907 A1 | 12/2018 | Reiley |
| 2019/0035277 A1 | 1/2019 | Son |
| 2019/0050787 A1 | 2/2019 | Munafo |
| 2019/0220035 A1 | 7/2019 | Wengreen |
| 2019/0228654 A1 | 7/2019 | Olsen |
| 2019/0383627 A1* | 12/2019 | Nangeroni .......... G01C 21/3461 |
| 2020/0017117 A1* | 1/2020 | Milton .............. B60W 50/02 |

OTHER PUBLICATIONS

Wireless High-Speed Broadband—Downloaded on May 25, 2019 from https://www.liveu.tv/media/k2/attachments/LiveU_Databridge.pdf.

The Relationship Between Drivers' Blood Alcohol Concentration (BAC) and Actual Driving Performance During High Speed Travel—Downloaded on May 25, 2019 from http://www.icadtsinternational.com/files/documents/1986_017.pdf.

Cannabis Effects on Driving Lateral Control With and Without Alcohol—Downloaded on May 25, 2019 from https://www.researchgate.net/publication/278966939_Cannabis_Effects_on_Driving_Lateral_Control_With_and_Without_Alcohol.

Google Self-Driving Vehicle—Online prior to Apr. 13, 2016 at www.google.com/selfdrivingcar/.

Tesla Autopilot—Online prior to Apr. 13, 2016 at www.technologyreview.com/s/600772/10-breakthrough-technologies-2016-tesla-autopilot/.

Tesla Model S Software Version 7—Autopilot—Online prior to Apr. 13, 2016 at www.teslamotors.com/presskit/autopilot.

BMW Heads Up Display—Online prior to Apr. 13, 2016 at www.autotrader.com/car-news/full-color-heads-up-display-to-debut-on-new-3-series-132586.

Uber Details—Online prior to Apr. 13, 2016 at www.wikihow.com/Use-Uber.

Raspberry Pi: How can I detect the direction of a sound—Online prior to Apr. 13, 2016 at www.quora.com/Raspberry-Pi-1/How-can-I-detect-the-direction-of-a-sound.

Wikipedia: Biometric Device—Downloaded on Aug. 19, 2016 from en.wikipedia.org/wiki/Biometric_device.

Self-Driving Cars Go Public; Uber Offers Rides in Pittsburgh—Downloaded on Aug. 19, 2016 from www.yahoo.com/news/uber-autonomous-cars-haul-people-125127470.html?ref=gs.

Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.

Zach Epstein, You'll be riding in self-driving cars as soon as next year, May 6, 2016, BGR.com, http://bgr.com/2016105'06/lyfl-self-driving-cars-2017/, pp. 1-5.

Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.

Explain That Stuff: Smoke Detectors—Downloaded on Sep. 28, 2018 from www.explainthatstuff.com/smokedetector.html.

Nittan: EV-DP Smoke Detector—Downloaded on Sep. 28, 2018 from nittan.co.uk/products/products/ev/ev-dp.

Wikipedia: Rain Sensor—Downloaded on Sep. 28, 2018 from en.wikipedia.org/wiki/Rain_sensor.

Nest: Split-Spectrum White Paper—Downloaded on Oct. 1, 2018 from nest.com/support/images/misc-assets/Split-Spectrum-Sensor-White-Paper.pdf.

How Police Visually Detect Drunk Drivers—Downloaded on Oct. 19, 2018 from thelaw.com/law/how-police-visually-detect-drunk-drivers.185.

Velodyne VLS-128 LiDAR Sensor—Downloaded on Oct. 22, 2018 from velodynelidar.com/vls-128.html.

Waymo's Suite of Custom-Built, Self-Driving Hardware—Downloaded on Oct. 22, 2018 from medium.com/waymo/introducing-waymos-suite-of-custom-built-self-driving-hardware-c47d1714563.

Lidar—Downloaded on Oct. 24, 2018 from en.wikipedia.org/wiki/Lidar.

Radar—Downloaded on Oct. 24, 2018 from en.wikipedia.org/wiki/Radar.

Assisted GPS—Downloaded on Nov. 19, 2018 from lifewire.com/assisted-gps-1683306.

How GPS Works—Downloaded on Nov. 19, 2018 from lifewire.com/iphone-gps-set-up-1683393.

Indoor Positioning System—Downloaded on Nov. 19, 2018 from en.wikipedia.org/wiki/Indoor_positioning_system.

LTE—Downloaded on Nov. 27, 2018 from en.wikipedia.org/wiki/LTE_(telecommunication).

(56) References Cited

OTHER PUBLICATIONS

OTDOA—Downloaded on Nov. 27, 2018 from en.wikipediaorg/wiki/OTDOA.
Ping for Beginners—Downloaded on Jan. 30, 2019 from https://social.technet.microsoft.com/wiki/contents/articles/30110.ping-for-beginners.aspx.
How Power Door Locks Work—Downloaded on Jul. 16, 2019 from https://auto.howstuffworks.com/power-door-lock.htm/printable.
Ahn Jin Deuk, Machine translation of KR-20090094569-A, Sep. 2009, espacenet.com (Year: 2009).
GHSA.org, "Seat belt laws", Downloaded Oct. 23, 2019 from https://www.ghsa.org/state-laws/issues/Seat-Belts.

\* cited by examiner

| Time (Seconds) | Position Y (Feet) | Distance X to Lane Marker (Feet) | Distance X to Center of Lane (Feet) | Distance X to Average Path (Feet) |
|---|---|---|---|---|
| 0.0 | 0 | 5.3 | -0.7 | 0.8 |
| 0.5 | 29 | 5.4 | -0.6 | 0.9 |
| 1.0 | 58 | 5.6 | -0.4 | 1.1 |
| 1.5 | 86 | 5.7 | -0.3 | 1.2 |
| 2.0 | 113 | 5.8 | -0.2 | 1.3 |
| 2.5 | 139 | 5.7 | -0.3 | 1.2 |
| 3.0 | 165 | 5.6 | -0.4 | 1.1 |
| 3.5 | 191 | 5.4 | -0.6 | 0.9 |
| 4.0 | 217 | 5.2 | -0.8 | 0.7 |
| 4.5 | 244 | 5.0 | -1.0 | 0.5 |
| 5.0 | 272 | 4.8 | -1.2 | 0.3 |
| 5.5 | 301 | 4.6 | -1.4 | 0.1 |
| 6.0 | 331 | 4.4 | -1.6 | -0.1 |
| 6.5 | 362 | 4.2 | -1.8 | -0.3 |
| 7.0 | 394 | 4.0 | -2.0 | -0.5 |
| 7.5 | 427 | 3.8 | -2.2 | -0.7 |
| 8.0 | 460 | 3.6 | -2.4 | -0.9 |
| 8.5 | 492 | 3.5 | -2.5 | -1.0 |
| 9.0 | 524 | 3.6 | -2.4 | -0.9 |
| 9.5 | 555 | 3.8 | -2.2 | -0.7 |
| 10.0 | 586 | 4.0 | -2.0 | -0.5 |
| 10.5 | 616 | 4.2 | -1.8 | -0.3 |
| 11.0 | 646 | 4.3 | -1.7 | -0.2 |
| 11.5 | 677 | 4.4 | -1.6 | -0.1 |
| 12.0 | 707 | 4.4 | -1.7 | -0.2 |
| 12.5 | 736 | 4.2 | -1.8 | -0.3 |
| 13.0 | 764 | 4.1 | -1.9 | -0.4 |
| 13.5 | 791 | 4.0 | -2.1 | -0.6 |
| 14.0 | 818 | 3.8 | -2.2 | -0.7 |
| 14.5 | 846 | 3.6 | -2.4 | -0.9 |

FIG. 10

VEHICLE DETECTION SYSTEMS

CROSS-REFERENCE TO RELATED APPLICATION

The entire contents of the following application are incorporated by reference herein: U.S. patent application Ser. No. 16/178,392; filed Nov. 1, 2018; and entitled SELF-DRIVING VEHICLE SYSTEMS AND METHODS.

The entire contents of the following application are incorporated by reference herein: U.S. patent application Ser. No. 16/372,915; filed Apr. 2, 2019; and entitled SELF-DRIVING VEHICLE SYSTEMS AND METHODS.

The entire contents of the following application are incorporated by reference herein: U.S. patent application Ser. No. 16/373,474; filed Apr. 2, 2019; and entitled SELF-DRIVING VEHICLE SYSTEMS AND METHODS.

BACKGROUND

Field

Various embodiments disclosed herein relate to vehicles. Certain embodiments relate to vehicle monitoring systems.

Description of Related Art

According to the National Highway Traffic Safety Administration, 37,133 people were killed in vehicle crashes in 2017 in the United States. Although determining precise impaired-driving statistics is difficult, some studies have estimated that impaired driving could be the cause of approximately half of all vehicle crashes. Causes of impaired driving can include alcohol, illegal drugs, legal drugs, drowsiness, and distractions (such as texting or watching a screen while driving). Impaired driving is extremely dangerous to people in the vehicle with the impaired driver, people in other vehicles, and nearby pedestrians.

Detecting impaired driving has previously proven to be nearly impossible in all but the most egregious cases. Many impaired drivers are not caught until they are identified at the scene of an accident. The most effective method currently employed to catch drunk or drugged drivers is a sobriety checkpoint where police officers stop each vehicle and talk to each driver. Sobriety checkpoints are highly intrusive, illegal in some states, and do not substantially reduce impaired driving because they are so rare. Some apps enable impaired drivers to avoid sobriety checkpoints by notifying drivers where police are conducting enforcement operations. As a result, there is a need for systems and methods that better detect impaired driving. Better detecting impaired driving will save thousands of lives each year.

SUMMARY

Impaired driving is extremely dangerous to people in the vehicle with the impaired driver and to people in other vehicles. According to some studies, impaired driving could be the cause of approximately half of all vehicle crashes. Causes of impaired driving can include alcohol, illegal drugs, legal drugs, drowsiness, and distractions (such as texting or watching a screen while driving).

In some embodiments, a vehicle guidance system comprises a first vehicle comprising a first lane position detection system having at least one of a first camera, a first radar and a first lidar. The first lane position detection system can be configured to record a first path of a second vehicle as the first vehicle and the second vehicle travel on a first road. The vehicle guidance system can comprise a processor system configured to analyze a first deviation of the first path of the second vehicle relative to a first lane of the first road. The vehicle guidance system can be configured to receive (from the first vehicle) a first indicator of the second vehicle driving impaired. The vehicle guidance system can be configured to receive (from a third vehicle) a second indicator of the second vehicle driving impaired.

In some embodiments, a vehicle guidance system is configured to receive a first impaired driving indicator. A vehicle guidance system can comprise a first vehicle comprising a first lane position detection system having at least one of a first camera, a first radar and a first lidar. The first lane position detection system can be configured to record a first path of a second vehicle as the first vehicle and the second vehicle travel on a first road. A vehicle guidance system can comprise a processor system configured to analyze a first deviation of the first path of the second vehicle relative to a first lane of the first road.

In some embodiments, a vehicle guidance system comprises a third vehicle comprising a second lane position detection system having at least one of a second camera, a second radar and a second lidar. The second lane position detection system can be configured to record a second path of the second vehicle as the third vehicle and the second vehicle travel on a second road. The processor system can be configured to analyze a second deviation of the second path of the second vehicle relative to a second lane of the second road.

In some embodiments, a vehicle guidance system comprises a communication system configured to send a first communication to a fourth vehicle in response to the first deviation being greater than a first predetermined threshold and the second deviation being greater than a second predetermined threshold. The first communication can be configured to prompt the fourth vehicle to alter a first driving route of the fourth vehicle to keep away from the second vehicle.

In some embodiments, a vehicle guidance system comprises a communication system configured to send a first communication to a law enforcement (e.g., by reporting the impaired vehicle by calling "911") in response to the first deviation being greater than a first predetermined threshold and/or in response to the second deviation being greater than a second predetermined threshold. The first communication can be configured to prompt a law enforcement officer to apprehend the second vehicle. The first communication can comprise a description of the second vehicle and/or a location indicator of the second vehicle (e.g., "the second vehicle is heading west on Main Street").

In some embodiments, the first lane position detection system is configured to compensate for motion of the first vehicle to determine a speed of the second vehicle. The first lane position detection system can be configured to compensate for the motion of the first vehicle to determine movements of the second vehicle toward at least one of a left side of the first lane and a right side of the first lane. The processor system can be configured to analyze the first deviation based on the speed and the movements.

In some embodiments, the first lane position detection system comprises the first camera. The first camera of the first vehicle can be configured to record lane markers of the first lane. The first camera can be configured to record the first path of the second vehicle to enable the processor system to analyze the first deviation by comparing the first path relative to positions of the lane markers.

In some embodiments, the first lane position detection system comprises the first camera and at least one of the first lidar and the first radar. The first camera can be configured to identify lane markers of the first lane.

In some embodiments, the first lidar is configured to identify the first path of the second vehicle to enable the processor system to analyze the first deviation by comparing the first path relative to positions of the lane markers.

In some embodiments, the first radar is configured to identify the first path of the second vehicle to enable the processor system to analyze the first deviation by comparing the first path relative to positions of the lane markers.

In some embodiments, a vehicle guidance system comprises a communication system configured to send a first communication to a fourth vehicle in response to the first deviation being greater than a predetermined threshold. The first communication can be configured to prompt the fourth vehicle to alter a first driving route of the fourth vehicle to keep away from the second vehicle. The first communication can be configured to prompt the fourth vehicle to move away from the second vehicle.

In some embodiments, the first camera of the first vehicle is configured to take an image (e.g., a still picture or a video) of the second vehicle. The vehicle guidance system can comprise an image analysis system configured to identify at least one characteristic of the second vehicle by analyzing the image taken by the first vehicle.

In some embodiments, the communication system is configured to send a second communication having the at least one characteristic to the fourth vehicle to enable the fourth vehicle to keep away from the second vehicle in response to receiving the first communication and in response to identifying the second vehicle based on the at least one characteristic of the second communication.

In some embodiments, the least one characteristic comprises at least one of a color of the second vehicle, a shape of the second vehicle, a license plate identification of the second vehicle, a make of the second vehicle, and a model of the second vehicle.

In some embodiments, the vehicle guidance system comprises a database having vehicle characteristic data. The vehicle guidance system can be configured to compare the at least one characteristic of the second vehicle to the database to determine physical identification information of the second vehicle that is more precise than the at least one characteristic.

In some embodiments, the first lane position detection system comprises at least one of the first lidar and the first radar. At least one of the first lidar and the first radar can be configured to detect an indication of a shape of the second vehicle.

In some embodiments, the vehicle guidance system comprises a database having vehicle shape data. The vehicle guidance system can be configured to compare the indication of the shape to the vehicle shape data to determine physical identification information of the second vehicle, In some embodiments, a communication system is configured to send a second communication comprising the physical identification information to the fourth vehicle to enable the fourth vehicle to keep away from the second vehicle in response to receiving the first communication and in response to identifying the second vehicle based on the physical identification information.

In some embodiments, the vehicle guidance system comprises a location tracking system configured to receive a first location indicator of the second vehicle. The location tracking system can be configured to receive a second location indicator of the fourth vehicle.

In some embodiments, the communication system can be configured to send the first communication to the fourth vehicle in response to the location tracking system determining, based on the first location indicator and the second location indicator, that the fourth vehicle is within a first predetermined distance of the second vehicle.

In some embodiments, the vehicle guidance system comprises a location tracking system configured to monitor a second driving route of the second vehicle and configured to monitor the first driving route of the fourth vehicle.

In some embodiments, the communication system is configured to send the first communication to the fourth vehicle in response to the location tracking system predicting, based on the first driving route and the second driving route, that the fourth vehicle would come within a predetermined distance of the second vehicle.

In some embodiments, the first lane position detection system is configured to compensate for motion of the first vehicle to determine a speed of the second vehicle and to determine movements of the second vehicle toward at least one of a left side of the first lane and a right side of the first lane. The processor system can be configured to analyze the movements compared to the speed to determine that the first path relative to the first lane fluctuates more than a speed-relative threshold.

In some embodiments, the vehicle guidance system further comprises a communication system configured to send a first communication to a fourth vehicle in response to the first path fluctuating more than the speed-relative threshold. The first communication can be configured to prompt the fourth vehicle to alter a first driving route of the fourth vehicle to keep away from the second vehicle.

Some embodiments comprise methods of using a vehicle guidance system. Some embodiments comprise receiving from a first vehicle, by the vehicle guidance system, a first indicator of a second vehicle driving impaired; and/or receiving from a third vehicle, by the vehicle guidance system, a second indicator of the second vehicle driving impaired.

Some embodiments comprise sending, from the vehicle guidance system to a fourth vehicle, a first communication configured to prompt the fourth vehicle to alter a first driving route of the fourth vehicle to keep away from the second vehicle in response to determining, by the vehicle guidance system, that the first indicator and the second indicator are indicative of impaired driving.

In some embodiments, determining that the first indicator is indicative of impaired driving comprises: recording, by the first vehicle, a first path of the second vehicle relative to lane markers as the first vehicle and the second vehicle travel on a first road; compensating for motion of the first vehicle to determine a speed of the second vehicle; compensating for the motion of the first vehicle to determine movements of the second vehicle toward at least one of a left side of the first road and a right side of the first road; and/or analyzing the movements compared to the speed to determine that the first path relative to the lane markers fluctuates more than a speed-relative threshold.

In some embodiments, the first indicator comprises lane control data based on the first vehicle recording a first path of the second vehicle relative to lane markers as the first vehicle and the second vehicle travel on a first road. Some embodiments comprise analyzing, by at least one of the vehicle guidance system and the first vehicle, the first path relative to the lane markers.

In some embodiments, the second indicator comprises lane exit data based on the third vehicle recording the second vehicle exiting a lane of a second road. and then reentering a lane of a second road. The second indicator can comprise lane exit data based on the third vehicle recording the second vehicle exiting a lane of a second road and then reentering the lane of the second road.

In some embodiments, the second indicator comprises detecting, by the third vehicle, that the second vehicle is traveling on a second road at least one of at least five miles per hour slower or at least five miles per hour faster than a speed limit of the second road.

In some embodiments, the second indicator comprises detecting, by the third vehicle, that the second vehicle is traveling at night without illuminated headlights.

In some embodiments, the first indicator comprises lane control data based on the first vehicle recording a position of the second vehicle as the second vehicle travels in a lane of a first road. Embodiments can comprise analyzing, by at least one of the vehicle guidance system and the first vehicle, a deviation of a first path of the second vehicle along the lane relative to lane markers of the first road.

In some embodiments, the first indicator comprises lane control data based on the first vehicle recording a position of the second vehicle as the second vehicle travels in a lane of a first road. Embodiments can comprise analyzing, by at least one of the vehicle guidance system and the first vehicle, a deviation of a first path of the second vehicle along the lane relative to a typical path along the lane.

Embodiments can comprise formulating, by the vehicle guidance system, the typical path along the lane by aggregating lane position data of automobiles as the automobiles travel along the lane.

In some embodiments, the first indicator comprises speed data based on the first vehicle recording a speed of the second vehicle. Embodiments can comprise determining, by at least one of the vehicle guidance system and the first vehicle, that the speed is at least one of at least eight miles per hour faster and at least eight miles slower than a speed limit of a location of the second vehicle.

In some embodiments, the first indicator comprises acceleration data based on the first vehicle recording an acceleration of the second vehicle. Embodiments can comprise analyzing, by at least one of the vehicle guidance system and the first vehicle, changes in the acceleration to enable the vehicle guidance system to determine that the first indicator is indicative of the impaired driving.

In some embodiments, the first indicator comprises a first lane control data based on the first vehicle recording a first path of the second vehicle as the second vehicle travels in a first lane of a first area. Embodiments can comprise analyzing, by at least one of the vehicle guidance system and the first vehicle, a first deviation of the first path relative to the first lane. The second indicator can comprise a second lane control data based on the third vehicle recording a second path of the second vehicle as the second vehicle travels in a second lane of a second area. Embodiments can comprise analyzing, by at least one of the vehicle guidance system and the third vehicle, a second deviation of the second path relative to the second lane.

Some embodiments comprise, in response to analyzing the first deviation and the second deviation, sending, from the vehicle guidance system to a fourth vehicle, a first communication configured to prompt the fourth vehicle to keep away from the second vehicle.

Some embodiments comprise sending, from the vehicle guidance system to the fourth vehicle, the first communication in response to considering (e.g., by at least one of the vehicle guidance system, the first vehicle, and the third vehicle) a combined evidence of both the first deviation and the second deviation.

Some embodiments comprise receiving, by the vehicle guidance system, from the first vehicle a first location indicator of the second vehicle; determining, by the vehicle guidance system based on the first location indicator, that a fourth vehicle is within a first predetermined distance of the second vehicle; and in response, sending, from the vehicle guidance system to the fourth vehicle, a first communication configured to prompt the fourth vehicle to alter a first driving route of the fourth vehicle to keep away from the second vehicle.

Some embodiments comprise receiving, by the vehicle guidance system, from the first vehicle a first location indicator of the second vehicle; receiving, by the vehicle guidance system, a second location indicator of a fourth vehicle; determining, by the vehicle guidance system based on the first location indicator and the second location indicator, that the fourth vehicle is on a first driving route that would come within a predetermined distance of the second vehicle; and in response sending, from the vehicle guidance system to the fourth vehicle, a first communication configured to prompt the fourth vehicle to alter the first driving route of the fourth vehicle to keep away from the second vehicle.

In some embodiments, a vehicle monitoring system comprises a first lane position detection system configured to be located remotely relative to a first vehicle and having at least one of a first camera, a first radar, and a first lidar. The first lane position detection system can be configured to use at least one of the first camera, the first radar, and the first lidar to detect a first serpentine path of the first vehicle as the first vehicle travels along a first road on a first day.

In some embodiments, a vehicle monitoring system comprises a computer system having first program instructions configured to numerically analyze first data indicative of the first serpentine path from at least one of the first camera, the first radar, and the first lidar to generate a first aggregate veering characteristic.

In some embodiments, the computer system comprises a memory having a first veering history associated with the first vehicle. The first program instructions can be configured to update the first veering history in response to generating the first aggregate veering characteristic such that the first veering history is based at least partially on the first aggregate veering characteristic.

In some embodiments, a vehicle monitoring system comprises a computer system having at least one processor and a memory comprising first program instructions that when executed by the at least one processor are configured to numerically analyze first data from at least one of the first camera, the first radar, and the first lidar to generate first numerical position data indicative of the first serpentine path of the first vehicle.

In some embodiments, the first program instructions are configured to determine a first aggregate veering characteristic of the first serpentine path of the first vehicle.

In some embodiments, the first program instructions are configured to determine a first veering threshold for the first vehicle at least partially based on the first veering history.

In some embodiments, the vehicle monitoring system comprises a communication system and second program instructions configured to cause the communication system to send a first communication in response to the vehicle monitoring system detecting, on a second day, a second serpentine path of the first vehicle that exceeds the first veering threshold.

In some embodiments, the first communication comprises at least one of a picture of the first vehicle and first identifying data indicative of the first vehicle.

In some embodiments, the communication system comprises a transmitter configured to send the first communication to a law enforcement entity.

In some embodiments, the first lane position detection system comprises at least one of the first radar and the first lidar, at least one of the first radar and the first lidar are configured to detect a speed of the first vehicle on the second day, and the first program instructions are configured to determine the first veering threshold at least partially based on the first veering history and the speed.

In some embodiments, the first program instructions are configured to determine the first veering threshold at least partially based on the first veering history and at least one curvature characteristic of the first road.

In some embodiments, the first program instructions are configured to cause the first camera to take a picture of the first vehicle, the vehicle monitoring system comprises an image analysis system configured to determine first identifying data by analyzing the picture, and the first program instructions are configured to update the first veering history in response to determining that the first identifying data is indicative of the first vehicle.

In some embodiments, the first lane position detection system is mounted adjacent to the first road.

In some embodiments, the first program instructions are configured to update the first veering history at least partially based on the first program instructions comparing the first serpentine path to at least a second serpentine path of a second vehicle as the second vehicle travels along the first road and a third serpentine path of a third vehicle as the third vehicle travels along the first road such that the first veering history is at least partially based on how the first vehicle veers on the first road relative to how the second vehicle and the third vehicle veer on the first road.

In some embodiments, the first program instructions are configured to determine a first veering threshold for the first vehicle at least partially based on the first veering history and at least partially based on comparing the first serpentine path to at least a second serpentine path of a second vehicle as the second vehicle travels along the first road and a third serpentine path of a third vehicle as the third vehicle travels along the first road. The vehicle monitoring system can comprise a communication system and second program instructions configured to cause the communication system to send a first communication in response to the vehicle monitoring system detecting, on a second day, a fourth serpentine path of the first vehicle that exceeds the first veering threshold.

In some embodiments, a vehicle monitoring system comprises two, three, several, and/or even thousands of lane position detection systems, which can be mounted such that they oversee countless roads.

In some embodiments, first program instructions are configured to determine a first veering threshold for the first vehicle at least partially based on the first veering history. A vehicle monitoring system can comprise a second lane position detection system configured to be located remotely relative to the first vehicle and configured to be located remotely relative to the first lane position detection system. The second lane position detection system can comprise at least one of a second camera, a second radar, and a second lidar. The second lane position detection system can be configured to use at least one of the second camera, the second radar, and the second lidar to detect a second serpentine path of the first vehicle as the first vehicle travels along a second road.

In some embodiments, a vehicle monitoring system further comprises a communication system and second program instructions configured to cause the communication system to send a first communication in response to the second lane position detection system detecting that, on the second road, the second serpentine path of the first vehicle exceeds the first veering threshold. In some embodiments, the first veering threshold is a first serpentine veering threshold.

In some embodiments, the first communication comprises first identifying data indicative of the first vehicle, and the first communication is configured to notify a law enforcement entity.

In some embodiments, a vehicle monitoring system comprises a computer system having first program instructions configured to numerically analyze first data indicative of the first serpentine path from at least one of the first camera, the first radar, and the first lidar to generate a baseline veering profile specific to the first vehicle. The computer system can comprise a memory having the baseline veering profile.

In some embodiments, the first program instructions are configured to determine a first veering threshold for the first vehicle at least partially based on the baseline veering profile.

In some embodiments, a vehicle monitoring system comprises a communication system and second program instructions configured to cause the communication system to send a first communication in response to the vehicle monitoring system detecting, on a second day, a second serpentine path of the first vehicle that exceeds the first veering threshold.

In some embodiments, the first lane position detection system comprises the first camera and at least one of the first radar and the first lidar, and the first program instructions are configured to numerically analyze the first data indicative of the first serpentine path from at least one of the first radar and the first lidar to generate the baseline veering profile.

In some embodiments, a vehicle monitoring system comprises an image analysis system and the first lane position detection system comprises a camera system having the first camera. The camera system can include several cameras (including the first camera). The first program instructions can be configured to cause the camera system to take at least one picture of the first vehicle. The first program instructions can be configured to cause the image analysis system to analyze the at least one picture to determine first identifying data (regarding the first vehicle) and at least one identifying trait (regarding a human driver of the first vehicle).

In some embodiments, first program instructions are configured to assign the baseline veering profile to the first vehicle in response to determining that the first identifying data is indicative of the first vehicle and the first program instructions are configured to assign the baseline veering profile to a first driver of the first vehicle in response to determining that the identifying trait is indicative of the first driver. This way, different drivers of the first vehicle can have different baseline veering profiles.

In some embodiments, second program instructions are configured to cause the communication system to send the first communication in response to the vehicle monitoring system detecting, on the second day, the second serpentine path of the first vehicle and of the driver that exceeds the first veering threshold.

In some embodiments, the vehicle monitoring system comprises multiple lane position detection systems. A first lane position detection system can identify typical serpentine veering for a first vehicle (and/or for a first human driver). A second lane position detection system can later be used by the vehicle monitoring system to determine if future serpentine veering by the first vehicle (and/or by the first human driver) is abnormal enough for that particular vehicle and/or driver to justify notifying a law enforcement entity. In some embodiments, multiple lane position detection systems detect driving behaviors (e.g., serpentine veering) of a single vehicle and/or single driver on multiple roads to enable the vehicle monitoring system to characterize typical driving behavior such that the vehicle monitoring system can later detect abnormal driving behavior (which the communication system can report).

In some embodiments, the first program instructions are configured to determine a first veering threshold for the first vehicle at least partially based on the baseline veering profile. The vehicle monitoring system can comprise a second lane position detection system configured to be located remotely relative to the first vehicle and configured to be located remotely relative to the first lane position detection system. The second lane position detection system can comprise at least one of a second camera, a second radar, and a second lidar. The second lane position detection system can be configured to use at least one of the second camera, the second radar, and the second lidar to detect a second serpentine path of the first vehicle as the first vehicle travels along a second road that is located remotely relative to the first road.

In some embodiments, the vehicle monitoring system further comprises a communication system and second program instructions configured to cause the communication system to send a first communication in response to the second lane position detection system detecting, on the second road, the second serpentine path of the first vehicle that exceeds the first veering threshold. The communication system can comprise a transmitter configured to send the first communication to a law enforcement entity. The first communication can be a wireless communication. The communication system can send the first communication via intermediary communication systems.

In some embodiments, the first lane position detection system is mounted adjacent to the first road and the second lane position detection system is mounted adjacent to the second road.

In some embodiments, first program instructions are configured to determine the first veering threshold at least partially based on the baseline veering profile and at least one curvature characteristic of the second road.

In some embodiments, a vehicle monitoring system comprises a first lane position detection system having at least one of a first camera, a first radar, and a first lidar. The first lane position detection system can be located to use at least one of the first camera, the first radar, and the first lidar to detect a first serpentine path of a first vehicle as the first vehicle travels along a first road. The first lane position detection system can be configured to use at least one of the first camera, the first radar, and the first lidar to detect the first serpentine path of the first vehicle as the first vehicle travels along the first road.

In some embodiments, the vehicle monitoring system comprises a computer system having first program instructions configured to numerically analyze first data indicative of the first serpentine path from at least one of the first camera, the first radar, and the first lidar to generate a first veering threshold for the first vehicle; a second lane position detection system having at least one of a second camera, a second radar, and a second lidar, wherein the second lane position detection system is located and configured to use at least one of the second camera, the second radar, and the second lidar to detect a second serpentine path of the first vehicle as the first vehicle travels along a second road; and a communication system and second program instructions configured to cause the communication system to send a first communication in response to the second lane position detection system detecting, on the second road, the second serpentine path of the first vehicle that exceeds the first veering threshold.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 10 illustrates a table comprising numerical position data, according to some embodiments.

DETAILED DESCRIPTION

Figure 1:
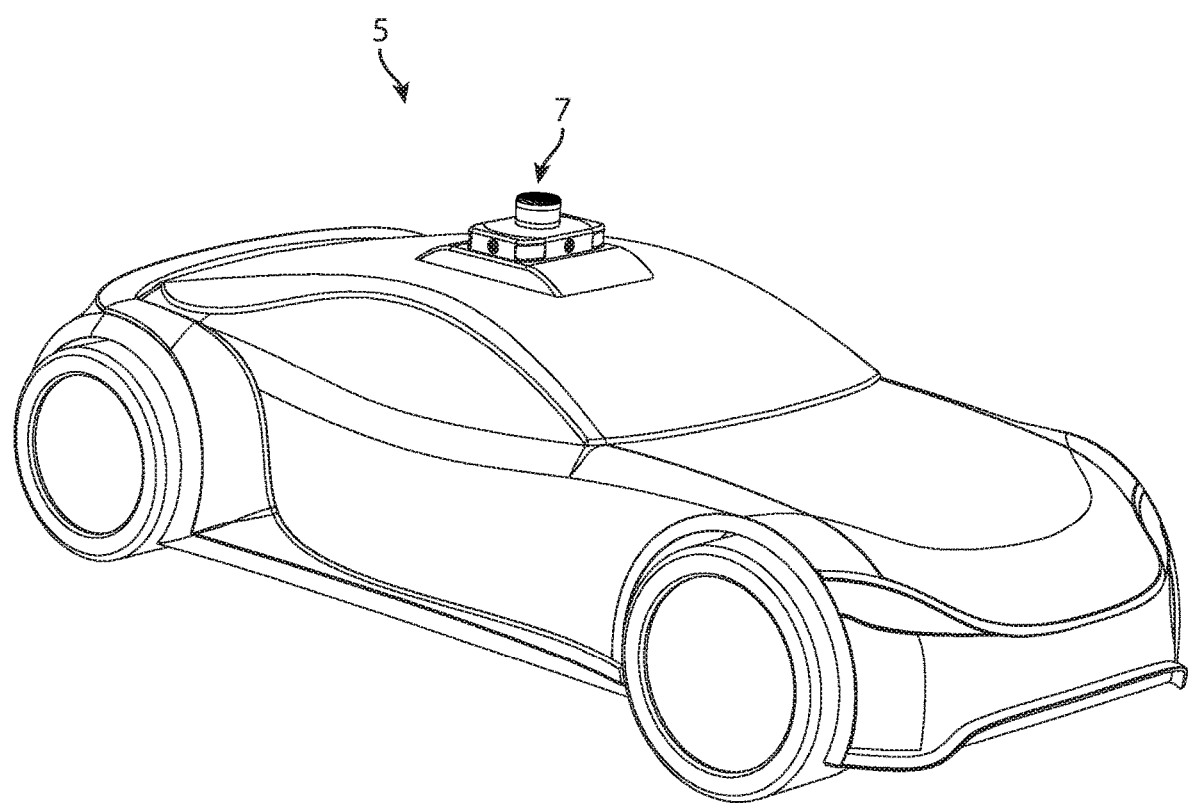
FIG. 1 illustrates a perspective view of a self-driving vehicle, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving cars are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Some embodiments can be used with self-driving vehicles. The embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center or apartment complex).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device.

In some embodiments, each system comprises at least one processor and a memory comprising program instructions that when executed by the at least one processor cause the system to perform method steps.

FIG. 1 illustrates a perspective view of a self-driving vehicle 5. The self-driving vehicle 5 can include a detection system 7 configured to detect objects (e.g., cars, pedestrians, other vehicles, buildings, fire hydrants, trees, lane markers, guard rails, roadway barriers, sidewalks, roadway signs, traffic lights) located around the self-driving vehicle 5. Various sensors of the detection system 7 can sense objects even closer than an inch away (e.g., by using ultrasonic sensors) and even farther away than 100 yards (e.g., using long-range radar).

Figure 2:
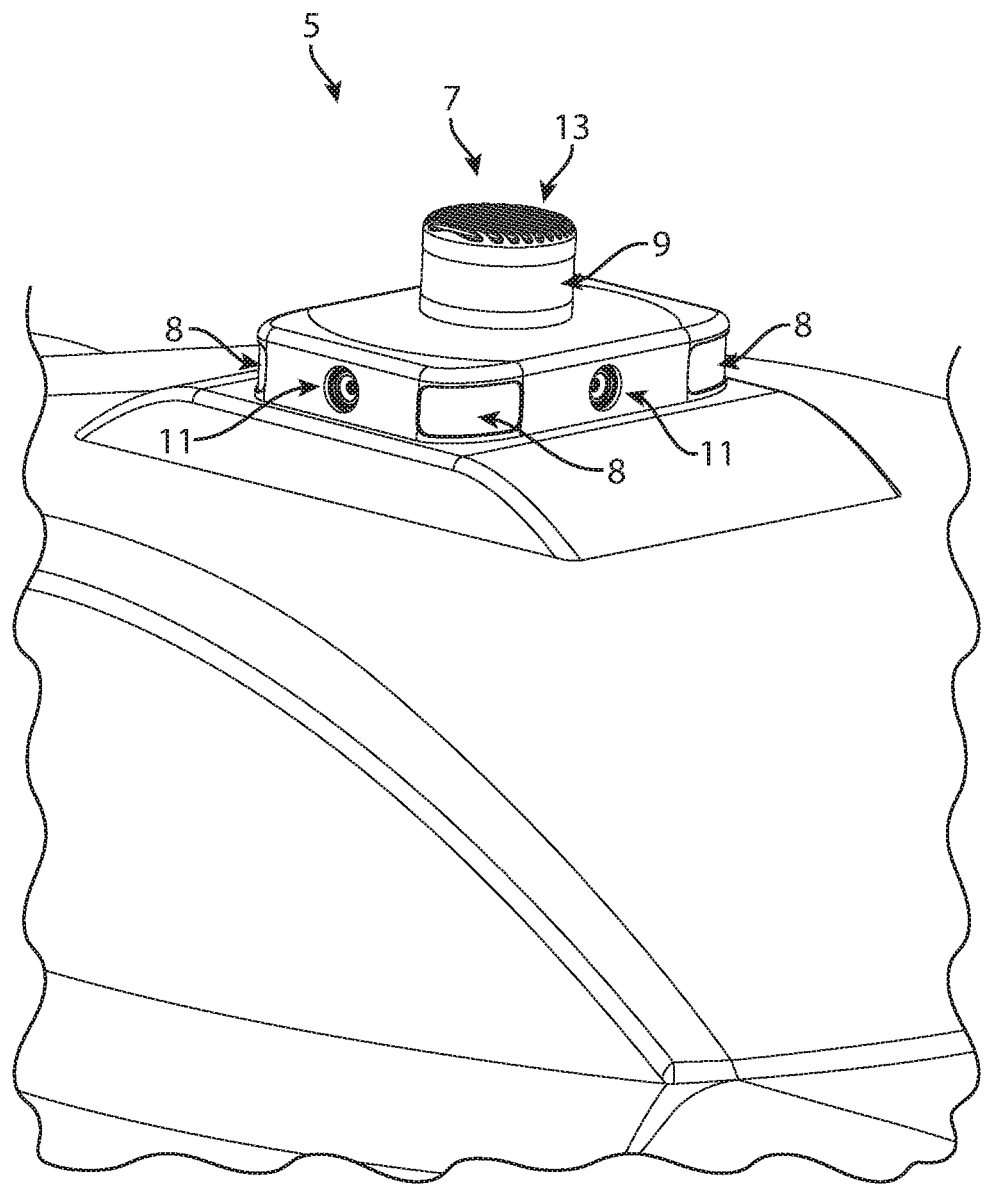
FIG. 2 illustrates a perspective view of a top side, a front side and a passenger side of a detection system, according to some embodiments.
Figure 3:
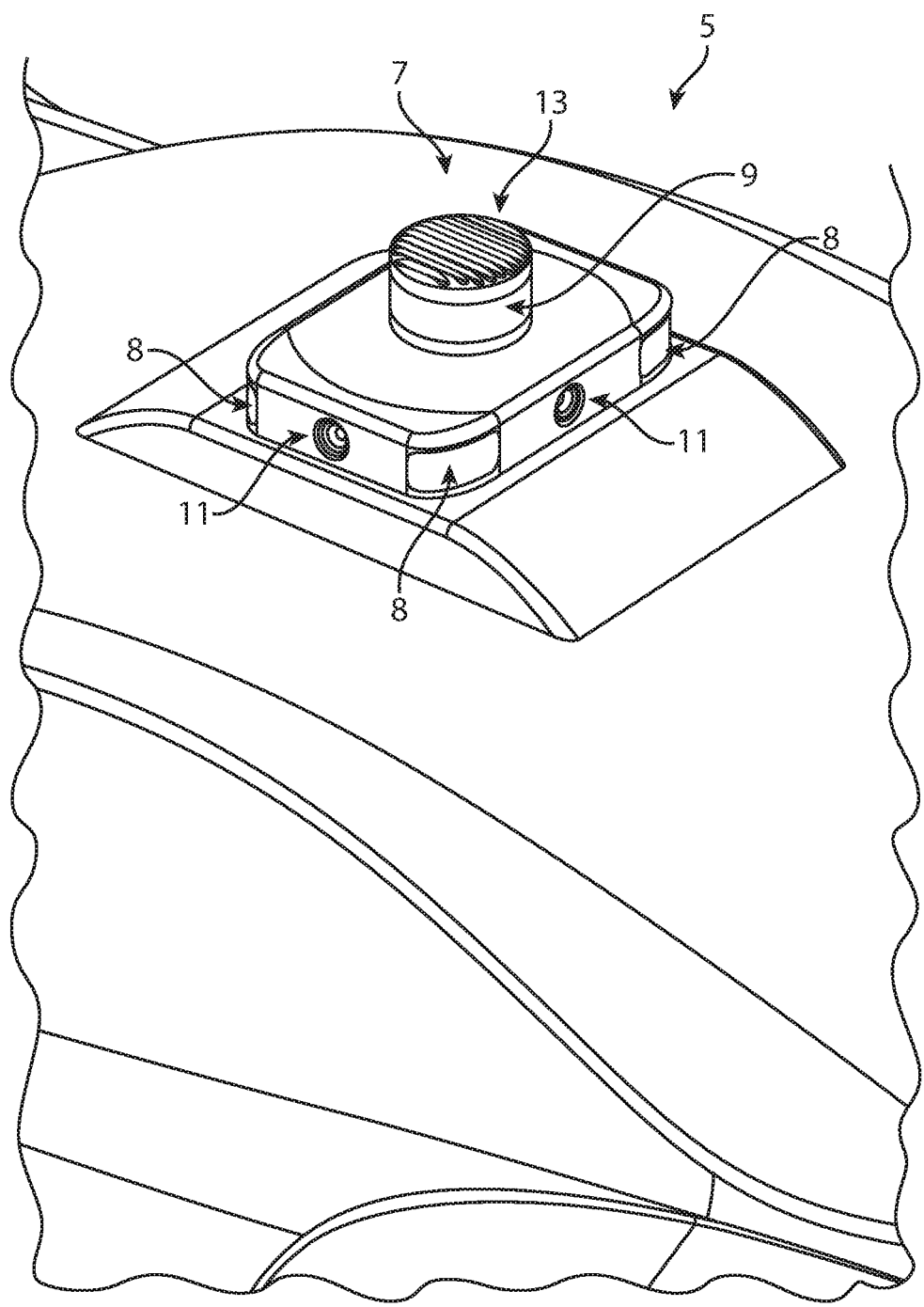
FIG. 3 illustrates a perspective view of the top side, a backside side and a driver side of the detection system, according to some embodiments.
Figure 4:
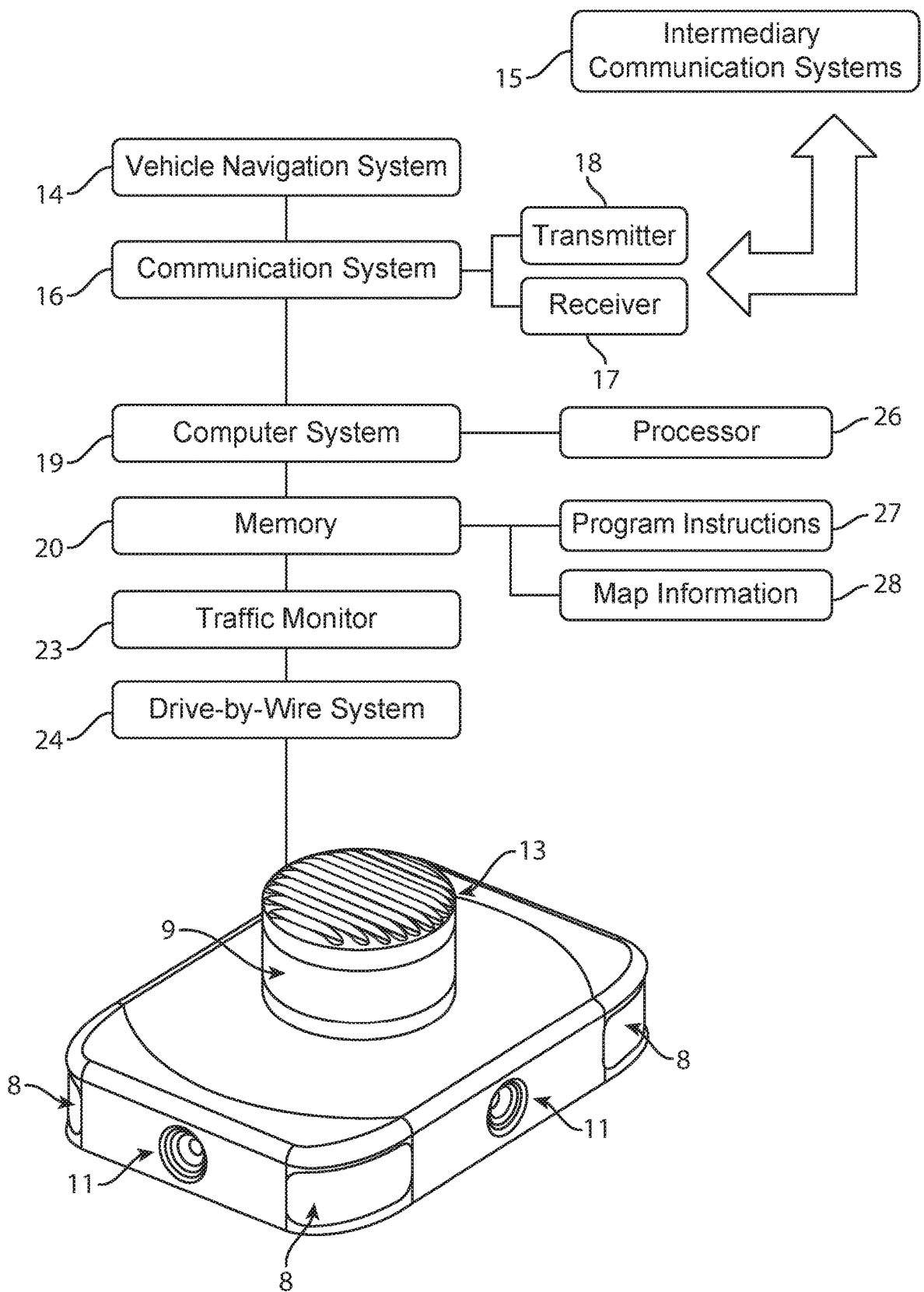
FIG. 4 illustrates a diagrammatic view of portions of a self-driving vehicle, according to some embodiments.

FIG. 2 illustrates a perspective view of the top side, the front side and the passenger side of the detection system 7. FIG. 3 illustrates a perspective view of the top side, the backside side and the driver side of the detection system 7. FIG. 4 illustrates a diagrammatic view of portions of a self-driving vehicle 5, according to some embodiments.

The detection system 7 can comprise radar 8, lidar 9, ultrasonic sensors, cameras 11, and any other sensing devices configured to enable the vehicle 5 to detect objects.

The self-driving vehicle 5 illustrated in FIGS. 1-4 includes a detection system 7 mounted to the roof of the self-driving vehicle 5. In some embodiments, however, the components of the detection system 7 are mounted on different areas of the self-driving vehicle 5. For example, the ultrasonic sensors can be mounted on the bumpers of the self-driving vehicle 5. The short range of the ultrasonic sensors can make bumper mounting helpful (because the bumper is often closer to the objects being sensed). The cameras 11 can be mounted just behind the windshield (e.g., in the rearview mirror) and just behind other windows. The radars 8 can be mounted near each of the four corners of the self-driving vehicle 5. In the illustrated embodiment, however, the detection system 7 can be contained in one assembly to simplify the integration of the detection system 7 into a vehicle.

The detection system 7 can use cameras 11 mounted around a perimeter (e.g., around a perimeter of the vehicle 5 or around a perimeter of a housing of the detection system 7). As illustrated in FIGS. 1-4, the cameras 11 face forward, backward, left, and right to provide (collectively) a 360-degree view around the vehicle 5. The cameras 11 can be high-resolution cameras covered by a glass window to protect each cameras 11 from water and dirt.

Cameras 11 can be configured to see lane markers on a road. Using cameras 11 to see painted lane markers can be helpful (because painted lane markers sometimes lack enough three dimensional nature to be detected by some other sensors). In addition, cameras 11 can see color differences (e.g., the difference between the color of the asphalt and the color of yellow or white paint of a lane marker). Cameras 11 can see the color of traffic lights (e.g., red, yellow, green).

Cameras 11 sometimes have trouble seeing in situations where the human eye would have trouble seeing (e.g., in fog or rain).

Radars 8 can be very helpful in fog and rain. An object that is not detected by cameras 11 (e.g., due to fog or rain) can be detected by radar 8. Radars 8 can detect the speed of other vehicles and the distance to other vehicles. Radars 8 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 9 can be located on the top portion of the detection system 7 to provide a 360-degree view of the area around the self-driving vehicle 5. The lidar 9 can tell the difference between an actual person and a billboard that includes a picture of a person (due to the three dimensional nature of the actual person and the two dimensional nature of the picture of a person).

The lidar 9 can accurately sense the three dimensional nature of the world around the self-driving vehicle 5. The lidar 9 can also measure the distance to objects. Measuring distance can enable the self-driving vehicle 5 to know, for example, if an approaching car is 5 meters away (so there is not enough time to turn in front of the car) or 25 meters away (so there may be enough time to turn in front of the car).

In some embodiments, the lidar 9 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and 360-degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 5 can be compensated for to accurately determine the location, speed, and direction of objects (such as other vehicles) located outside the vehicle 5. For example, if a first vehicle 5*a* is heading west at 35 miles per hour and a second vehicle 48 is heading east at an unknown speed, a detection system 7*a* of the first vehicle 5*a* can remove the contribution of the 35 miles per hour when determining the speed of the second vehicle 48.

In some embodiments, motion of the vehicle 5 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

In some embodiments, a lane position detection system (e.g., 7*a*) is configured to compensate for motion of the first vehicle 5*a* to determine a speed of a second vehicle 48. The first lane position detection system can be configured to compensate for the motion of the first vehicle 5*a* to determine movements of the second vehicle 48 toward a left side of a first lane or toward a right side of the first lane. The processor system (e.g., 26 and/or 35) can be configured to analyze the first deviation based on the speed and the movements.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three dimensional image or map of the area around the vehicle 5.

Embodiments can use a short-range lidar to give the self-driving vehicle 5 a surround view near the self-driving vehicle 5 (to see objects close to the self-driving vehicle 5) and can use a long-range lidar configured to not only detect objects located far from the self-driving vehicle 5, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle. These reflections can be detected by a sensor of the lidar. Measuring how long the light takes to return to the sensor and measuring the wavelengths of the reflected light can enable making a three-dimensional model of the object being sensed and of the entire area around the vehicle 5.

FIG. 4 illustrates a diagrammatic view of portions of a self-driving vehicle 5, according to some embodiments. The self-driving vehicle 5 can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24. In some embodiments, at least some of these items are part of the detection system 7.

The vehicle navigation system 14 can be configured to enable the vehicle 5 to follow a driving route. The vehicle navigation system 14 can direct the vehicle toward a pick-up location.

The communication system 16 can be configured to communicate with a vehicle management system. The communication system 16 can be configured to communicate with a remote computing device of a rider. The communication system 16 can use an antenna 13 to communicate with other vehicles and other devices (such as a vehicle management system and remote computing devices) via intermediary communication systems 15.

Intermediary communication systems 15 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The drive-by-wire system 24 can be a computer-regulated system for controlling the engine, accelerating, braking, turning, handling, suspension, and/or other functions related to autonomously driving the vehicle 5.

In some embodiments, at least portions of a vehicle guidance system are located far away from vehicles 5, 5a, 5b, 5c. The vehicle guidance system can include software that is run on servers. The servers can communicate with vehicles 5, 5a, 5b, 5c via intermediary communication systems 15.

In some embodiments, portions of the vehicle guidance system are located in one or more vehicles 5, 5a, 5b, 5c and portions of the vehicle guidance system are located far away from the one or more vehicles 5, 5a, 5b, 5c.

Figure 5:
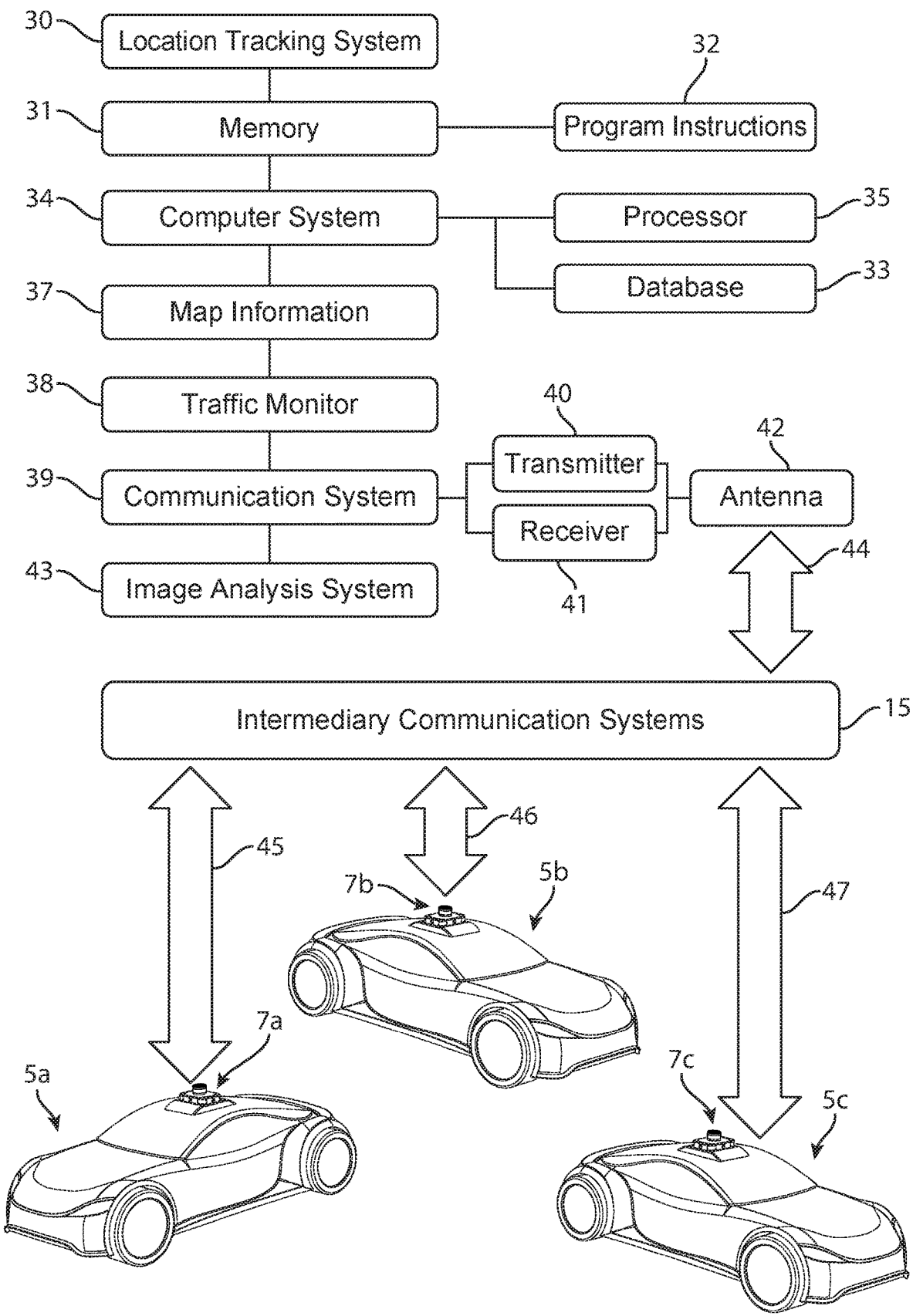
FIG. 5 illustrates a diagrammatic view of portions of a guidance system, according to some embodiments.

FIG. 5 illustrates a diagrammatic view of portions of a vehicle guidance system, according to some embodiments. FIG. 5 illustrates many optional items. Not all the items illustrated in FIG. 5 are necessarily part of each vehicle guidance system.

A vehicle guidance system can comprise a location tracking system 30 configured to track locations of vehicles 5, 5a, 5b, 5c and also configured to track locations of vehicles that have been identified as potentially impaired (according to indications collected by the vehicles 5, 5a, 5b, 5c).

The location tracking system 30 can receive GPS location data of the vehicles 5, 5a, 5b, 5c by the vehicles 5, 5a, 5b, 5c sending their GPS location data to the location tracking system 30 via intermediary communication systems 15.

The location tracking system 30 can comprise a computer configured to receive locations of vehicles. The location tracking system 30 can comprise a processor 35 and a memory 31 comprising program instructions 32 configured such that when executed by the processor 35 the program instructions 32 cause the location tracking system 30 to monitor locations of vehicles.

A vehicle guidance system can comprise a computer system 34 that includes one or more computers of any suitable type. Each computer can include a processor 35 and a memory 31 comprising program instructions 32 configured such that when executed by the processor 35 the program instructions 32 cause the vehicle guidance system to perform the methods described herein.

The vehicle guidance system can comprise map information 37 (including street information, preferred pick-up locations, and preferred drop-off locations) and a traffic monitor 38 configured to receive traffic information from third parties (e.g., Google Maps).

The vehicle guidance system can comprise a communication system 39 having a transmitter 40, a receiver 41, and an antenna 42. The communication system 39 can be configured to communicate with the vehicles 5, 5a, 5b, 5c. In some embodiments, the communication system 39 communicates with the vehicles 5, 5a, 5b, 5c via intermediary communication systems 15. The antenna 42 can be communicatively coupled to the antenna 13 shown in FIG. 4.

The antenna 42 can be communicatively coupled (e.g., via intermediary communication systems 15) with self-driving vehicles 5, 5a, 5b, 5c that can include a vehicle navigation system 14, a communication system 16 that has a transmitter 18 and a receiver 17, a computer system 19 that has a processor 26, a memory 20 that has program instructions 27 and map information 28, a traffic monitor 23, and a drive-by-wire system 24 (as illustrated in FIG. 4).

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

Vehicles 5a, 5b, 5c can send communications 45, 46, 47 via intermediary communication systems 15 to the antenna 42. The antenna 42 can send communications 44 via intermediary communication systems 15 to the vehicles 5a, 5b, 5c.

Each self-driving vehicle 5a, 5b, 5c can include all of the items described in the context of vehicle 5.

Vehicle 5a includes a lane position detection system detection system 7a that can include all of the items described in the context of detection system 7. Vehicle 5b includes a detection system 7b that can include all of the items described in the context of detection system 7. Vehicle 5c includes a detection system 7c that can include all of the items described in the context of detection system 7.

Figure 6:
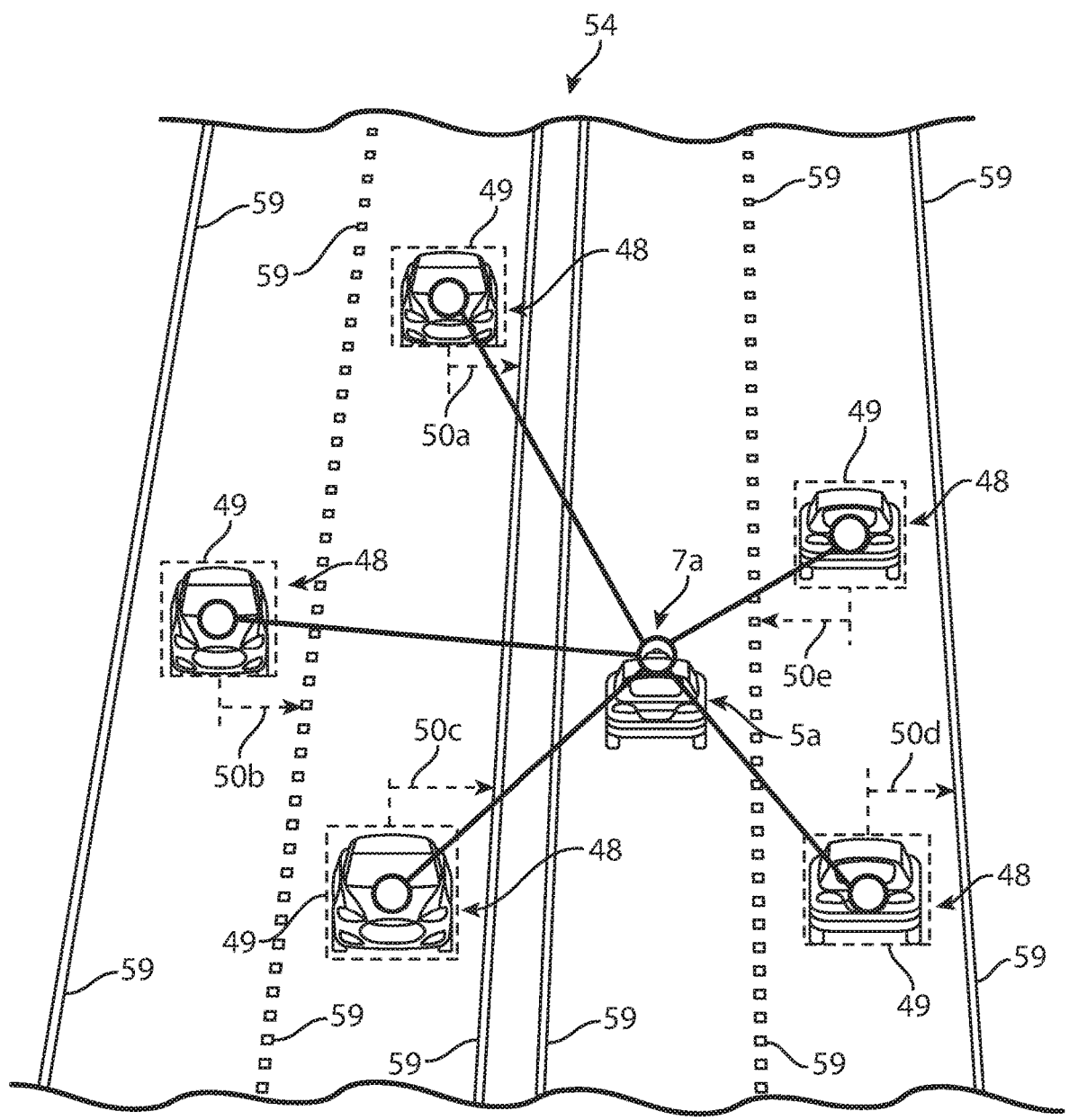
FIG. 6 illustrates a perspective view of a self-driving vehicle driving on a road, according to some embodiments.

FIG. 6 illustrates a perspective view of a first vehicle 5a driving on a road 54 having many lanes. The first vehicle 5a uses its first lane position detection system 7a to detect several vehicles 48. Although not noticeable to a human, one of the vehicles 48 has an impaired driver.

The detection system 7a can detect an outline 49 of each vehicle 48 using a camera 11, radar 8, and/or lidar 9. (The outlines 49 are depicted by broken line boxes in FIG. 6.) Detecting the outlines 49 can enable the detection system 7a to detect a center (e.g., a centroid) of each vehicle 48. (The centroids are depicted by circles in the middle of outlines 49 in FIG. 6.) Measuring distances 50a, 50b, 50c, 50d, 50e from the centers to lane markers 59 enables the vehicle 5a to track paths of the vehicles 48. Some embodiments comprise measuring from a lane marker 59 to a nearest portion of the vehicle 48 or to a nearest portion of an outline 49 of each vehicle 48. FIG. 10 illustrates example measurements. Measurements can be determined using data from the detection system 7a.

Figure 7:
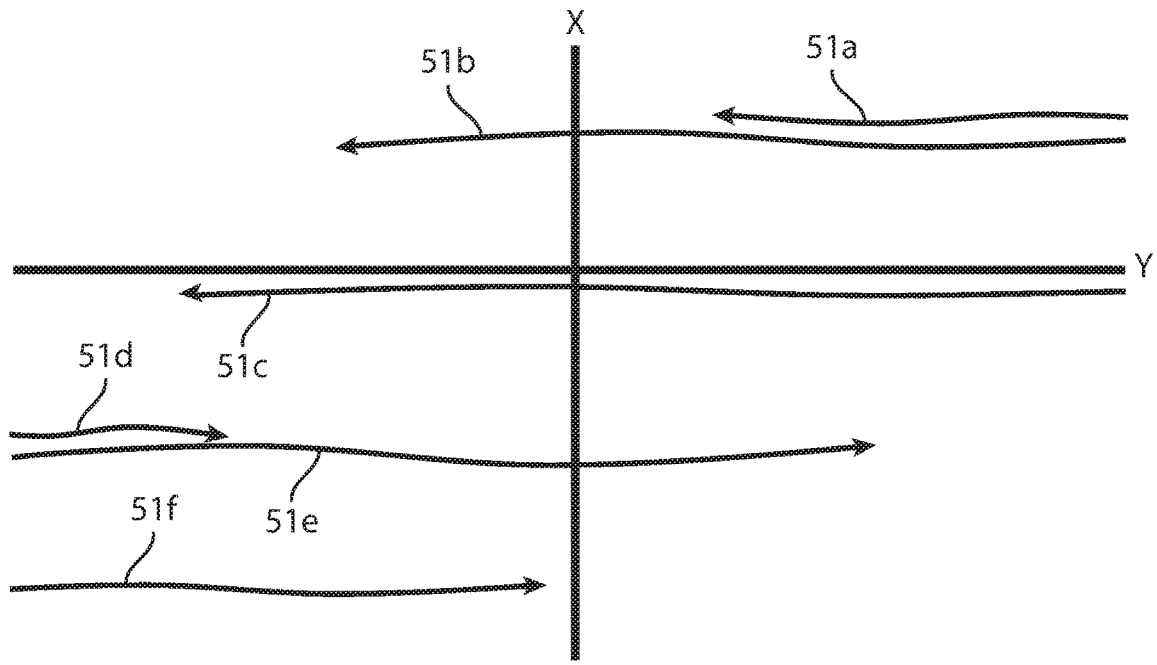
FIG. 7 illustrates a diagrammatic view of path data recorded by the self-driving vehicle shown in FIG. 6, according to some embodiments.

FIG. 7 illustrates a diagrammatic view of the path data recorded by the first vehicle 5a. (The paths 51a, 51b, 51c, 51d, 51e, or 51f shown in FIG. 7 are of the vehicles 48 shown in FIG. 6.) The first vehicle 5a is located at the origin of the X axis and the Y axis. The Y axis represents the direction of travel along the road. The X axis represents movement toward a left side of the road 54 or toward a right side of the road 54.

Figure 8:
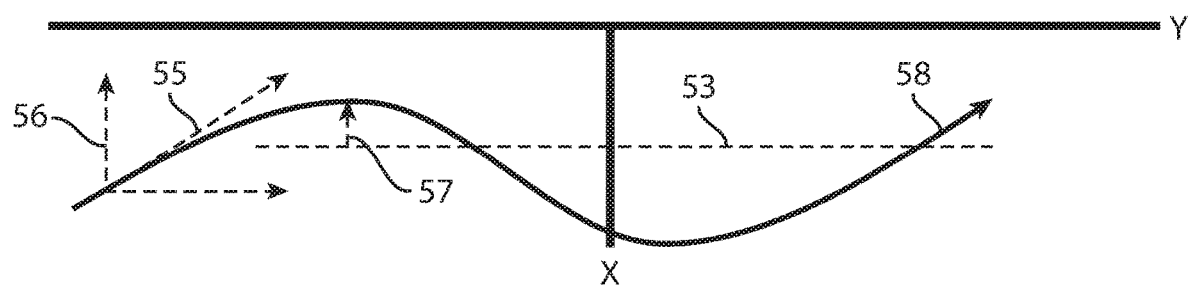
FIG. 8 illustrates a diagrammatic view of exaggerated movements of a vehicle to permit people to see the movements of the vehicle, according to some embodiments.

FIG. 8 represents a diagrammatic view of a path 58 of a vehicle. The movements of the vehicle in the X direction have been exaggerated in FIG. 8 to enable the movements of the vehicle in the X direction to be noticeable to people who view FIG. 8. A vehicle's travel can be represented by a vector, which can be split into X and Y components.

In some embodiments, a vehicle guidance system comprises a first vehicle 5a comprising a first lane position detection system 7a having at least one of a first camera 11, a first radar 8 and a first lidar 9. The first lane position detection system 7a can be configured to record a first path (e.g., 51a, 51b, 51c, 51d, 51e, or 51f) of a second vehicle 48 as the first vehicle 5a and the second vehicle 48 travel on a first road 54. The vehicle guidance system can comprise a processor system (e.g., 35 and/or 26) configured to analyze a first deviation (e.g., 55, 56, 57) of the first path (e.g., 51a, 51b, 51c, 51d, 51e, or 51f) of the second vehicle 48 relative to a first lane of the first road 54.

The vehicle guidance system can be configured to receive (from the first vehicle 5*a*) a first indicator of the second vehicle 48 driving impaired. The vehicle guidance system can be configured to receive (from a third vehicle 5*b*) a second indicator of the second vehicle 48 driving impaired.

In some embodiments, a vehicle guidance system is configured to receive a first impaired driving indicator. A vehicle guidance system can comprise a first vehicle 5*a* comprising a first lane position detection system 7*a* having at least one of a first camera 11, a first radar 8 and a first lidar 9. The first lane position detection system 7*a* can be configured to record a first path (e.g., 51*a*, 51*b*, 51*c*, 51*d*, 51*e*, or 51*f*) of a second vehicle 48 as the first vehicle 5*a* and the second vehicle 48 travel on a first road 54. A vehicle guidance system can comprise a processor system (e.g., 35 and/or 26) configured to analyze a first deviation of the first path (e.g., 51*a*, 51*b*, 51*c*, 51*d*, 51*e*, or 51*f*) of the second vehicle 48 relative to a first lane of the first road 54.

FIG. 8 illustrates exaggerated deviations 55, 56, 57 to enable people to see the deviations 55, 56, 57. Deviations can be measured as departures from a typical path of vehicles in a particular lane, departures from a center of a lane, differences in distances 50*a*, 50*b*, 50*c*, 50*d*, 50*e* to lane markers 59, movements back and forth across a median and/or average travel path 53 of a vehicle 48, movements toward a left side of a lane, movements toward a right side of a lane, and any departure away from a direction of the road 54.

If a road is configured to enable cars to drive directly west, then the direction of the road 54 is directly west. Some roads enable travel in opposite directions, which means that one side of the road may head directly west (and have a west direction) and the other side of the road may head directly east (and have an east direction).

In some embodiments, a first vehicle 5*a* detects indications that a second vehicle 48 is impaired and records characteristics of the second vehicle 48. The characteristics (e.g., a license plate number or a digital description of a physical appearance of the second vehicle 48) are sent to a third vehicle 5*b*. Later, the third vehicle 5*b* recognizes the second vehicle 48, follows the second vehicle 48, and warns other vehicles (e.g., a fourth vehicle 5*c*) about the second vehicle 48. This warning can be in the form of a wireless communication (which can be a direct wireless radio communication) from the third vehicle 5*b* to any vehicle within a communication range of the third vehicle 5*b*. This warning can be in the form of a wireless communication (which can be an indirect wireless communication) from the third vehicle 5*b* to any vehicle within a predetermined distance of the third vehicle 5*b*. The communication can prompt other vehicles to take extra precautions around the second vehicle 48 and/or can prompt other vehicles to keep away from the second vehicle 48.

In some cases, a first deviation recorded by the first vehicle 5*a* may not be sufficient evidence to suspect that the second vehicle 48 is impaired. Later, a third vehicle 5*b* may encounter the same second vehicle 48. The third vehicle 5*b* can collect additional evidence about the driving of the second vehicle 48. Analyzing this additional evidence in light of the evidence recorded by the first vehicle 5*a* may be sufficient to determine that the second vehicle 48 is impaired (even though the evidence collected by just the first vehicle 5*a* was insufficient).

Some embodiments comprise comparing the first and second deviations to identify paths indicative of impaired driving. Some embodiments comprise sending a communication configured to prompt the fourth vehicle 5*c* to keep away from the second vehicle 48 in response to comparing the first and second deviations and/or in response to the first deviation and the second deviation being indicative of impaired driving.

In some embodiments, a vehicle guidance system comprises a third vehicle 5*b* comprising a second lane position detection system 5*b* having at least one of a second camera 11, a second radar 8 and a second lidar 9. The second lane position detection system 5*b* can be configured to record a second path of the second vehicle 48 as the third vehicle 5*b* and the second vehicle 48 travel on a second road. The processor system (e.g., 35 and/or 26) can be configured to analyze a second deviation of the second path of the second vehicle 48 relative to a second lane of the second road.

In some embodiments, a vehicle guidance system comprises a communication system (e.g., 16 and/or 39) configured to send a first communication to a fourth vehicle 5*c* in response to the first deviation being greater than a first predetermined threshold and the second deviation being greater than a second predetermined threshold. The first communication can be configured to prompt the fourth vehicle 5*c* to alter a first driving route of the fourth vehicle 5*c* to keep away from the second vehicle 48.

Figure 9:
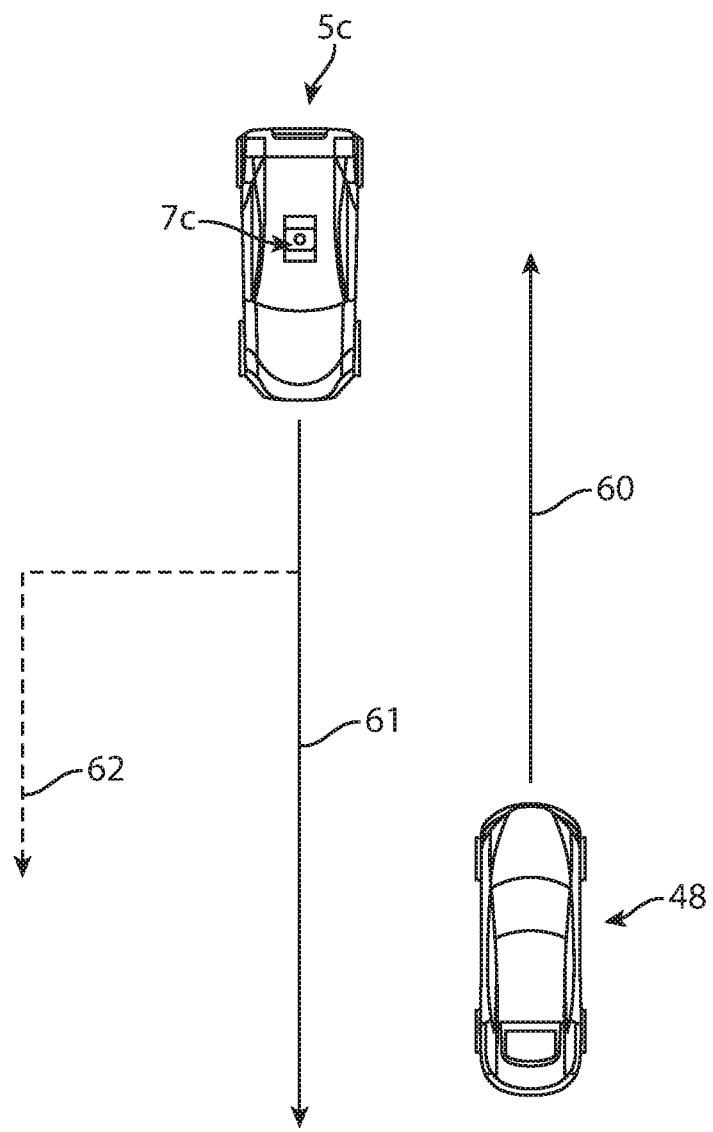
FIG. 9 illustrates a top view of driving routes, according to some embodiments

FIG. 9 illustrates a top view of the second vehicle 48 having a driving route 60. The fourth vehicle 5*c* has an original driving route 61 that could bring the fourth vehicle 5*c* within a close range of the potentially impaired driver of the second vehicle 48. In response to receiving the first communication, the fourth vehicle 5*c* alters its driving route to keep away from the second vehicle (e.g., as indicated by the updated driving route 62 shown by the broken line). Altering the driving route can comprise changing lanes to keep away from the second vehicle 48. Altering the driving route can comprise changing roads to keep away from the second vehicle 48.

In some embodiments, the first lane position detection system 7*a* is configured to compensate for motion of the first vehicle 5*a* to determine a speed of the second vehicle 48. The first lane position detection system 7*a* can be configured to compensate for the motion of the first vehicle 5*a* to determine movements of the second vehicle 48 toward at least one of a left side of the first lane and a right side of the first lane. (Deviations 55, 56, 57 in FIG. 8 illustrate embodiments of deviations toward at least one of a left side of a first lane and a right side of the first lane.) The processor system (e.g., 35 and/or 26) can be configured to analyze the first deviation based on the speed and the movements.

To increase the clarity of certain items in FIG. 6, not all of the lane markers 59 are labeled. Lane markers 59 can included dashed painted lines, solid painted lines, reflectors, guard rails, cement median barriers, traffic cones and any other item used to indicate to drivers and/or to self-driving vehicles where lanes are located. In some cases, lanes are marked by digital beacons that enable self-driving vehicles to detect a left side, a center, and/or a right side of a lane.

In some embodiments, the first lane position detection system 7*a* comprises a first camera 11. The first camera 11 of the first vehicle 5*a* can be configured to record lane markers 59 of the first lane. The first camera 11 can be configured to record the first path (e.g., 51*a*, 51*b*, 51*c*, 51*d*, 51*e*, or 51*f*) of the second vehicle 48 to enable the processor system (e.g., 35 and/or 26) to analyze the first deviation by comparing the first path (e.g., 51*a*, 51*b*, 51*c*, 51*d*, 51*e*, or 51*f*) relative to positions of the lane markers 59.

In some embodiments, the first lane position detection system 7*a* comprises the first camera 11 and at least one of the first lidar 9 and the first radar 8. The first camera 11 can be configured to identify lane markers 59 of the first lane.

In some embodiments, the first lidar 9 is configured to identify the first path (e.g., 51a, 51b, 51c, 51d, 51e, or 51f) of the second vehicle 48 to enable the processor system (e.g., 35 and/or 26) to analyze the first deviation by comparing the first path (e.g., 51a, 51b, 51c, 51d, 51e, or 51f) relative to positions of the lane markers 59.

In some embodiments, the first radar 8 is configured to identify the first path (e.g., 51a, 51b, 51c, 51d, 51e, or 51f) of the second vehicle 48 to enable the processor system (e.g., 35 and/or 26) to analyze the first deviation by comparing the first path (e.g., 51a, 51b, 51c, 51d, 51e, or 51f) relative to positions of the lane markers 59.

In some embodiments, a vehicle guidance system comprises a communication system (e.g., 16 and/or 39) configured to send a first communication to a fourth vehicle 5c in response to the first deviation being greater than a predetermined threshold and/or indicative of impaired driving. The first communication can be configured to prompt the fourth vehicle 5c to alter a first driving route of the fourth vehicle 5c to keep away from the second vehicle 48. The first communication can be configured to prompt the fourth vehicle 5c to move away from the second vehicle 48.

In some embodiments, the first camera 11 of the first vehicle 5a is configured to take an image of the second vehicle 48. An image can be a still picture and/or a video. The vehicle guidance system can comprise an image analysis system configured to identify at least one characteristic of the second vehicle 48 by analyzing the image taken by the first vehicle 5a.

The image may show a color of the second vehicle 48. The characteristic can be the color of the second vehicle 48.

The image may show one or more views of the second vehicle 48. The image analysis system can analyze the views of the second vehicle 48 to determine a make, model, and approximate year of the second vehicle 48. For example, the image may show a vehicle that the image analysis determines is a 2013 Blue Toyota Tundra. The characteristic can be data that communicates "2013 Blue Toyota Tundra" so other vehicles can recognize the impaired vehicle.

In some embodiments, the characteristic is a license plate identification (that can include numbers and letters). The license plate identification can be something like "DFJ2389" or any other combination of letters and numbers. Receiving the license plate identification can enable other vehicles (e.g., a fourth vehicle 5c) to recognize the impaired vehicle (e.g., by the fourth vehicle 5c using a camera 11 to take a picture of the impaired vehicle and then using image analysis software to identify the numbers and letters on the license plate of the impaired vehicle).

In some embodiments, the communication system (e.g., 16 and/or 39) is configured to send a second communication having the at least one characteristic to the fourth vehicle 5c to enable the fourth vehicle 5c to keep away from the second vehicle 48 in response to receiving the first communication and in response to identifying the second vehicle 48 based on the at least one characteristic of the second communication.

In some embodiments, the least one characteristic comprises at least one of a color of the second vehicle 48, a shape of the second vehicle 48, a license plate identification of the second vehicle 48, a make of the second vehicle 48, and a model of the second vehicle 48.

In some embodiments, the vehicle guidance system comprises a database 33 having vehicle characteristic data. The vehicle guidance system can be configured to compare the at least one characteristic of the second vehicle 48 to the database 33 to determine physical identification information of the second vehicle 48 that is more precise than the at least one characteristic.

For example, the characteristic could just be one view of the impaired vehicle. The system can compare the one view to the vehicle characteristic data in the database 33 to identify more precise information about the vehicle (e.g., to identify the make and model of the vehicle and/or to identify three dimensional data regarding the vehicle). Then, the system can send the physical identification information that includes the make of the vehicle, the model of the vehicle, data regarding the three dimensional shape of the vehicle and/or that includes views of all sides of the vehicle (rather than just the one view of the impaired vehicle). This more precise information can enable other vehicles (e.g., the fourth vehicle 5c) to be more likely to successfully recognize the impaired vehicle in the near future.

Lidar and radar can be used to create a three dimensional representation of a shape of a vehicle. This shape information can be used to enable others to identify the vehicle (e.g., by detecting a similar shape).

In some embodiments, the first lane position detection system 7a comprises at least one of the first lidar 9 and the first radar 8. At least one of the first lidar 9 and the first radar 8 can be configured to detect an indication of a shape of the second vehicle 48.

In some embodiments, the vehicle guidance system comprises a database 33 having vehicle shape data. The vehicle guidance system can be configured to compare the indication of the shape to the vehicle shape data to determine physical identification information of the second vehicle 48.

In some embodiments, a communication system (e.g., 16 and/or 39) is configured to send a second communication comprising the physical identification information to the fourth vehicle 5c to enable the fourth vehicle 5c to keep away from the second vehicle 48 in response to receiving the first communication and in response to identifying the second vehicle 48 based on the physical identification information.

Even if a vehicle is impaired, other vehicles do not necessarily need to be bothered with an impaired vehicle warning if the other vehicles are located far away from the impaired vehicle.

In some embodiments, the vehicle guidance system comprises a location tracking system configured to receive a first location indicator of the second vehicle 48. The location tracking system can be configured to receive a second location indicator of the fourth vehicle 5c.

In some embodiments, the communication system (e.g., 16 and/or 39) can be configured to send the first communication to the fourth vehicle 5c in response to the location tracking system determining, based on the first location indicator and the second location indicator, that the fourth vehicle 5c is within a first predetermined distance of the second vehicle 48.

In some embodiments, the vehicle guidance system comprises a location tracking system configured to monitor a second driving route of the second vehicle 48 and configured to monitor the first driving route of the fourth vehicle 5c.

Monitoring the second driving route of the second vehicle 48 might comprise collecting data regarding a location of the second vehicle 48 and a direction in which the second vehicle 48 is heading (e.g., the second vehicle 48 is located at 2121 Main Street and is heading south).

Many self-driving vehicles, which periodically recognize the second vehicle 48, can monitor a second driving route of the second vehicle 48. After one self-driving vehicle stops detecting the second vehicle 48 (e.g., because the second vehicle 48 turned onto a different street and thereby moved away from the self-driving vehicle) another self-driving vehicle (that is on the different street) may soon detect the second vehicle 48.

In some embodiments, a third self-driving vehicle 5*b* follows the second vehicle 48 (e.g., as the second vehicle 48 drives down a road) to monitor a second driving route of the second vehicle 48.

In some embodiments, the communication system (e.g., 16 and/or 39) is configured to send the first communication to the fourth vehicle 5*c* in response to the location tracking system predicting, based on the first driving route and the second driving route, that the fourth vehicle 5*c* would come within a predetermined distance of the second vehicle 48. The predetermined distance can be greater than 10 feet, greater than 100 feet, less than 500 feet, less than 1 mile and/or less than 5 miles.

In some embodiments, the first lane position detection system 7*a* is configured to compensate for motion of the first vehicle 5*a* to determine a speed of the second vehicle 48 and to determine movements of the second vehicle 48 toward at least one of a left side of the first lane and a right side of the first lane. The processor system (e.g., 35 and/or 26) can be configured to analyze the movements compared to the speed to determine that the first path (e.g., 51*a*, 51*b*, 51*c*, 51*d*, 51*e*, or 51*f*) relative to the first lane fluctuates more than a speed-relative threshold.

Traveling faster can magnify the deviations due to a driver being impaired. For example, if front wheels of the second vehicle 48 are pointed three degrees away from a central axis of a lane for two seconds, the deviation towards the left (or right) side of the road will be far greater if the second vehicle 48 is traveling at 75 miles per hour than if the second vehicle 48 is traveling at 25 miles per hour. (The central axis of the lane runs along the middle of the line in the direction of the lane.) Thus, analyzing the movements (toward at least one of a left side of the first lane and a right side of the first lane) compared to the speed can result in much more actionable data. A speed-relative threshold is a threshold that is higher (or lower) at a high speed than at a low speed.

In some embodiments, the vehicle guidance system further comprises a communication system (e.g., 16 and/or 39) configured to send a first communication to a fourth vehicle 5*c* in response to the first path (e.g., 51*a*, 51*b*, 51*c*, 51*d*, 51*e*, or 51*f*) fluctuating more than the speed-relative threshold. The first communication can be configured to prompt the fourth vehicle 5*c* to alter a first driving route of the fourth vehicle 5*c* to keep away from the second vehicle 48.

Some embodiments comprise methods of using a vehicle guidance system. Some embodiments comprise receiving from a first vehicle 5*a*, by the vehicle guidance system, a first indicator of a second vehicle 48 driving impaired; and/or receiving from a third vehicle 5*b*, by the vehicle guidance system, a second indicator of the second vehicle 48 driving impaired.

Some embodiments comprise determining to send a first communication in response to analyzing the first indicator and the second indicator. Analyzing data from both the first vehicle 5*a* and the third vehicle 5*b* can provide more accurate impairment predictions than only analyzing data from the first vehicle 5*a* or the third vehicle 5*b*.

Some embodiments comprise sending, from the vehicle guidance system to a fourth vehicle 5*c*, a first communication configured to prompt the fourth vehicle 5*c* to alter a first driving route of the fourth vehicle 5*c* to keep away from the second vehicle 48 in response to determining, by the vehicle guidance system, that the first indicator and the second indicator are indicative of impaired driving. Some embodiments comprise sending, from the vehicle guidance system to the fourth vehicle 5*c*, the first communication in response to analyzing data from both the first vehicle 5*a* and the third vehicle 5*b*.

In some embodiments, determining that the first indicator is indicative of impaired driving comprises: recording, by the first vehicle 5*a*, a first path (e.g., 51*a*, 51*b*, 51*c*, 51*d*, 51*e*, or 51*f*) of the second vehicle 48 relative to lane markers 59 as the first vehicle 5*a* and the second vehicle 48 travel on a first road 54; compensating for motion of the first vehicle 5*a* to determine a speed of the second vehicle 48; compensating for the motion of the first vehicle 5*a* to determine movements of the second vehicle 48 toward at least one of a left side of the first road 54 and a right side of the first road 54; and/or analyzing the movements compared to the speed to determine that the first path (e.g., 51*a*, 51*b*, 51*c*, 51*d*, 51*e*, or 51*f*) relative to the lane markers 59 fluctuates more than a speed-relative threshold.

As used herein, "fluctuate" is used broadly and means to shift back and forth (e.g., toward a left side of a road and/or toward a right side of the road).

In some embodiments, the first indicator comprises lane control data based on the first vehicle 5*a* recording a first path (e.g., 51*a*, 51*b*, 51*c*, 51*d*, 51*e*, or 51*f*) of the second vehicle 48 relative to lane markers 59 as the first vehicle 5*a* and the second vehicle 48 travel on a first road 54. Some embodiments comprise analyzing, by at least one of the vehicle guidance system and the first vehicle 5*a*, the first path (e.g., 51*a*, 51*b*, 51*c*, 51*d*, 51*e*, or 51*f*) relative to the lane markers 59.

As used herein, "lane control data" is used broadly and refers to data regarding how well a vehicle stays within a center of a lane. Exiting a lane indicates poor lane control. Fluctuating back and forth in a lane indicates poor lane control.

In some embodiments, the second indicator comprises lane exit data based on the third vehicle 5*b* recording the second vehicle 48 exiting a lane of a second road. and then reentering a lane of a second road. The second indicator can comprise lane exit data based on the third vehicle 5*b* recording the second vehicle 48 exiting a lane of a second road and then reentering the lane of the second road.

As used herein, "lane exit data" is used broadly and refers to data a vehicle exiting a lane (e.g., inadvertently). Switching lanes without using a blinker is evidence of inadvertently exiting a lane. Exiting a lane and then immediately reentering the lane is evidence of inadvertently exiting a lane.

In some embodiments, the second indicator comprises detecting, by the third vehicle 5*b*, that the second vehicle 48 is traveling (e.g., moving) on a second road at least five miles per hour slower than a speed limit of the second road. In some embodiments, the second indicator comprises detecting, by the third vehicle 5*b*, that the second vehicle 48 is traveling on a second road at least five miles per hour faster than the speed limit of the second road. A vehicle that is moving 75 miles per hour is traveling 75 miles per hour. The traveling speed is the instantaneous speed (not, for example, an average speed over a period of time).

In some embodiments, the second indicator comprises detecting, by the third vehicle 5*b*, that the second vehicle 48 is traveling at night without illuminated headlights. "Without illuminated headlights" means that the headlights are not "turned on."

In some embodiments, the first indicator comprises lane control data based on the first vehicle 5a recording a position of the second vehicle 48 as the second vehicle 48 travels in a lane of a first road 54. Embodiments can comprise analyzing, by at least one of the vehicle guidance system and the first vehicle 5a, a deviation of a first path (e.g., 51a, 51b, 51c, 51d, 51e, or 51f) of the second vehicle 48 along the lane relative to lane markers 59 of the first road 54.

In some embodiments, the first indicator comprises lane control data based on the first vehicle 5a recording a position of the second vehicle 48 as the second vehicle 48 travels in a lane of a first road 54. Embodiments can comprise analyzing, by at least one of the vehicle guidance system and the first vehicle 5a, a deviation of a first path (e.g., 51a, 51b, 51c, 51d, 51e, or 51f) of the second vehicle 48 along the lane relative to a typical path along the lane.

As used herein, the "typical path" is a theoretical path based on data from multiple vehicles that travel in the lane. Embodiments can comprise formulating, by the vehicle guidance system, the typical path along the lane by aggregating lane position data of automobiles as the automobiles travel along the lane. For example, the typical path can be an average path or median path of many cars as they travel along the lane.

As used herein, an "automobile" can be any type of vehicle.

In some embodiments, the first indicator comprises speed data based on the first vehicle 5a recording a speed of the second vehicle 48. Embodiments can comprise determining, by at least one of the vehicle guidance system and the first vehicle 5a, that the speed is at least one of at least eight miles per hour faster and at least eight miles slower than a speed limit of a location of the second vehicle 48.

Speeding up or slowing down when unnecessary, too often or at odd times (e.g., when not warranted by the road, road signs, or traffic) can be an indication of impaired driving. In some embodiments, the first indicator comprises acceleration data based on the first vehicle 5a recording an acceleration of the second vehicle 48. Embodiments can comprise analyzing, by at least one of the vehicle guidance system and the first vehicle 5a, changes in the acceleration to enable the vehicle guidance system to determine that the first indicator is indicative of the impaired driving.

In some embodiments, the first indicator comprises a first lane control data based on the first vehicle 5a recording a first path (e.g., 51a, 51b, 51c, 51d, 51e, or 51f) of the second vehicle 48 as the second vehicle 48 travels in a first lane of a first area. Embodiments can comprise analyzing, by at least one of the vehicle guidance system and the first vehicle 5a, a first deviation of the first path (e.g., 51a, 51b, 51c, 51d, 51e, or 51f) relative to the first lane. The second indicator can comprise a second lane control data based on the third vehicle 5b recording a second path of the second vehicle 48 as the second vehicle 48 travels in a second lane of a second area. Embodiments can comprise analyzing, by at least one of the vehicle guidance system and the third vehicle 5b, a second deviation of the second path relative to the second lane.

Some embodiments comprise, in response to analyzing the first deviation and the second deviation, sending, from the vehicle guidance system to a fourth vehicle 5c, a first communication configured to prompt the fourth vehicle 5c to keep away from the second vehicle 48.

Some embodiments comprise sending, from the vehicle guidance system to the fourth vehicle 5c, the first communication in response to considering (e.g., by at least one of the vehicle guidance system, the first vehicle 5a, and the third vehicle 5b) a combined evidence of both the first deviation and the second deviation.

As used herein, "combined evidence" is evidence that is used together (e.g., to enable a decision as to whether a deviation of a vehicle is so large that the deviation is indicative of the driver being impaired). For example, a first deviation could be suspect, but too low to conclude that the driver is likely impaired and too low to justify warning other vehicles. The first deviation combined with a second suspect deviation could be strong enough combined evidence to conclude that other vehicles should stay away from the deviating vehicle.

In some cases, compound evidence of driving of the second vehicle 48 (based on information from multiple vehicles 5a, 5b can be a far better predictor of impaired driving than evidence from a single vehicle (e.g., 5a or 5b).

As used herein, "compound evidence" is created by combining evidence from multiple vehicles (e.g., 5a and 5b).

Some embodiments comprise receiving, by the vehicle guidance system, from the first vehicle 5a a first location indicator of the second vehicle 48; determining, by the vehicle guidance system based on the first location indicator, that a fourth vehicle 5c is within a first predetermined distance of the second vehicle 48; and/or in response, sending, from the vehicle guidance system to the fourth vehicle 5c, a first communication configured to prompt the fourth vehicle 5c to alter a first driving route of the fourth vehicle 5c to keep away from the second vehicle 48.

In some embodiments, the first location indicator might not be an exact location, but might be a location of the first vehicle 5a when the first vehicle 5a recorded the second vehicle 48. In some embodiments, the first location indicator can include a direction in which the second vehicle 48 was traveling (e.g., when recorded by the first vehicle 5a).

Some embodiments comprise receiving, by the vehicle guidance system, from the first vehicle 5a a first location indicator of the second vehicle 48; receiving, by the vehicle guidance system, a second location indicator of a fourth vehicle 5c; determining, by the vehicle guidance system based on the first location indicator and the second location indicator, that the fourth vehicle 5c is on a first driving route that would come within a predetermined distance of the second vehicle 48; and/or in response sending, from the vehicle guidance system to the fourth vehicle 5c, a first communication configured to prompt the fourth vehicle 5c to alter the first driving route of the fourth vehicle 5c to keep away from the second vehicle 48.

A system can be configured to receive a first impaired driving indicator (e.g., to enable police officers to identify and apprehend impaired drivers). The system can comprise a first vehicle 5a comprising a first lane position detection system 7a configured to generate three dimensional data representing an area outside the first vehicle 5a. In some embodiments, at least one of the radar 8 and the lidar 9 are used to generate three dimensional data representing an area outside the first vehicle 5a.

The first lane position detection system 7a can comprise at least one of a camera 11, a radar 8, and a lidar 9. The first lane position detection system 7a can be configured to track a first path of a second vehicle 48 as the first vehicle 5a and the second vehicle 48 travel on a first road 54.

The system can comprise a processor system 35 configured to analyze a first deviation of the first path of the second vehicle 48 relative to a first lane of the first road 54. The system can comprise a communication system 39 configured to send a communication to a third vehicle in response to the first deviation being greater than a first predetermined threshold. The communication can be configured to prompt the third vehicle to alter a first driving route of the third vehicle to keep away from the second vehicle 48 (to minimize the risk of the second vehicle 48 colliding with the third vehicle). Altering the first driving route to keep away from the second vehicle 48 can include updating a driving route to comprise a larger minimize distance (than the original driving route) from the second vehicle 48 to the third vehicle.

As used herein, "numerical analysis" refers to analysis that uses numbers, math, and/or mathematical formulas. Numerically analyzing refers to analyzing using numbers, math, and/or mathematical formulas.

Numerical analysis is used in some embodiments to analyze a path of a vehicle (e.g., as a vehicle moves, as a vehicle drives on a road). The numbers can be based on measurements (e.g., from a detection system). Program instructions can be configured to perform the numerical analysis. Numerical analysis can use addition, subtraction, algebra, geometry, calculus, statistics, probability, and other types of mathematical fields. Some embodiments of numerical analysis use differential equations. Some embodiments of numerical analysis use integration.

Some embodiments of numerical analysis use encrypted numbers. For example, the numbers can be encrypted such that "A" represents the number "1" and "B" represents the number "2." As used herein, encrypted numbers types of are numbers.

FIG. 10 illustrates a table comprising some embodiments of numerical position data. Of course, other types of numerical position data can be used with the embodiments described herein. Many different types of numerical position data can be used with the embodiments described herein and/or incorporated by reference.

FIG. 10 illustrates a Time column with time data in seconds. The "Y" position of a vehicle 48 is shown in the second column. In some embodiments, the "Y" position represents a position along the length of the lane in which the vehicle 48 is traveling. For example, if a vehicle 48 drives along a center of a lane of a road, the vehicle 48 would travel in the "Y" direction.

The "X" position is oriented perpendicular to the "Y" position in the embodiment illustrated in FIG. 10. The "X" position can be represented in many different ways (only some of which are included in FIG. 10). For example, the third column (i.e., the middle column) in FIG. 10 shows a distance "X" measured by the detection system 7a of a first vehicle 5a (or by a detection system 7e illustrated in FIGS. 13-15) from a centroid of the vehicle 48 to a lane marker.

The fourth column shows a distance "X" measured by the detection system 7a of a first vehicle 5a (or by a detection system 7e illustrated in FIGS. 13-15) from a centroid of the vehicle 48 to a center of the lane in which the vehicle 48 is driving.

Some embodiments, however, do no use lane marker position data. The fifth column (i.e., the right column) shows a distance "X" measured by the detection system 7a of a first vehicle 5a (or by a detection system 7e illustrated in FIGS. 13-15) from a centroid of the vehicle 48 to an average "X" path of the vehicle 48.

Figure 11:
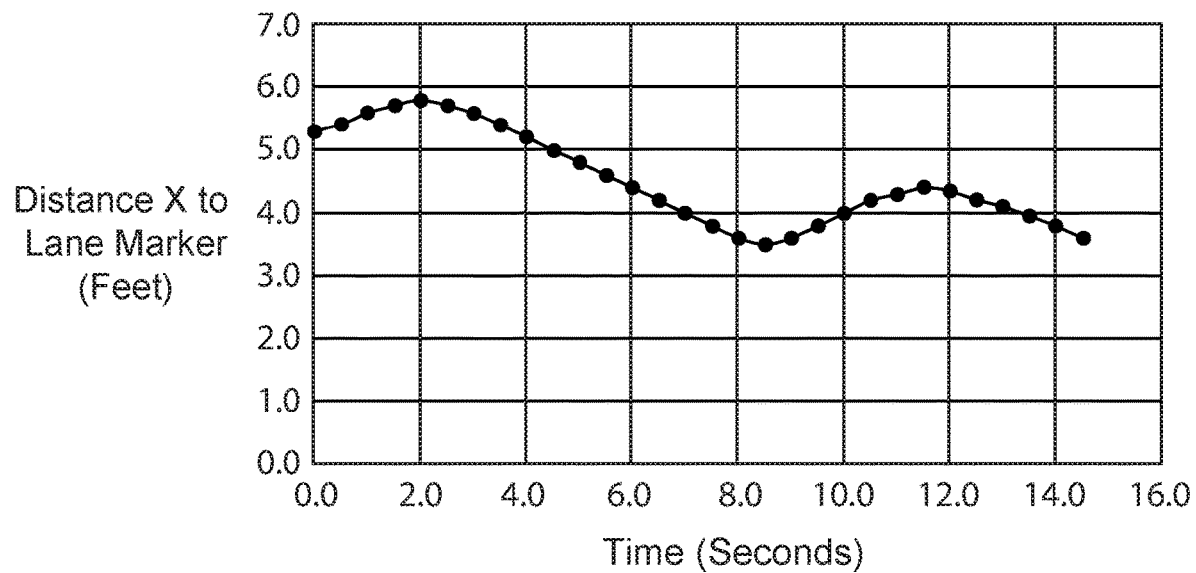
FIGS. 11 and 12 illustrate graphs indicative of a path of a vehicle, according to some embodiments.
Figure 12:
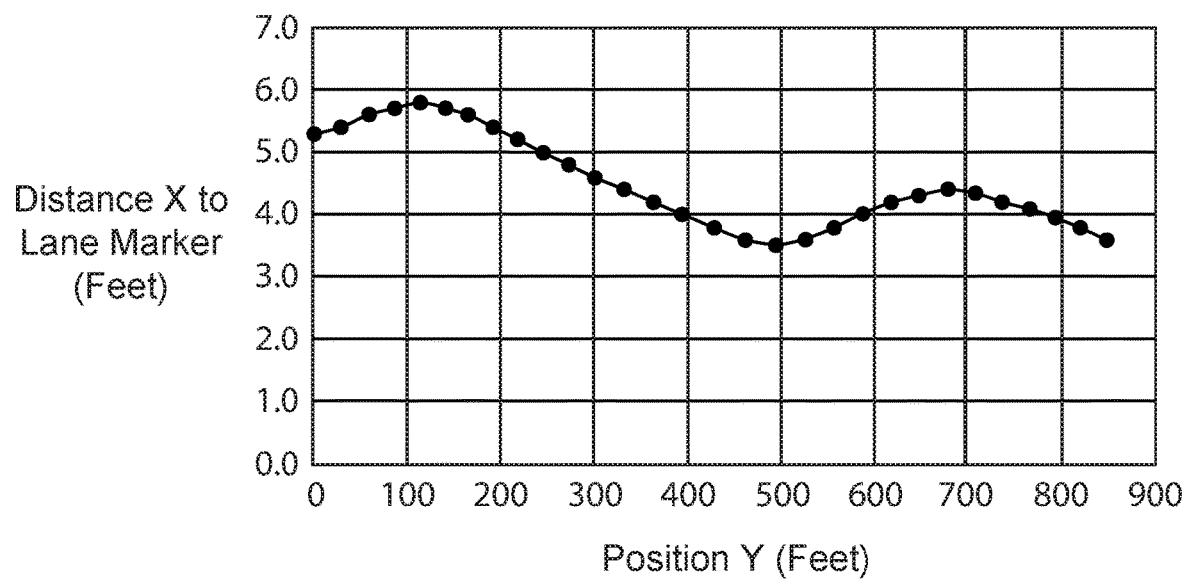

FIG. 11 illustrates the "X" distance to the lane markers relative to time data (from FIG. 10). FIG. 12 illustrates the "X" distance to the lane markers relative to "Y" position data (from FIG. 10). The dots in FIGS. 11 and 12 illustrate data (e.g., based on measurements from the detection system 7a of a first vehicle 5a or from the detection system 7e illustrated in FIGS. 13-15). The dots illustrate a path of the vehicle 48. The line connecting the dots in FIGS. 11 and 12 is a trend line. Some embodiments use mathematical interpolation between data points that are based on measurements.

The path data can be analyzed by program instructions to determine a veering characteristic of the path. As used herein, "veering" means moving leftward or rightward in a lane of a road. Many different types of veering characteristics can be analyzed by the program instructions.

Some veering characteristics are directed to how many times a vehicle 48 switches from moving leftward to rightward or from rightward to leftward over a given period of time. For example, FIG. 11 illustrates the vehicle 48 moving leftward in the lane, then moving rightward in the lane, then moving leftward in the lane, and then moving rightward in the lane.

Program instructions can be configured to determine that a veering characteristic is greater than (or less than) a veering threshold. In some embodiments, the veering threshold is a number of times a vehicle 48 switches from moving leftward to rightward or from rightward to leftward over a given period of time. Other embodiments use other types of veering thresholds.

Some veering characteristics are directed to how quickly the vehicle 48 moves rightward and/or leftward. Normalizing the leftward and rightward movements for the forward speed of the vehicle 48 can help establish a single speed-relative threshold. In some embodiments, different speed-relative thresholds are used for each speed (or groups of speeds). For example, one veering threshold can be used for 10 to 20 miles per hour, another veering threshold can be used for 20 to 30 miles per hour, another veering threshold can be used for 30 to 40 miles per hour, etc. Some embodiments use a mathematical formula to determine the speed-relative threshold for the precise speed of the vehicle 48.

Program instructions can be configured to determine that a veering characteristic is greater than (or less than) a veering threshold. In some embodiments, the veering threshold is based on how quickly the vehicle 48 moves rightward and/or leftward. The vehicle 48 can exceed the veering threshold by moving leftward very quickly and then moving rightward very quickly, which can be indicative of impaired driving (e.g., because an unimpaired driver would move leftward and/or rightward more slowly). Other embodiments use other types of veering thresholds.

Some embodiments use other types of veering characteristics to characterize leftward and rightward movements of the vehicle 48.

The path data can be analyzed by program instructions to determine a deviation of a path relative to a lane of a road. In some embodiments, the deviation of the path is based on the "X" distance measured from a centroid (or side) of the vehicle 48 to lane markers (e.g., as shown in the third column of FIG. 10). In some embodiments, the deviation of the path is based on the "X" distance to a center of a lane (e.g., as shown in the fourth column of FIG. 10). The program instructions can analyze other types of deviations of the path of the vehicle 48.

Program instructions can be configured to determine that a deviation (e.g., of a path relative to a lane of a road) is greater than (or less than) a predetermined threshold. In some embodiments, the threshold is a percentage of time that a centroid of the vehicle 48 is more than 2 feet from a center of a lane of the road. In some embodiments, the threshold is an average distance of a centroid of the vehicle 48 from a center of the lane of the road. In some embodiments, the threshold is an average distance of a side of the vehicle 48 from an edge of a lane (where the "edge" is indicated by lane markers detected by a camera system). Other embodiments use other types of deviation thresholds.

Figure 13:
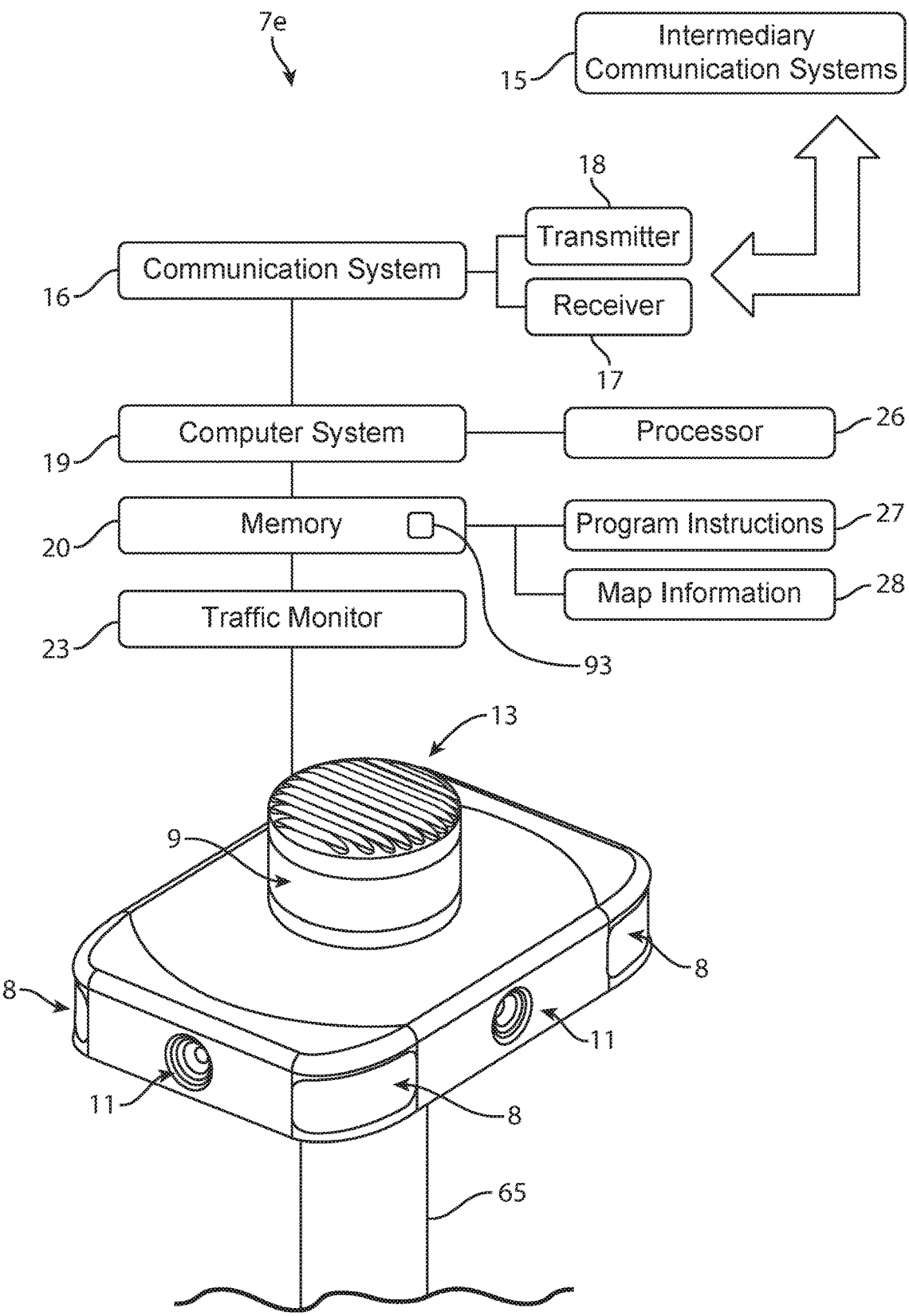
FIG. 13 illustrates a diagrammatic view of portions of a detection system, according to some embodiments.
Figure 14:
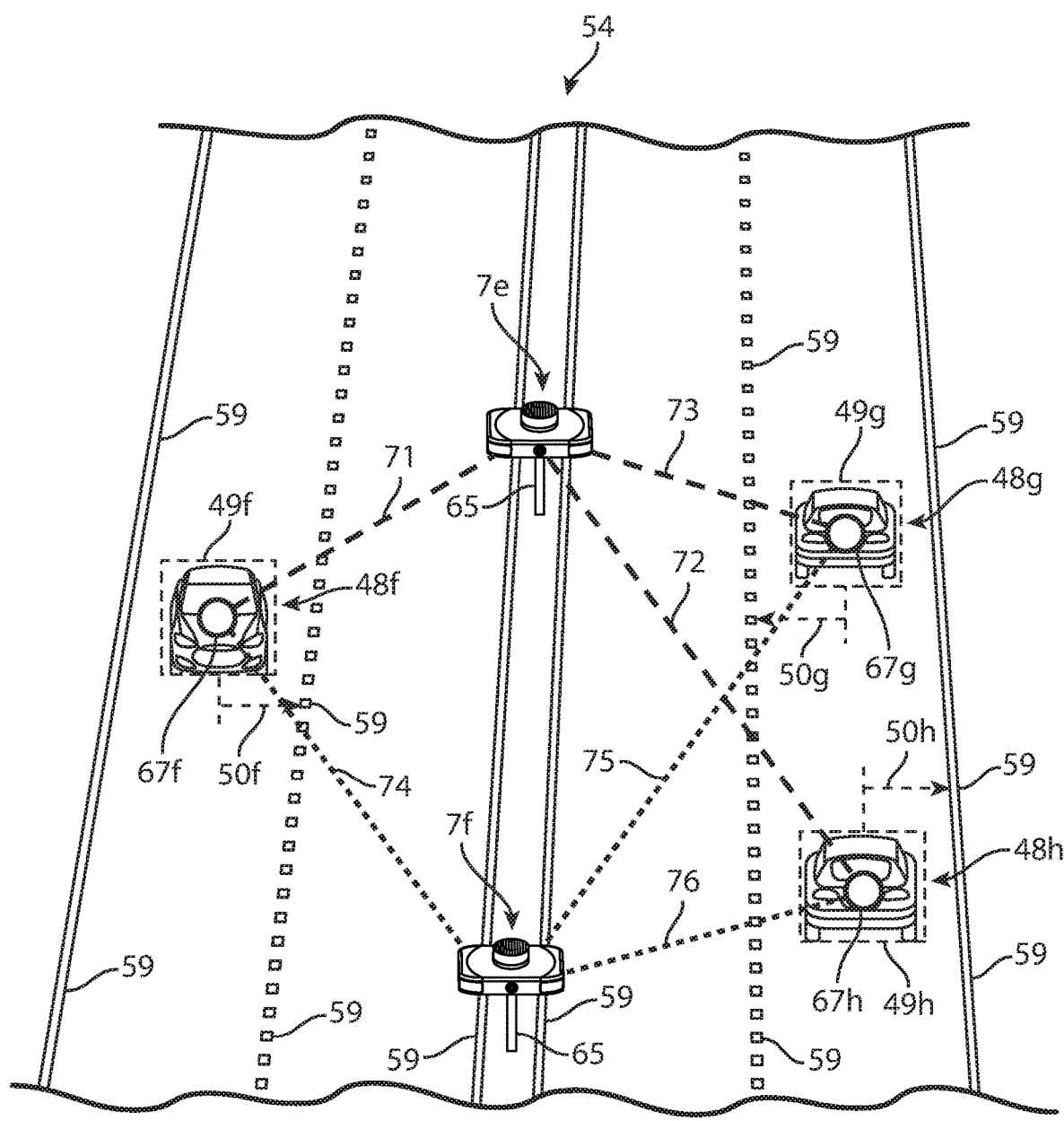
FIG. 14 illustrates a perspective view of vehicles driving on a road, according to some embodiments.
Figure 15:
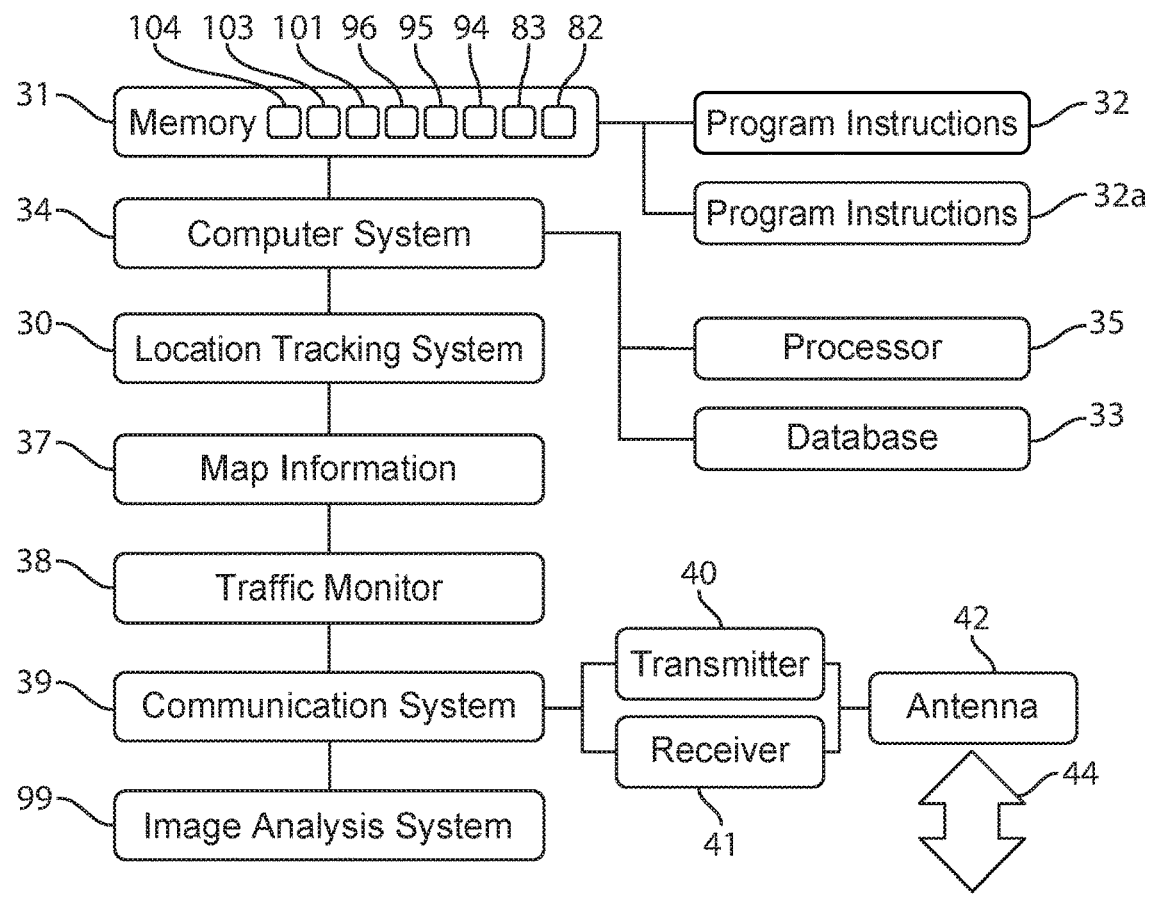
FIG. 15 illustrates a diagrammatic view of a system that can include many detection systems and many vehicles, according to some embodiments.
Figure 15:
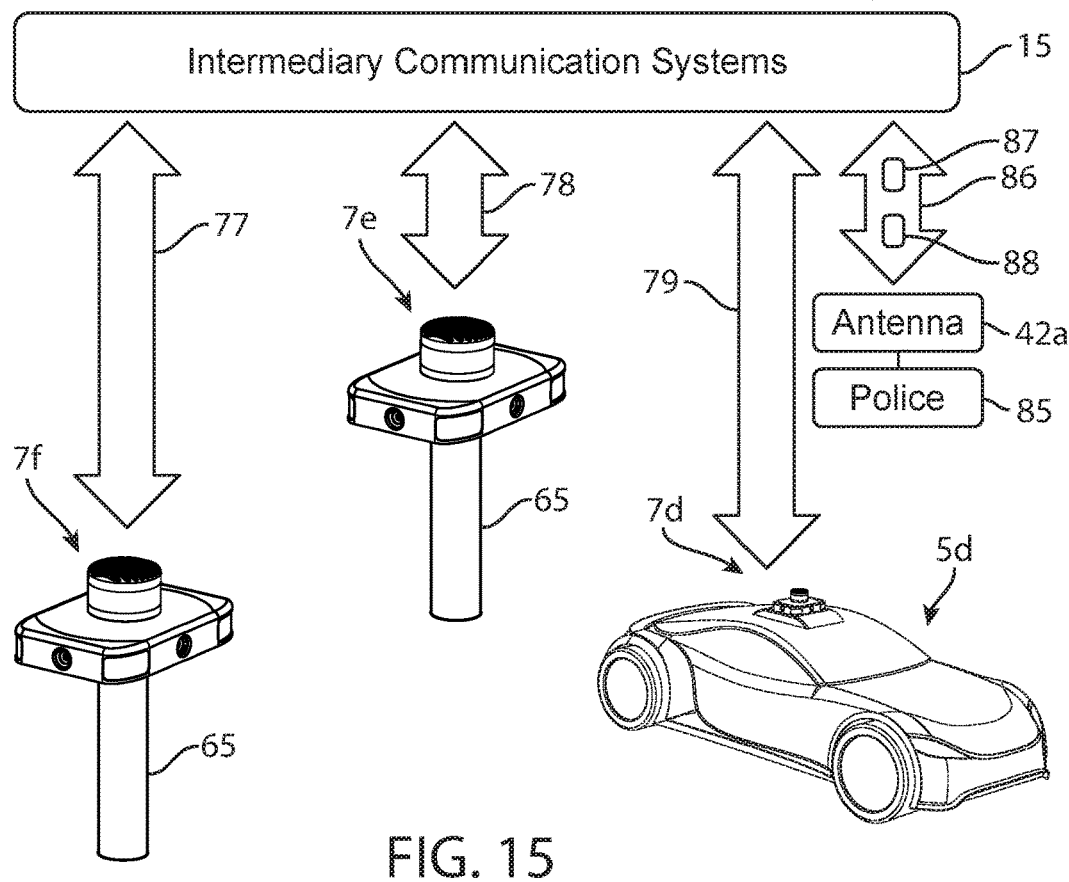

FIGS. 13-15 illustrate portions of detection systems 7e, 7f according to some embodiments. The detection systems 7e, 7f can include any of the features, systems, and components described in the context of other detection systems and/or vehicles described herein and/or incorporated by reference.

The detection systems 7e, 7f are not necessarily mobile although in some embodiments, the detection systems 7e, 7f are coupled to trailers to enable vehicles to transport the detection systems 7e, 7f (e.g., to roadside locations) and/or are placed on or inside vehicles.

The detection systems 7e, 7f can be coupled to supports 65, which can be poles, traffic light support structures, trailers, and/or any devices configured to mount the detection systems 7e, 7f near or above a roadway to enable the detection systems 7e, 7f to detect paths of vehicles 48.

FIG. 13 illustrates a diagrammatic view of portions of a detection system 7e. The detection system 7e can comprise radar 8, lidar 9, ultrasonic sensors, cameras 11, and any other sensing devices configured to enable the detection system 7e to detect objects.

The detection system 7e can comprise a communication system 16 that has a transmitter 18 and a receiver 17, a computer system 19 that has a processor 26, a memory 20 that has program instructions 27, and a traffic monitor 23.

The communication system 16 can be configured to communicate with a vehicle monitoring system. The communication system 16 can be configured to communicate with a remote computing device of a rider. The communication system 16 can use an antenna 13 to communicate with other vehicles and other devices (such as a vehicle monitoring system and remote computing devices) via intermediary communication systems 15.

FIG. 14 illustrates a perspective view of vehicles 48f, 48g, 48h driving on a road 54 that has four lanes. Detection systems 7e, 7f can be mounted on supports 65 in a median of the road 54, above the road 54 (e.g., on support structures that hang over the road 54), on a side of the road 54, and/or in any location such that the detection systems 7e, 7f can detect the vehicles 48f, 48g, 48h.

In some embodiments, a first detection system 7e is placed in a first location and a second detection system 7f is placed in another location that is at least 50 feet away from the first location, less than 1000 feet away from the first location, at least one mile away from the first location, and/or on a different road than the first location.

A vehicle guidance system can consider the collective evidence of numerical position data from the first detection system 7e (regarding a first impaired vehicle 48f) and numerical position data from the second detection system 7f (regarding the first impaired vehicle 48f) to determine whether the vehicle guidance system should warn other vehicles regarding the first impaired vehicle 48f, prompt other vehicles to alter their driving routes to avoid the first impaired vehicle 48f, report the first impaired vehicle 48f to a government entity, fine the first impaired vehicle 48f, and/or take other actions.

The first detection system 7e can use a camera 11 to take a first picture of the license plate of the first impaired vehicle 48f. The second detection system 7f can use a camera to take a second picture of the license plate of the first impaired vehicle 48f. An image analysis system 43 (shown in FIG. 5) can analyze the first picture and the second picture to determine that both pictures show the same license plate number, which can enable the vehicle guidance system to aggregate path information from multiple detection systems 7e, 7f to more accurately determine if the vehicle 48f is impaired than would typically be the case from only using path information (regarding the vehicle 480 from one detection system 7e. Some embodiments use one detection system, two detection systems, several detection systems, thousands of detection systems, and/or any number of detection systems to form a vehicle guidance system that can track and analyze path information for many vehicles. The resulting system is nearly impossible for a drunk driver to evade for long.

The first detection system 7e detects several vehicle 48f, 48g, 48h (e.g., as indicated by lines 71, 72, 73). Although not noticeable to a human, one of the vehicles 48f has an impaired driver.

The detection system 7e can detect an outline 49f, 49g, 49h of each vehicle 48f, 48g, 48h using a camera 11, radar 8, and/or lidar 9. (The outlines 49f, 49g, 49h are depicted by broken line boxes in FIG. 14.) Detecting the outlines 49 can enable the detection system 7a to detect a center (e.g., a centroid 67f, 67g, 67h) of each vehicle 48f, 48g, 48h. (The centroids 67f, 67g, 67h are depicted by circles in the middle of outlines 49f, 49g, 49h in FIG. 14.)

Measuring distances 50f, 50g, 50h from the vehicles 48f, 48g, 48h to lane markers 59 enables the detection system 7e to track paths of the vehicles 48f, 48g, 48h. Some embodiments comprise measuring from a lane marker 59 to a nearest portion of each vehicle 48f, 48g, 48h or to a nearest portion of an outline 49 of each vehicle 48f, 48g, 48h.

The second detection system 7f detects several vehicle 48f, 48g, 48h (e.g., as indicated by lines 74, 75, 76). In some but not all cases, data from both detection systems 7e, 7f may be necessary to identify that one of the vehicles 48f has an impaired driver.

The detection systems 7e, 7f in FIG. 14 are illustrated as being close together. In some embodiments, the detection systems 7e, 7f are on different roads, but a memory 31 stores path information and/or numerical position data from multiple detection systems 7e, 7f (from different times) to enable the vehicle guidance system to use the collective path evidence to identify that one of the vehicles 48f has an impaired driver.

FIG. 15 illustrates a diagrammatic view of a system that can include many detection systems 7e, 7f and many vehicles 5d. (In some embodiments, the vehicles 5d are self-driving vehicles.) If the system determines that a vehicle 48f (shown in FIG. 14) has an impaired driver, the system may dispatch a vehicle 5d to move toward and/or pull over the vehicle 48f.

Detection systems 7d, 7e, 7f can send communications 77, 78, 79 via intermediary communication systems 15 to the antenna 42. The antenna 42 can send communications 44 via intermediary communication systems 15 to the detection systems 7d, 7e, 7f.

Some embodiments comprise using a vehicle monitoring system that includes a first detection system (e.g., detection system 7, detection system 7a, detection system 7e, any detection system described herein). The first detection system can comprise at least one of a first camera, a first radar, and a first lidar. Embodiments can comprise detecting, by the first detection system, a first vehicle (e.g., vehicle 48); and/or analyzing, by the first detection system, a first path of the first vehicle. Embodiments can comprise recording, by the first camera, the first path.

Some embodiments comprise generating, by the vehicle monitoring system using at least one of the first camera, the first radar, and the first lidar of the first detection system, first numerical position data indicative of the first path of the first vehicle; and/or numerically analyzing, by the vehicle monitoring system, the first numerical position data.

In some embodiments, generating the first numerical position data comprises determining (e.g., based on measurements from the first detection system and/or based on calculations from program instructions) a first number indicative of a first location of the first vehicle at a first time, determining a second number indicative of a second location of the first vehicle at a second time that is within three seconds of the first time, and/or determining a third number indicative of a third location of the first vehicle at a third time that is within three seconds of the second time. Embodiments can comprise sending, by the vehicle monitoring system, an electronic communication (regarding driving behavior of the first vehicle) in response to numerically analyzing the first numerical position data.

Some embodiments comprise determining, by the first detection system based on the first numerical position data, that at least a first deviation characteristic of the first path exceeds a first predetermined threshold; and/or in response to the determining, sending, by the vehicle monitoring system, a first wireless communication to a second vehicle that is not mechanically coupled to the first detection system. The first wireless communication can be configured to at least one of warn the second vehicle regarding the first vehicle, report driving behavior information (regarding the first vehicle) to the second vehicle, provide data regarding an identity of the first vehicle to the second vehicle, and prompt the second vehicle to alter a first driving route of the second vehicle to keep away from the first vehicle. In some embodiments, the first predetermined threshold is a predetermined veering threshold.

Some embodiments comprise warning other self-driving vehicles. Some embodiments comprise notifying at least one police vehicle.

In some embodiments, the vehicle monitoring system comprises a computer system having at least one processor and a memory comprising program instructions. The program instructions can be configured such that when the program instructions are executed by the at least one processor, the program instructions analyze the first numerical position data.

Embodiments can comprise numerically analyzing, by the computer system using the first numerical position data, a first deviation of the first path of the first vehicle relative to a first lane of a first road; and/or in response to numerically analyzing the first deviation, sending, by a communication system of the vehicle monitoring system, a first electronic communication to a traffic enforcement system that is not mechanically coupled to the first detection system. The first electronic communication can be configured to notify the traffic enforcement system regarding driving behavior of the first vehicle.

Some embodiments comprise sending the first electronic communication in response to determining, by the vehicle monitoring system, that the first numerical position data is indicative of the first path exceeding a predetermined veering threshold.

In some embodiments, the traffic enforcement system is a computer system configured to notify a law enforcement entity (e.g., a police force, a sheriff's department). In some embodiments, the traffic enforcement system is configured to directly enforce driving laws (e.g., by pulling over an impaired vehicle).

Impaired drivers can be drunk (e.g., due to alcohol consumption), high (e.g., due to drug consumption, and/or distracted (e.g., due to using an electronic device such as a smartphone while driving). In some cases, impaired drivers could be swerving due to medical issues such as a heart attacks, lightheadedness, strokes, etc.

In some embodiments, path data is sent to a central server for all detected vehicles (e.g., from many detectors), but action is not taken (against a vehicle and/or against the driver of the vehicle) unless the path data is indicative of a characteristic exceeding a threshold.

In some embodiments, the vehicle monitoring system comprises a computer system having at least one processor and a memory comprising program instructions that when executed by the at least one processor are configured to analyze the first numerical position data. Embodiments can comprise numerically analyzing, by the computer system using the first numerical position data, a first deviation of the first path of the first vehicle relative to a first lane of a first road; and/or in response to numerically analyzing the first deviation, prompting, by the vehicle monitoring system, legal action against at least one of the first vehicle, a driver of the first vehicle, and a party responsible for the first vehicle.

In some embodiments, prompting the legal action comprises providing identity data configured to identify at least one characteristic of the first vehicle and providing driving behavior data regarding the first vehicle to an entity to facilitate at least one of issuing a fine, issuing a traffic ticket, and pulling over the first vehicle. In some embodiments, this entity is a police force, a government entity, and/or a law enforcement entity.

Some embodiments comprise determining, by the vehicle monitoring system based on the first numerical position data, that at least a first deviation characteristic of the first path exceeds a first predetermined threshold; taking, by the first camera, a picture of the first vehicle, wherein the picture is configured to show a license plate identification of the first vehicle; and/or in response to the determining, reporting, by the vehicle monitoring system, the license plate identification to a government entity.

Some embodiments comprise determining, by the vehicle monitoring system based on the first numerical position data, that at least a first deviation characteristic of the first path exceeds a first predetermined threshold; taking, by the first camera, a picture of the first vehicle, wherein the picture is configured to show a license plate identification of the first vehicle; identifying, by using the license plate identification, an entity responsible for the first vehicle; and/or in response to the determining and the identifying, sending (e.g., by the vehicle monitoring system) a notice regarding driving behavior of the first vehicle to the entity responsible.

Some embodiments comprise determining, by the vehicle monitoring system based on the first numerical position data, that at least a first deviation characteristic of the first path exceeds a first predetermined threshold; and/or in response to the determining, taking, by the first camera, a picture of the first vehicle, wherein the picture is configured to show a license plate identification of the first vehicle. Some embodiments comprise in response to the determining, sending the picture from the first detection system to a remotely located computer system.

In some embodiments, a vehicle guidance system combines data from multiple detection systems to enable the vehicle guidance system to more accurately evaluate driving behavior of a single vehicle.

In some embodiments, the vehicle monitoring system comprises a second detection system (e.g., detection system 7b, detection system 7c, detection system 7f) configured to be located remotely relative to the first detection system. (FIG. 5 illustrates a second detection system 7b located remotely relative to a first detection system 7a. FIG. 14 illustrates a second detection system 7f located remotely relative to a first detection system 7e.)

The second detection system can comprise at least one of a second camera, a second radar, and a second lidar. Some embodiments comprise generating, by the vehicle monitoring system using at least one of the second camera, the second radar, and the second lidar of the second detection system, second numerical position data indicative of a second path of the first vehicle; and/or numerically analyzing, by the vehicle monitoring system, the second numerical position data.

Some embodiments comprise, in response to collective evidence comprising the first numerical position data and the second numerical position data, fining at least one of a driver of the first vehicle and a party responsible for the first vehicle. The fine can be an amount in dollars or any other monetary currency.

In response to numerically analyzing, by the vehicle monitoring system, both the first numerical position data and the second numerical position data, some embodiments comprise prompting a second vehicle to at least one of drive toward the first vehicle, drive to a location within 250 feet of the first vehicle, and pull over the first vehicle. In some embodiments, this second vehicle is a police vehicle with authority to take legal action against the first vehicle.

In some embodiments, the vehicle monitoring system comprises a computer system. Embodiments can comprise placing the first detection system remotely relative to the computer system; placing the second detection system remotely relative to the computer system and relative to the first detection system; receiving, by the computer system from the first detection system, first data regarding the first path of the first vehicle while the first detection system is located remotely relative to the computer system and relative to the second detection system; receiving, by the computer system from the second detection system, second data regarding the second path of the first vehicle while the second detection system is located remotely relative to the computer system and relative to the first detection system; and/or numerically analyzing, by the vehicle monitoring system, the first data and the second data.

In response to numerically analyzing the first data and the second data, embodiments can comprise at least one of sending a notification regarding the first vehicle to a law enforcement entity; prompting a government entity to issue a fine to a party responsible for the first vehicle; and warning a second vehicle regarding the first vehicle.

Some embodiments comprise determining, by the vehicle monitoring system based on the first numerical position data, that at least a first deviation characteristic of the first path exceeds a first predetermined threshold; and/or determining, by the vehicle monitoring system based on the second numerical position data, that at least a second deviation characteristic of the second path exceeds a second predetermined threshold. In response to determining that at least the first deviation characteristic exceeds the first predetermined threshold and at least the second deviation characteristic exceeds the second predetermined threshold, some embodiments comprise sending, by the vehicle monitoring system, a first wireless communication to a second vehicle that is not mechanically coupled to the vehicle monitoring system.

In some embodiments, the first wireless communication is configured to at least one of warn the second vehicle regarding the first vehicle, report driving behavior information regarding the first vehicle to the second vehicle, provide data regarding an identity of the first vehicle to the second vehicle, and prompt the second vehicle to alter a first driving route of the second vehicle to keep away from the first vehicle.

Some embodiments comprise analyzing, by the vehicle monitoring system using the first numerical position data, a first deviation of the first path of the first vehicle relative to a first lane of a first road; and/or analyzing, by the vehicle monitoring system using the second numerical position data, a second deviation of the second path of the first vehicle relative to a second lane of a second road. In response to analyzing both the first deviation and the second deviation, some embodiments comprise sending, by a communication system of the vehicle monitoring system, a first electronic communication to a traffic enforcement entity. The first electronic communication can be configured to notify the traffic enforcement entity regarding driving behavior of the first vehicle.

Some embodiments comprise analyzing, by the vehicle monitoring system using the first numerical position data, a first deviation of the first path of the first vehicle; and/or analyzing, by the vehicle monitoring system using the second numerical position data, a second deviation of the second path of the first vehicle. In response to analyzing both the first deviation and the second deviation, some embodiments comprise prompting, by the vehicle monitoring system, legal action against at least one of the first vehicle, a driver of the first vehicle, and a party responsible for the first vehicle.

In some embodiments, the vehicle monitoring system comprises a second detection system configured to be located remotely relative to the first detection system. The second detection system can comprise a second camera and at least one of a second radar and a second lidar. Embodiments can comprise generating, by the vehicle monitoring system using at least one of the first radar and the first lidar of the first detection system, first numerical position data indicative of the first path of the first vehicle; taking, by the first camera, a first picture of the first vehicle; and/or determining, by the vehicle monitoring system, a first license plate identification by analyzing the first picture.

A license plate identification is configured to enable determining a vehicle's identification. A license plate identification can comprise numbers and letters. A license plate identification can be encrypted and/or encoded (e.g., in a Quick Response Code or in a barcode).

Embodiments can comprise generating, by the vehicle monitoring system using at least one of the second radar and the second lidar of the second detection system, second numerical position data indicative of a second path of the first vehicle; taking, by the second camera, a second picture of the first vehicle; and/or determining, by the vehicle monitoring system, a second license plate identification by analyzing the second picture.

Embodiments can comprise determining, by the vehicle monitoring system, that the second license plate identification is indicative of corresponding to the first license plate identification, and in response, numerically analyzing, by the vehicle monitoring system, both the first numerical position data and the second numerical position data to analyze driving behavior of the first vehicle.

If the driving behavior is indicative of impaired driving, the vehicle monitoring system can take any of the actions described herein.

The second license plate identification can be indicative of corresponding to the first license plate identification if the two license plate identifications match or are indicative of being from the same vehicle. In one case, the first license plate identification is "XD3719" and the second license plate identification "XD3719," which is indicative of corresponding to the first license plate identification. In one case, the first license plate identification is "EB73" and the second license plate identification "WR21," and a database indicates that "EB73" and "WR21" are associated with the same vehicle. As a result, the second license plate identification is indicative of corresponding to the first license plate identification.

In some embodiments, a vehicle guidance system comprises a first vehicle 5a. The first vehicle 5a can comprise a first lane position detection system 7a having at least one of a first camera 11, a first radar 8 and a first lidar 9. The first lane position detection system 7a can be configured to detect a first path of a second vehicle 48 as the first vehicle 5a and the second vehicle 48 travel on a first road 54.

In some embodiments, the vehicle guidance system comprises a computer system 34 having at least one processor 35 and a memory 31 comprising first program instructions 32 that when executed by the at least one processor 35 are configured to numerically analyze first numerical position data from the first lane position detection system 7a of the first vehicle 5a to determine at least one of a first veering characteristic of the first path of the second vehicle 48 and a first deviation of the first path relative to a first lane of the first road 54. The first numerical position data can be indicative of the first path of the second vehicle 48.

In some embodiments, first program instructions 32 are configured to generate the first numerical position data indicative of the first path of the second vehicle 48 by determining a first number (which can be encrypted) indicative of a first location of the second vehicle 48 at a first time; determining a second number indicative of a second location of the second vehicle 48 at a second time that is within three seconds of the first time; and determining a third number indicative of a third location of the second vehicle 48 at a third time that is within three seconds of the second time.

In some embodiments, first program instructions 32 are configured to determine the first number by measuring a first distance from a first lane marker to a first position of the second vehicle 48, the first program instructions 32 are configured to determine the second number by measuring a second distance from a second lane marker to a second position of the second vehicle 48, and the first program instructions 32 are configured to determine the third number by measuring a third distance from a third lane marker to a third position of the second vehicle 48.

In some embodiments, the first lane position detection system 7a comprises the first camera 11. The vehicle guidance system can comprise second program instructions configured to cause the first camera 11 to take pictures of the second vehicle 48 as the second vehicle 48 travels on the first road 54; and/or an image analysis system 43 configured to analyze the pictures to generate the first numerical position data indicative of the first path of the second vehicle 48.

In some embodiments, the first lane position detection system 7a comprises the first camera 11. The vehicle guidance system can comprise second program instructions configured to cause the first camera 11 to take pictures of the second vehicle 48 and of lane markers of the first lane; and/or an image analysis system 43 configured to analyze the pictures to determine distances between the lane markers and the second vehicle 48 to enable the first program instructions 32 to numerically determine at least one of the first veering characteristic and the first deviation.

In some embodiments, the first lane position detection system 7a comprises the first camera 11 and also comprises at least one of the first lidar 9 and the first radar 8. In some embodiments, the first camera 11 is configured to take pictures of lane markers of the first lane; the first program instructions 32 are configured to analyze the pictures to identify locations of the lane markers; the first program instructions 32 are configured to numerically determine measurements of the first path based on path data from at least one of the first lidar 9 and the first radar 8; and/or the first program instructions 32 are configured to numerically analyze the first veering characteristic based on the locations of the lane markers and based on the measurements.

In some embodiments, the first lane position detection system 7a comprises the first radar 8, and the first program instructions 32 are configured to generate the first numerical position data indicative of the first path of the second vehicle 48 based on measurements taken by the first radar 8.

In some embodiments, the first lane position detection system 7a comprises the first lidar 9, and the first program instructions 32 are configured to generate the first numerical position data indicative of the first path of the second vehicle 48 based on measurements taken by the first lidar 9.

In some embodiments, first lane position detection system 7a comprises at least one of the first radar 8 and the first lidar 9, and the first program instructions 32 are configured to generate the first numerical position data indicative of the first path of the second vehicle 48 by at least one of the following: measuring, using at least one of the first radar 8 and the first lidar 9, a first distance between the first lane position detection system 7a and the second vehicle 48 at a first time; measuring, using at least one of the first radar 8 and the first lidar 9, a second distance between the first lane position detection system 7a and the second vehicle 48 at a second time that is within three seconds of the first time; and measuring, using at least one of the first radar 8 and the first lidar 9, a third distance between the first lane position detection system 7a and the second vehicle 48 at a third time that is within three seconds of the second time.

In some embodiments, the first lane position detection system 7a is configured to compensate for motion of the first vehicle 5a to determine a speed of the second vehicle 48. The first lane position detection system 7a can be configured to compensate for the motion of the first vehicle 5a to determine movements of the second vehicle 48 toward at least one of a left side of the first lane and a right side of the first lane of a first road. The first program instructions 32 can be configured to analyze the first veering characteristic based on the speed and the movements.

In some embodiments, the first program instructions 32 are configured to alter a driving behavior of the first vehicle 5a to keep away from the second vehicle 48 in response to determining at least one of the first veering characteristic is greater than a first veering threshold and the first deviation is greater than a second predetermined threshold.

In some embodiments, altering the driving behavior that is configured to be altered by the first program instructions 32 comprises changing a first driving route of the first vehicle 5a to keep away from the second vehicle 48.

In some embodiments, altering the driving behavior configured to be altered by the first program instructions 32 comprises moving away from the second vehicle 48.

In some embodiments, altering the driving behavior configured to be altered by the first program instructions 32 comprises increasing a minimum distance permitted by the first program instructions 32 between the first vehicle 5a and the second vehicle 48. In a first mode, the minimum distance can be at least 10 feet and/or at least 15 feet. In a second mode, the minimum distance can be at least 50 feet and/or at least 100 feet.

In some embodiments, the vehicle guidance system comprises a communication system 39 configured to send a first communication to a third vehicle 5c in response to at least one of the first veering characteristic being greater than a first veering threshold and the first deviation being greater than a second predetermined threshold. Program instructions 32 can be configured such that the first communication is configured to at least one of warn the third vehicle 5c regarding the second vehicle 48 and prompt the third vehicle 5c to alter a first driving route of the third vehicle 5c to keep away from the second vehicle 48.

In some embodiments, the vehicle guidance system comprises a location tracking system 30 configured to receive a first location indicator of the second vehicle 48 and configured to receive a second location indicator of the third vehicle 5c. The communication system 39 can be configured to send the first communication to the third vehicle 5c in response to the location tracking system 30 determining, based on the first location indicator and the second location indicator, that the third vehicle 5c is within a first predetermined distance of the second vehicle 48. In some embodiments, a location indicator is a GPS location indicator.

In some embodiments, the vehicle guidance system comprises a location tracking system 30 configured to monitor a second driving route of the second vehicle 48 and configured to monitor the first driving route of the third vehicle 5c. The communication system 39 can be configured to send the first communication to the third vehicle 5c in response to the location tracking system 30 predicting, based on the first driving route and the second driving route, that the third vehicle 5c would come within a predetermined distance of the second vehicle 48 (e.g., if the third vehicle 5c does not alter its course to stay away from the second vehicle 48).

In some embodiments, a first lane position detection system 7a comprises the first camera 11. The first camera 11 can be configured to take a picture of the second vehicle 48. the vehicle guidance system can comprise an image analysis system 43 configured to analyze the picture to determine a license plate identification of the second vehicle 48. The communication system 39 can be configured to send a second communication having identification data indicative of the license plate identification to the third vehicle 5c. The identification data can be an encrypted representation of the license plate identification. The second communication can be configured to enable the third vehicle 5c to keep away from the second vehicle 48 in response to the third vehicle 5c receiving the first communication and in response to the third vehicle 5c identifying the second vehicle 48 based on the identification data of the second communication.

In some embodiments, the vehicle guidance system comprises a third vehicle 5c having second program instructions; and a communication system 39 configured to send a first communication to the third vehicle 5c in response to at least one of the first veering characteristic being greater than a first veering threshold and the first deviation being greater than a second predetermined threshold. The second program instructions can be configured to alter a first driving route of the third vehicle 5c to keep away from the second vehicle 48 in response to the third vehicle 5c receiving the first communication.

In some embodiments, the first lane position detection system 7a is configured to compensate for motion of the first vehicle 5a to determine a speed of the second vehicle 48 and to determine movements of the second vehicle 48 toward at least one of a left side of the first lane and a right side of the first lane. In some embodiments, at least one processor 35 is configured to analyze the movements compared to the speed to determine that the first path fluctuates in a veering manner more than a speed-relative threshold. (The veering manner comprises moving leftward and/or rightward in a lane of a road.)

In some embodiments, the vehicle guidance system further comprises a communication system 39 configured to send a first communication to a third vehicle 5c in response to the first path fluctuating in the veering manner more than the speed-relative threshold. The first communication can be configured to at least one of warn the third vehicle 5c regarding the second vehicle 48 and prompt the third vehicle 5c to alter a first driving route of the third vehicle 5c to keep away from the second vehicle 48.

In some embodiments, a vehicle guidance system comprises one vehicle, two vehicles, several vehicles, thousands of vehicles, and/or detection systems mounted beside, above, or near a road. Path data detected by detection systems mounted to vehicles can be combined with path data detected by detection systems mounted beside, above, or near roads.

In some embodiments, a vehicle guidance system comprises a fourth vehicle 5b. The fourth vehicle 5b can comprise a second lane position detection system 7b having at least one of a second camera, a second radar and a second lidar. The second lane position detection system 7b can be configured to detect a second path of the second vehicle 48 as the fourth vehicle 5b and the second vehicle 48 travel on a second road. Second program instructions can be configured to numerically analyze second numerical position data from the second lane position detection system 7b of the fourth vehicle 5b to determine a second veering characteristic of the second path. The vehicle guidance system can comprise a communication system 39 configured to send a first communication to a third vehicle 5c in response to the first veering characteristic exceeding a first veering threshold and the second veering characteristic exceeding a second veering threshold. The first communication can be configured to at least one of warn the third vehicle 5c regarding the second vehicle 48 and prompt the third vehicle 5c to alter a first driving route of the third vehicle 5c to keep away from the second vehicle 48.

Detecting impaired driving has previously proven to be nearly impossible in all but the most egregious cases. Many impaired drivers are not caught until they are identified at the scene of an accident. Unless a vehicle is swerving dramatically, the swerving is nearly always too small for a police officer to detect with her eyes. In other words, police officers typically cannot visually detect impaired drivers unless the drivers have a blood alcohol concentration ("BAC") that is dramatically higher than the legal limit. As a result, most impaired drivers are not detected, yet remain life-threatening hazards to other people. These undetected impaired drivers kill thousands of people every year. Thus, there is a need for a system that can more effectively detect impaired drivers.

Some embodiments comprise a vehicle monitoring system that considers collective path evidence from multiple detection systems. This collective evidence enables some embodiments to detect subtle veering behavior over multiple driving distances. Numerically analyzing the undulating nature of the veering behavior captured by multiple detection systems enables the vehicle monitoring system to detect impaired driving that would remain undetected by a single detection system. For example, a vehicle might swerve a little on a first road because the driver is changing radio stations, but if the same vehicle is detected by multiple detection systems swerving back and forth over a long distance on a single road or if the same vehicle is detected swerving back and forth on multiple roads by multiple detection systems, then the driver is likely impaired.

As explained in more detail above, a system can comprise a first vehicle comprising a first detection system having at least one of a first camera, a first radar, and a first lidar, wherein the first detection system is configured to detect a first path of a second vehicle as the first vehicle and the second vehicle travel on a first road; a third vehicle comprising a second detection system having at least one of a second camera, a second radar, and a second lidar, wherein the second detection system is configured to detect a second path of the second vehicle as the third vehicle and the second vehicle travel on a second road that is located remotely relative to the first road; a computer system having at least one processor and at least one memory comprising first program instructions that when executed by the at least one processor are configured to numerically analyze collective path evidence comprising first numerical position data indicative of the first path from the first detection system of the first vehicle on the first road and second numerical position data indicative of the second path from the second detection system of the third vehicle on the second road to determine a collective veering characteristic of the second vehicle; and/or a communication system configured to send a first wireless communication to an antenna (e.g., of a fourth vehicle and/or of a computer system) in response to the collective veering characteristic exceeding a first veering threshold. The collective veering characteristic can be based on veering behavior of the first vehicle on several roads.

In some embodiments, the first detection system is mounted such that it detects vehicles on the first road and the second detection system is mounted such that it detects vehicles on the second road. The detection systems do not have to be mounted to a vehicle.

The entire contents of the following patents are incorporated by reference herein: U.S. Pat. Nos. 10,286,908, 10,474,154, and 10,481,606.

Imagine that a can of spray paint is mounted such that it sprays downward from the bottom of a vehicle toward the road. The painted line would form a serpentine path as the vehicle travels along the road. FIGS. 7, 8, 11, and 12 illustrate serpentine paths, according to some embodiments.

A serpentine path can include irregular curves and regular curves. In some cases, serpentine paths include sharp peaks as the vehicle abruptly shifts from moving leftward (toward a left side of a lane) to moving rightward (toward a right side of the lane).

Serpentine paths may indicate that the vehicle moves leftward for a short period of time, then moves rightward for a long period of time, and then moves leftward for a medium period of time. Serpentine paths may indicate that the vehicle moves rightward for a short period of time, then moves leftward for a medium period of time, then moves rightward for a medium period of time, and then moves leftward for a long period of time. Many different types of serpentine paths are possible based on the many different ways vehicles can move along a road. Serpentine paths can include thousands of leftward and rightward movements.

One challenge is that every vehicle inadvertently veers leftward and rightward as the vehicle travels along a road. Differentiating a first serpentine path of a vehicle with an impaired driver from a second serpentine path of a vehicle without an impaired driver can be extremely difficult because the veering due to being impaired is often smaller than veering due to other factors such as a "loose" steering wheel, vehicle size, vehicle speed, road characteristics, and driver differences.

For example, in simplified terms to illustrate the challenge, a vehicle might veer an extra 10 centimeters due to having an impaired driver. Thus, the vehicle monitoring system must be able to detect veering that is 10 cm, but pulling over every driver who veers 10 cm would result in far too many false positives to be viable or reasonable.

A driver of a sports car could be veering an extra 10 cm due to being impaired, but could still have an overall veering maximum that is less than a driver of an old pickup truck who is not impaired but whose truck is veering far more than the sports car due to having a steering wheel that is essentially unresponsive until the driver moves the steering wheel at least 10 degrees.

In addition, some drivers typically veer more than other drivers (even when the type of vehicle variable is eliminated). This natural variation could result in some drivers being repeatedly falsely identified as impaired. In addition, this natural variation can effectively "hide" impaired drivers from being detected.

Even making a detection system that can perfectly detect infinitely small veering variations is not enough to make a system that can reliably identify impaired drivers because the veering variation between vehicles, drivers, roads, speeds, etc. is much larger (in cases except where the driver is extremely impaired) than the veering due to the driver being impaired. Put another way, the system would not be able to tell the difference between a vehicle with an impaired driver and a vehicle with a non-impaired driver who veers more than average, a vehicle with a less responsive than average steering wheel, a road that naturally causes more veering due to curvature or other features, increased veering due to higher travel speeds, etc. Many embodiments described herein overcome this previously unsolved and seemly impossible challenge.

FIG. 15 illustrates an embodiment of a vehicle monitoring system, which can include a first detection system 7e, a second detection system 7f, and many other detection systems. The first detection system 7e has at least one of a first camera 11, a first radar 8, and a first lidar 9.

Figure 16:
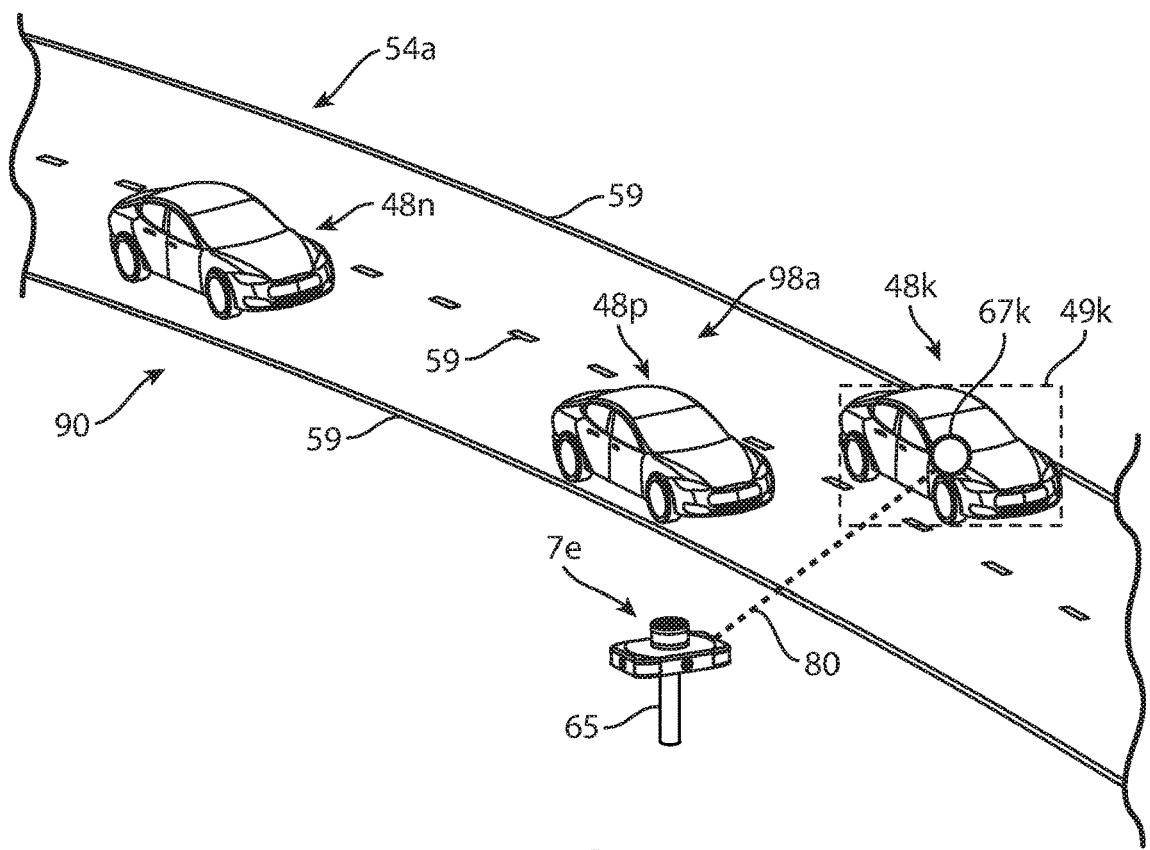
FIGS. 16 and 17 illustrate perspective views of vehicles driving on roads, according to some embodiments.

As illustrated in FIGS. 13 and 16, the first detection system 7e is located and configured to use at least one of the first camera 11, the first radar 8, and the first lidar 9 to detect a first serpentine path 51h (illustrated in FIG. 18) of a first vehicle 48k as the first vehicle 48k travels along a first road 54a.

A line 80 illustrates the first detection system 7e detecting the first vehicle 48k. Amazon Web Services, Inc. provides an application programming interface ("API") called "Amazon Rekognition" to automatically recognize objects such as any of the vehicles described herein. A computer system 34, 19 can use "Amazon Rekognition" to detect an outline 49k of the first vehicle 48k. Program instructions 32, 27 can use the outline 49k to identify a representation of a centroid 67k that can be used to mark location points (e.g., 100 times per second) of serpentine paths of the first vehicle 48k.

A first lidar 9 can be used to detect the first vehicle 48k. A Velodyne VLS-128 made by Velodyne LiDAR, Inc. can be used to detect the first vehicle 48k as illustrated by the line 80. This lidar detection can be used to mark location points (e.g., 100 times per second) of serpentine paths of the first vehicle 48k.

This lidar detection can be used to identify the outline 49k of the first vehicle 48k. From the outline 49k, program instructions 32, 27 can identify a representation of a centroid 67k that can be used to mark serpentine paths of the first vehicle 48k.

A first radar 8 can be used to detect the first vehicle 48k. The first radar 8 can emit radio waves. Some of these radio waves can hit the first vehicle 48k and thereby be reflected back toward the first radar 8, which can detect these reflected radio waves. This radar detection can be used to identify the outline 49k of the first vehicle 48k. From the outline 49k, program instructions 32, 27 can identify a representation of a centroid 67k that can be used to mark location points (e.g., 100 times per second) of serpentine paths of the first vehicle 48k.

Figure 17:
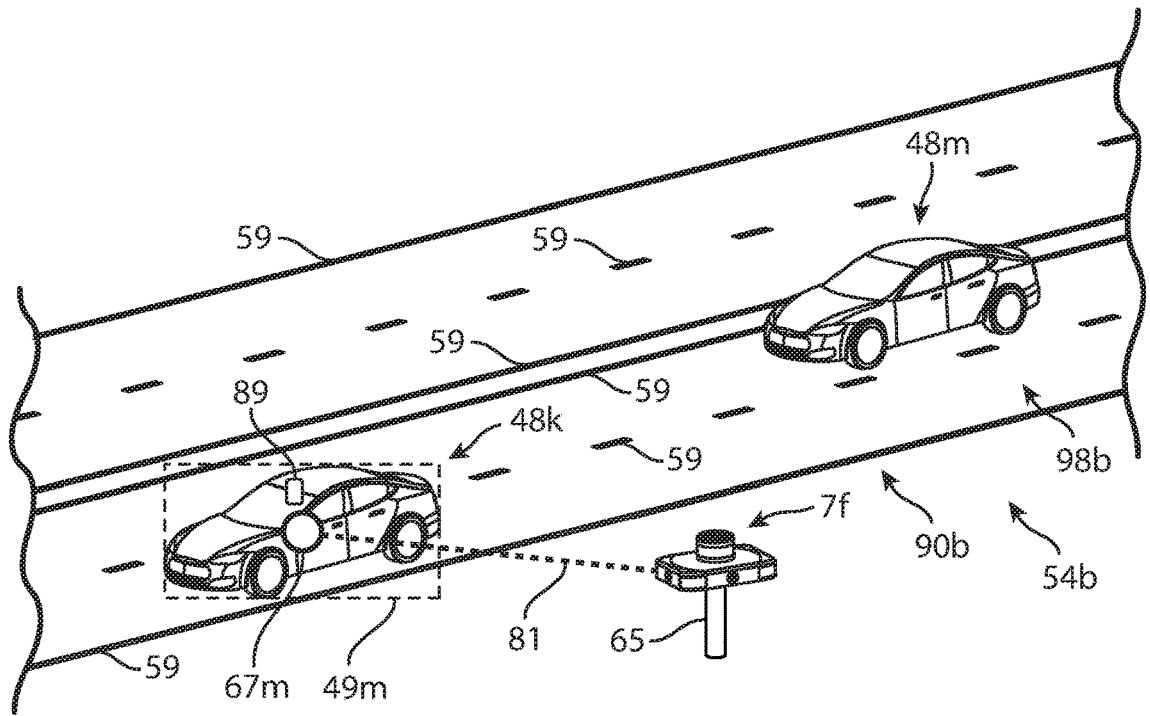

Referring now primarily to FIG. 17, a line 81 illustrates the second detection system 7f detecting the first vehicle 48k (e.g., using radar, lidar, and/or pictures taken by a camera). A computer system 34, 19 can use "Amazon Rekognition" to detect an outline 49m of the first vehicle 48k. Program instructions 32, 27 can use the outline 49m to identify a representation of a centroid 67m that can be used to mark serpentine paths of the first vehicle 48k.

FIG. 15 illustrates a vehicle monitoring system that comprises a computer system. The computer system can be computer system 34 and/or can be computer system 19 (illustrated in FIG. 13). The computer system 34 can comprise first program instructions 32 configured to numerically analyze first data 93 (illustrated in FIG. 13) indicative of the first serpentine path 51h from at least one of the first camera 11, the first radar 8, and the first lidar 9 to generate a first veering threshold 83 for the first vehicle 48k.

The first veering threshold 83 can be at least partially based on the past veering behavior of the first vehicle 48k. Knowing the past veering behavior can enable the vehicle monitoring system to determine if future veering is abnormal for that particular vehicle and/or driver and thus is indicative of impaired driving.

In some embodiments, the first veering threshold 83 is specific to a particular driver of the first vehicle 48k (because two drivers of one vehicle may have different sober veering characteristics).

The first veering threshold 83 can be customized for a specific vehicle (e.g., for one license plate number). In some embodiments, the first veering threshold 83 can be customized for a type of vehicle (e.g., a sedan versus a truck), an age of the vehicle (e.g., a new car versus an old car), a type of road (e.g., a bumpy road versus a smooth road, a curvy road versus a straight road), etc.

A vehicle monitoring system can comprise a second detection system 7f. The second detection system 7f can include any of the features and components described in the context of the first detection system 7e. The second detection system 7f can comprise at least one of a second camera (e.g., the camera 11 illustrated in FIG. 13), a second radar (e.g., the radar 8 illustrated in FIG. 13), and a second lidar (e.g., the lidar 9 illustrated in FIG. 13).

Figure 19:
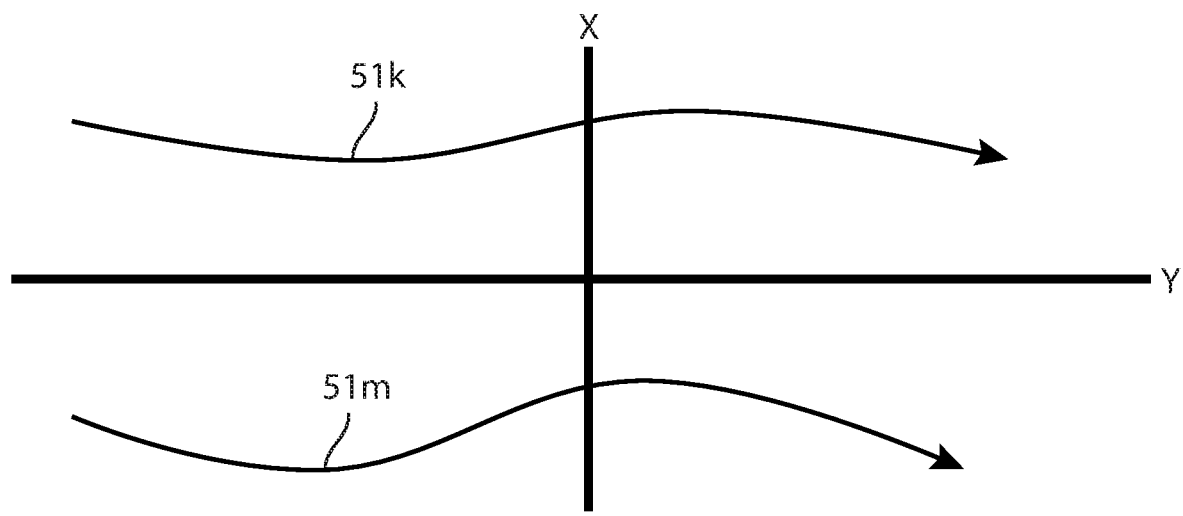

In the embodiment illustrated in FIGS. 17 and 19, the second detection system 7f is located and configured to use at least one of the second camera, the second radar, and the second lidar to detect a second serpentine path 51k of the first vehicle 48k as the first vehicle 48k travels along a second road 54b.

Referring now primarily to FIG. 15, a vehicle monitoring system can comprise a communication system 39. The vehicle monitoring system can comprise second program instructions 32a configured to cause the communication system 39 to send a first communication 86 in response to the second detection system 7f detecting, on the second road 54b, the second serpentine path 51k of the first vehicle 48k exceeding the first veering threshold 83.

To reduce unnecessary redundancy, not every element or feature is described in the context of every embodiment, but all elements and features described in the context of any embodiment herein and/or incorporated by reference can be combined with any elements and/or features described in the context of any other embodiments. All elements and features described in the context of FIGS. 1-14 can be combined with all elements and features described in the context of FIGS. 15-19.

Referring now primarily to FIGS. 15-19, the vehicle monitoring system can determine a first veering threshold 83 for the first vehicle 48k. Program instructions 32 assign this first veering threshold 83 to the first vehicle 48k due to past serpentine veering behavior of the first vehicle 48k. This past serpentine veering behavior forms a baseline that enables the vehicle monitoring system to differentiate serpentine veering that undulates in a normal fashion according to typical driving of the first vehicle 48k from serpentine veering that undulates in abnormal fashion according to typical driving of the first vehicle 48k, and thus could be indicative of impaired driving.

Serpentine veering that is well within the typical range for one vehicle may be indicative of impaired driving for another vehicle. Failing to pull over a vehicle unless it undulates to a greater degree than the maximum for all vehicles and sober drivers precludes accurately identifying a huge percentage of impaired drivers. In contrast, many of the embodiments disclosed herein dramatically increase the ability to accurately identify impaired drivers.

Figure 18:
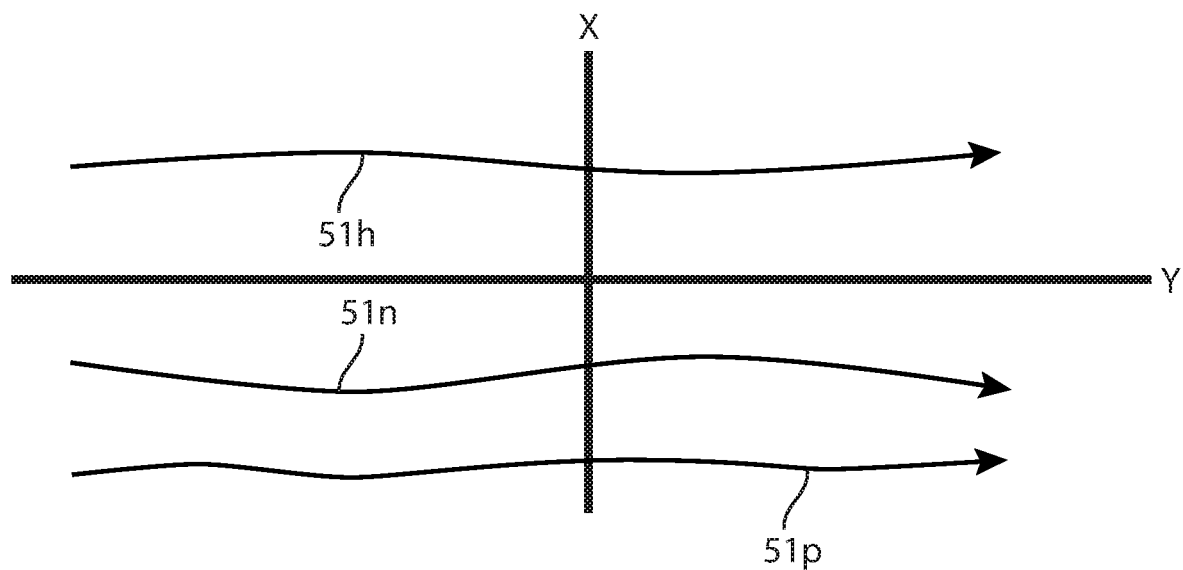
FIGS. 18 and 19 illustrate diagrammatic views of path data, according to some embodiments.

FIG. 18 illustrates a first serpentine path 51h of a first vehicle 48k as the first vehicle 48k drove on a first road 54a. FIG. 19 illustrates a second serpentine path 51k of a first vehicle 48k as the first vehicle 48k drove on a second road 54b. Although the magnitude of the veering of the second serpentine path 51k is actually less than the average magnitude of the veering for vehicles along this portion of the second road 54b, the veering of second serpentine path 51k is statistically significantly greater (once the data is normalized for differences between the first road 54a and the second road 54b and normalized for other factors described herein) than the veering of first serpentine path 51h of the first vehicle 48k. As a result, the vehicle monitoring system can accurately identify the first vehicle 48k on the second road 54b as having a reasonably high chance of being impaired (e.g., there is reasonable suspicion that justifies pulling over the first vehicle 48k on the second road 54b) due to the baseline provided by past serpentine path data for the first vehicle 48k.

Note that the vehicle monitoring system can accurately identify the first vehicle 48k on the second road 54b as having a reasonably high chance of being impaired even though the first vehicle 48k is actually veering significantly less than many other vehicles with unimpaired drivers on the second road 54b. For example, a fourth vehicle 48m (with an unimpaired driver) traveling on the second road 54b has a fifth serpentine path 51m that has statistically significantly larger veering than the veering shown by the second serpentine path 51*k* of the first vehicle 48*k*, yet the vehicle monitoring system can identify the first vehicle 48*k* as justifying a reasonable suspicion of being impaired while not identifying the fourth vehicle 48*m* as being impaired due to previous baseline veering data for the first vehicle 48*k* and in some cases also due to previous baseline veering data for the fourth vehicle 48*m* and/or previous veering data of many vehicles on the second road 54*b*.

Some embodiments use data from thousands or even millions of serpentine paths from thousands or even millions of vehicles to help differentiate between impaired driving and unimpaired driving. The computer system 34 can use artificial intelligence such as AWS machine learning made by Amazon Web Services, Inc. The computer system 34 can include artificial intelligence to help distinguish between impaired driving and unimpaired driving. The artificial intelligence can analyze many veering histories 82 to characterize normal driving behavior. In some embodiments, artificial intelligence analyzes many veering histories 82 to characterize normal driving behavior for a particular road to help normalize serpentine path data.

Using data from the first serpentine path 51*h* to determine whether data from the second serpentine path 51*k* is indicative of impaired driving can, in some embodiments, comprise normalization and/or conversion techniques to make veering data collected on a first road 54*a* applicable to veering data collected on a second road 54*b*. For example, if the first road 54*a* has a lower speed limit than the second road 54*b*, then the normalization and/or conversion techniques can include removing the effect of speed on veering and/or compensating for the effect of speed on veering. All other factors being equal, a vehicle traveling at a higher speed typically veers more per second than a vehicle traveling at a lower speed. This speed effect, however, can be removed by characterizing how speed affects the rate of veering and then using that characterization to remove the effect of speed. Some embodiments use a speed-relative veering threshold to account for the effect of speed on veering.

If the first road 54*a* is more curved than the second road 54*b*, then the normalization and/or conversion techniques can include removing the effect of road curvature on veering and/or compensating for the effect of road curvature on veering. A very curvy road can cause drivers to veer more toward a left side and/or a right side of the lane. This road curvature effect, however, can be removed by characterizing how road curvature affects veering and then using that characterization to remove the effect of road curvature.

In simplistic terms, normalization and/or conversion techniques enable an "apples to apples" veering comparison between different roads, weather conditions, times of day, drivers, and vehicles. In some embodiments, a veering threshold has already been normalized and/or converted such that it is applicable to many roads and conditions. In some embodiments, serpentine path data is normalized and/or converted before being compared to the veering threshold. In some embodiments, normalization and/or conversion is performed using artificial intelligence (such as AWS machine learning made by Amazon Web Services, Inc.).

The computer system 34 can comprise first program instructions 32 configured to numerically analyze first data 93 (illustrated in FIG. 13) indicative of the first serpentine path 51*h* from at least one of the first camera 11, the first radar 8, and the first lidar 9 to generate a first veering threshold 83 for the first vehicle 48*k*.

The first data 93 can be from the first radar 8. Radar is an object-detection system that uses radio waves to determine the range, angle, and/or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar. As a result, the first radar 8 can generate three-dimensional data representing an area outside the first detection system 7*e*.

Program instructions 27 can be configured to analyze this three-dimensional data to determine a location of the first vehicle 48*k* at each time interval (e.g., 60 times per second). The detection system 7*e* can be calibrated such that the vehicle monitoring system can convert the three-dimensional data from the first radar 8 to an actual location (e.g., relative to the road, a GPS location). As a result, first program instructions 32 of the vehicle monitoring system can use the first radar 8 to generate the first data 93 indicative of the first serpentine path 51*h*.

The first data 93 can be from the first lidar 9. Lidar uses light to detect objects. In some embodiments, the first lidar 9 is a Velodyne VLS-128 made by Velodyne LiDAR, Inc.

A first lidar 9 can be located on a top portion of the first detection system 7*e* to provide a 360-degree view of the area around the self-driving vehicle 5. As a result, the first radar 9 can generate three-dimensional data representing an area outside the first detection system 7*e*.

Program instructions 27 can be configured to analyze the lidar data to determine a location of the first vehicle 48*k* at each time interval (e.g., 60 times per second). The detection system 7*e* can be calibrated such that the vehicle monitoring system can convert the lidar data from the first lidar 9 to an actual location (e.g., relative to the road, a GPS location). As a result, first program instructions 32 of the vehicle monitoring system can use the first lidar 9 to generate the first data 93 indicative of the first serpentine path 51*h*.

The first data 93 can be from the first camera 11. The first camera 11 can take pictures 87 (and/or videos) of the first vehicle 48*k* as the first vehicle 48*k* travels along the first road 54*a* (e.g., such that the first vehicle's 48*k* direction of travel is substantially aligned with the predominant direction along which traffic is intended to travel along the first road 54*a*). Some embodiments use an image analysis system 99 to analyze the pictures 87 to generate the first data 93. In some embodiments, the image analysis system 99 is provided by Amazon Web Services, Inc.

Amazon Web Services, Inc. provides an application programming interface ("API") called "Amazon Rekognition" to automatically recognize people and objects (such as any of the vehicles described herein) in pictures 87. The image analysis system 99 can use artificial intelligence (such as AWS machine learning made by Amazon Web Services, Inc.) to identify people and vehicles in the pictures 87. The image analysis system 99 can use AWS to read vehicles' license plate numbers from pictures taken by cameras 11.

First program instructions 32 can be configured to cause the image analysis system 99 (e.g., using AWS machine learning and/or "Amazon Rekognition") to analyze the pictures 87 to determine a location of the first vehicle 48*k* within the field of view at each time interval (e.g., 60 times per second). The detection system 7*e* can be calibrated such that the vehicle monitoring system can convert the position within a field of view of the first camera 11 to an actual location (e.g., relative to the road, a GPS location). As a result, first program instructions 32 of the vehicle monitoring system can use the first camera 11 to generate the first data 93 indicative of the first serpentine path 51h.

First program instructions 32 can be configured to cause the image analysis system 99 (e.g., using AWS machine learning and/or "Amazon Rekognition") to analyze the pictures 87 to determine first identifying data 101 (such as a license plate number of the first vehicle 48k) and at least one identifying trait 103 (such as a facial measurement of the face of the human driver of the first vehicle 48k).

In some embodiments, first program instructions 32 are configured to assign the baseline veering profile 104 to the first vehicle 48k in response to determining that the first identifying data 101 is indicative of the first vehicle 48k. For example, the system can determine that the license plate number shown in the picture 87 taken by the camera 11 and deciphered by "Amazon Rekognition" matches the license plate of a vehicle in a memory 31 of the vehicle monitoring system.

In some embodiments, first program instructions 32 are configured to assign the baseline veering profile 104 to a first driver of the first vehicle 48k in response to determining that the identifying trait 103 is indicative of the first driver. (This way, different drivers of the first vehicle 48k can have different baseline veering profiles 104.) For example, the image analysis system 99 (e.g., using "Amazon Rekognition") can measure dozens of the driver's facial features. Then, the computer system 34 can determine that at least one measurement of a facial feature of the driver (e.g., a distance between the driver's eyes or a distance from the driver's nose to the driver's mouth) shown in the picture 87 taken by the camera 11 matches facial information associated with the driver in a memory 31 of the vehicle monitoring system.

In some embodiments, detection systems are coupled to moving vehicles. In some embodiments, detection systems are mounted adjacent to roads such that the detection systems can detect vehicles traveling on the roads.

Referring now primarily to FIGS. 15-19, in some embodiments, a vehicle monitoring system comprises a first detection system 7e configured to be located remotely relative to a first vehicle 48k and having at least one of a first camera 11, a first radar 8, and a first lidar 9. The first detection system 7e can be configured to use at least one of the first camera 11, the first radar 8, and the first lidar 9 to detect a first serpentine path 51h of the first vehicle 48k as the first vehicle 48k travels along a first road 54a on a first day.

In some embodiments, a vehicle monitoring system comprises a computer system 34 having first program instructions 32 configured to numerically analyze first data 93 indicative of the first serpentine path 51h from at least one of the first camera 11, the first radar 8, and the first lidar 9 to generate a first aggregate veering characteristic 94.

Rather than determining simply if the first vehicle 48k moves leftward (e.g., toward a nearby car) or moves rightward (e.g., toward a nearby car), the first program instructions 32 can generate the first aggregate veering characteristic 94 based on multiple leftward and/or rightward movements.

As used herein, "aggregate veering characteristic" is based on at least three leftward and/or rightward veering movements as the first vehicle 48k travels along a first road 54a. Some embodiments use an aggregate veering characteristic that is based on at least five leftward and/or rightward movements as the first vehicle 48k travels along a first road 54a, at least ten leftward and/or rightward movements as the first vehicle 48k travels along a first road 54a, at least fifty leftward and/or rightward movements as the first vehicle 48k travels along a first road 54a, and/or at least a thousand leftward and/or rightward movements as the first vehicle 48k travels along a first road 54a.

As used herein "aggregate" does not mean or imply "total." For example, an aggregate veering characteristic can represent and/or be based on only part of a serpentine path of a vehicle.

In some embodiments, the aggregate veering characteristic represents how many times a vehicle moved leftward within a period of time, how many times a vehicle moved rightward within a period of time, how many times a vehicle moved leftward and rightward within a period of time, the speed of the veering in a direction horizontal to the travel orientation of the lane, the magnitudes of the leftward and/or rightward movements, the area "under" a curve representing the serpentine movements, etc. There are many additional ways to numerically analyze the first data 93 indicative of the first serpentine path 51h (from at least one of the first camera 11, the first radar 8, and the first lidar 9) to generate the first aggregate veering characteristic 94.

In some embodiments, a single detection system (e.g., detection system 7e) detects the first vehicle 48k as the first vehicle 48k travels on a single road multiple times on multiple days. First program instructions 32 can use data from the detection system 7e to generate a first veering history 95. The first program instructions can associate this first veering history 95 with the first vehicle 48k such that the vehicle monitoring system can use the first veering history 95 to differentiate normal veering of the first vehicle 48k from abnormal veering of the first vehicle 48k.

In some embodiments, as the first vehicle 48k travels on many different roads on many different days, many detection systems can generate a first veering history 95 that the first program instructions 32 associate with the first vehicle 48k such that the vehicle monitoring system can use the first veering history 95 to differentiate normal veering of the first vehicle 48k from abnormal veering of the first vehicle 48k.

If the vehicle monitoring system detects veering that is abnormal specifically for the first vehicle 48k, the vehicle monitoring system can send a communication configured to notify a law enforcement entity 85 (e.g., a local police force or highway patrol) regarding the veering of the first vehicle 48k. Then, a police officer can pull over the first vehicle 48k in response to receiving the "reasonable suspicion" evidence from the vehicle monitoring system. At that point, the police officer can take additional investigative steps such as asking the driver to take a breathalyzer test to determine the BAC of the driver.

In some embodiments, the computer system 34 comprises a memory 31 having a first veering history 95 associated with the first vehicle 48k. The first program instructions 32 can be configured to update the first veering history 95 in response to generating the first aggregate veering characteristic 94 such that the first veering history 95 is based at least partially on the first aggregate veering characteristic 94. The veering history 95 can numerically represent characteristics of past serpentine paths of the first vehicle 48k.

In some embodiments, the veering history 95 comprises complete data regarding past serpentine paths of the first vehicle 48k. To save memory and to increase computational efficiencies, in some embodiments, the veering history 95 comprises incomplete data regarding past serpentine paths of the first vehicle 48k. For example, the veering history 95 in some embodiments only comprises abbreviated numerical indications of past veering of the first vehicle 48k.

In some embodiments, a vehicle monitoring system comprises a computer system 34 having at least one processor 35 and a memory 31 comprising first program instructions 32 that when executed by the at least one processor 35 are configured to numerically analyze first data 93 from at least one of the first camera 11, the first radar 8, and the first lidar 9 to generate first numerical position data 96 indicative of the first serpentine path 51*h* of the first vehicle 48*k*.

Many different types of data can be indicative of the first serpentine path. For example, position data taken at regular time intervals or irregular time intervals can be one type of numerical position data indicative of the first serpentine path, but there are many other types of numerical position data indicative of the first serpentine path.

The numerical position data can indicate locations within a field of view of a camera. The numerical position data can comprise radar or lidar data that indicates locations or movements of the first vehicle 48*k*. The numerical position data can comprise measurements to lane markers.

In some embodiments, numerical position data indicative of the first serpentine path can comprise leftward movements of a vehicle, rightward movements of the vehicle, and/or data regarding maximum departures from a lane center.

In some embodiments, the first program instructions 32 are configured to determine at least one aggregate veering characteristic of the first serpentine path 51*h* of the first vehicle 48*k*. In some embodiments, the first program instructions 32 are configured to determine a first veering threshold 83 for the first vehicle 48*k* at least partially based on the first veering history 95.

In some embodiments, the first program instructions 32 are configured to determine at least one of a first undulating characteristic of the first serpentine path 51*h* of the first vehicle 48*k*. The first program instructions 32 can update the first veering history 95 at least partially based on the first undulating characteristic. In some embodiments, the first program instructions 32 are configured to determine a first veering threshold 83 for the first vehicle 48*k* at least partially based on the first veering history 95.

In some embodiments, the first program instructions 32 are configured to determine at least one of a first deviation of the first serpentine path 51*h* relative to a first lane 98*a* of the first road 54*a*. The first program instructions 32 can update the first veering history 95 at least partially based on the first deviation. In some embodiments, the first program instructions 32 are configured to determine a first veering threshold 83 for the first vehicle 48*k* at least partially based on the first veering history 95.

In some embodiments, the first veering threshold 83 is speed relative such that the actual value of the first veering threshold 83 scales with the speed of the first vehicle 48*k* and/or changes according to the speed of the first vehicle 48*k*.

In some embodiments, the first veering threshold 83 is a curve-relative threshold such that the actual value of the first veering threshold 83 changes according to a curvature characteristic 90 of the first road 54*a* and/or according to a curvature characteristic 90*b* of the second road 54*b*. This approach helps normalize the system according to road curvature.

In some embodiments, the vehicle monitoring system comprises a communication system 39 and second program instructions 32*a* configured to cause the communication system 39 to send a first communication 86 in response to the vehicle monitoring system detecting (e.g., on a second day as the first vehicle 48*k* travels along a first lane 98*a* or along a second lane 98*b*) a second serpentine path 51*k* of the first vehicle 48*k* that exceeds the first veering threshold 83.

In some embodiments, the first communication 86 comprising at least one of a picture 87 of the first vehicle 48*k* and identifying data 88 (e.g., a license plate number, a graphical or numerical representation of the first vehicle 48*k*) indicative of the first vehicle 48*k*. The law enforcement entity 85 can use the picture 87 and/or the identifying data 88 to enable the police officer to pull over the correct vehicle.

In some embodiments, the communication system 39 comprises a transmitter 40 configured to send the first communication 86 to a law enforcement entity 85. In some embodiments, the transmitter 40 sends the first communication 86 to an antenna 42*a* of the law enforcement entity 85.

In some embodiments, the first detection system 7*e* comprises at least one of the first radar 8 and the first lidar 9, at least one of the first radar 8 and the first lidar 9 are configured to detect a speed 89 of the first vehicle 48*k* on the second day, and the first program instructions 32 are configured to determine the first veering threshold 83 at least partially based on the first veering history 95 and the speed 89 at which the first vehicle 48*k* was moving.

In some embodiments, the first program instructions 32 are configured to determine the first veering threshold 83 at least partially based on the first veering history 95 and at least one curvature characteristic 90 of the first road 54*a*.

In some embodiments, the first program instructions 32 are configured to cause the first camera 11 to take a picture 87 of the first vehicle 48*k*, the vehicle monitoring system comprises an image analysis system 99 configured to determine first identifying data 101 (e.g., a license plate number) by analyzing the picture 87, and the first program instructions 32 are configured to update the first veering history 95 in response to determining that the first identifying data 101 is indicative of the first vehicle 48*k*.

In some embodiments, the first detection system 7*e* is mounted adjacent to the first road 54*a*.

In some embodiments, the first program instructions 32 are configured to update the first veering history 95 at least partially based on the first program instructions 32 comparing the first serpentine path 51*h* to at least a second serpentine path 51*n* of a second vehicle 48*n* as the second vehicle 48*n* travels along the first road 54*a* and a third serpentine path 51*p* of a third vehicle 48*p* as the third vehicle 48*p* travels along the first road 54*a* such that the first veering history 95 is at least partially based on how the first vehicle 48*k* veers on the first road 54*a* relative to how the second vehicle 48*n* and the third vehicle 48*p* veer on the first road 54*a*. This approach enables the vehicle monitoring system to normalize the veering data according to what veering is typical for the particular road.

In some embodiments, the first veering threshold 83 is based on both veering behavior of the first vehicle 48*k* on a first road 54*a* and veering behavior of other vehicles on the first road 54*a*. As a result, the first veering threshold 83 can take into account typical veering on the first road 54*a*. If the first vehicle 48*k* veers substantially more than other vehicles (e.g., due to the first vehicle 48*k* having "loose" steering or due to having a driver whose normal behavior includes large veering magnitudes), then the first veering threshold 83 for the first vehicle 48*k* can be set higher than would be the case if the first vehicle 48*k* veers substantially less than other vehicles (e.g., due to the first vehicle 48*k* having sports-car "tight" steering or due to having a driver whose normal behavior includes small veering magnitudes).

The first program instructions 32 can be configured to determine a first veering threshold 83 for the first vehicle 48*k* at least partially based on the first veering history 95 and at least partially based on comparing the first serpentine path 51*h* to at least a second serpentine path 51*n* of a second vehicle 48*n* as the second vehicle 48*n* travels along the first road 54*a* and a third serpentine path 51*p* of a third vehicle 48*p* as the third vehicle 48*p* travels along the first road 54*a*. The vehicle monitoring system can comprise a communication system 39 and second program instructions 32*a* configured to cause the communication system 39 to send a first communication 86 in response to the vehicle monitoring system detecting, on a second day, a fourth serpentine path of the first vehicle 48*k* that exceeds the first veering threshold 83.

In some embodiments, a vehicle monitoring system comprises two, three, several, and/or even thousands of detection systems, which can be mounted such that they oversee countless roads.

In some embodiments, first program instructions 32 are configured to determine a first veering threshold 83 for the first vehicle 48*k* at least partially based on the first veering history 95. A vehicle monitoring system can comprise a second detection system 7*f* configured to be located remotely relative to the first vehicle 48*k* and configured to be located remotely relative to the first detection system 7*e*. The second detection system 7*f* can comprise at least one of a second camera, a second radar, and a second lidar. The second detection system 7*f* can be configured to use at least one of the second camera, the second radar, and the second lidar to detect a second serpentine path 51*k* of the first vehicle 48*k* as the first vehicle 48*k* travels along a second road 54*b*.

In some embodiments, a vehicle monitoring system further comprises a communication system 39 and second program instructions 32*a* configured to cause the communication system 39 to send a first communication 86 in response to the second detection system 7*f* detecting that, on the second road 54*b*, the second serpentine path 51*k* of the first vehicle 48*k* exceeds the first veering threshold 83. In some embodiments, the first veering threshold 83 is a first serpentine veering threshold.

In some embodiments, the first communication 86 comprises first identifying data 101 indicative of the first vehicle 48*k*, and the first communication 86 is configured to notify a law enforcement entity 85 regarding at least one of the veering behavior of the first vehicle 48*k* and a potentially impaired state of the first vehicle 48*k* (or more specifically, of the driver of the first vehicle 48*k*).

Some embodiments use a baseline veering profile 104 that is specific to a particular vehicle. For example, a baseline veering profile 104 can indicate that a vehicle with a license plate number of "12323" typically veers 250 percent more than average vehicles (for a given speed, for a given road, for a given road curvature, for particular weather conditions, for particular road conditions, for a particular time of day, etc.). This baseline veering profile 104 for the vehicle can enable the vehicle monitoring system to avoid needlessly prompting law enforcement to pull the vehicle over in response to the vehicle monitoring system detecting that a serpentine path of the vehicle veers 200 percent more than average vehicles (because 200 percent more veering than average vehicles may appear like alarming veering to the human eye, but in reality it is within the normal range for the particular vehicle and driver). The baseline veering profile 104 can be at least partially based on the veering behavior detected for the particular vehicle by many detection systems on many different roads.

In some embodiments, a baseline veering profile 104 can be specific to several vehicles. For example, a baseline veering profile 104 can be assigned to all vehicles driven by one driver.

In some embodiments, a baseline veering profile 104 can be assigned to all vehicles that fall within a particular veering range. For example, multiple vehicles that veer 15 percent to 20 percent more than average vehicles can be assigned to one baseline veering profile 104 such that the baseline veering profile 104 is specific to all the vehicles that have been assigned to that particular baseline veering profile 104 while the baseline veering profile 104 is not specific to all vehicles that have instead been assigned to other baseline veering profiles or have not been assigned to any baseline veering profile.

In some embodiments, a vehicle that has not yet been baselined (e.g., because the vehicle monitoring system has not yet numerically analyzed the vehicle's veering behavior) is assigned to a generic veering profile. Vehicles in this generic veering profile typically cannot be identified as impaired unless the driver is extremely impaired (because typical, unimpaired veering variations between drivers and vehicles are so large that they effectively hide the relatively small veering amount due to being impaired).

In some embodiments, a vehicle monitoring system comprises a computer system 34 having first program instructions 32 configured to numerically analyze first data 93 indicative of the first serpentine path 51*h* from at least one of the first camera 11, the first radar 8, and the first lidar 9 to generate a baseline veering profile 104 specific to the first vehicle 48*k*. The computer system 34 can comprise a memory 31 having the baseline veering profile 104.

In some embodiments, the first program instructions 32 are configured to determine a first veering threshold 83 for the first vehicle 48*k* at least partially based on the baseline veering profile 104. In some embodiments, the first veering threshold 83 is based on the baseline veering profile 104 and also based on factors such as how curved the roads were where the baselining took place, how curved the roads are when the impaired determinization is being made, how icy the road is, how wet the road is, the speed at which the vehicle was traveling when the baselining took place, the speed at which the vehicle is traveling when the impaired determinization is being made, etc.

In some embodiments, a vehicle monitoring system comprises a communication system 39 and second program instructions 32*a* configured to cause the communication system 39 to send a first communication 86 in response to the vehicle monitoring system detecting, on a second day and/or at a future time, a second serpentine path 51*k* of the first vehicle 48*k* that exceeds the first veering threshold 83.

In some embodiments, the first detection system 7*e* comprises the first camera 11 and at least one of the first radar 8 and the first lidar 9, and the first program instructions 32 are configured to numerically analyze the first data 93 indicative of the first serpentine path 51*h* from at least one of the first radar 8 and the first lidar 9 to generate the baseline veering profile 104.

Some embodiments use multiple cameras to take pictures 87. The multiple cameras can be a camera system.

In some embodiments, a vehicle monitoring system comprises an image analysis system 99 and the first detection system 7*e* comprises a camera system having the first camera 11. The camera system can include several cameras (including the first camera 11). The first program instructions 32 can be configured to cause the camera system to take at least one picture 87 of the first vehicle 48*k*. The first program instructions 32 can be configured to cause the image analysis system 99 to analyze the at least one picture 87 to determine first identifying data 101 (regarding the first vehicle 48*k*) and at least one identifying trait 103 (regarding a human driver of the first vehicle 48*k*).

In some embodiments, first program instructions 32 are configured to assign the baseline veering profile 104 to the first vehicle 48*k* in response to determining that the first identifying data 101 is indicative of the first vehicle 48*k* and the first program instructions 32 are configured to assign the baseline veering profile 104 to a first driver of the first vehicle 48*k* in response to determining that the identifying trait 103 is indicative of the first driver. This way, different drivers of the first vehicle 48*k* can have different baseline veering profiles 104.

In some embodiments, second program instructions 32*a* are configured to cause the communication system 39 to send the first communication 86 in response to the vehicle monitoring system detecting, on the second day, the second serpentine path 51*k* of the first vehicle 48*k* and of the driver that exceeds the first veering threshold 83.

In some embodiments, the vehicle monitoring system does not know the names of drivers but can still differentiate between drivers of a single vehicle based on facial features and body size (e.g., identified via pictures 87). Differentiating between drivers of the single vehicle enables the vehicle monitoring system to know that a serpentine path is from a particular driver of a vehicle. This way, the vehicle monitoring system can create unique baselines for each driver and vehicle combination.

In some embodiments, the vehicle monitoring system comprises multiple detection systems. A first detection system 7*e* can identify typical serpentine veering for a first vehicle 48*k* (and/or for a first human driver). A second detection system 7*f* can later be used by the vehicle monitoring system to determine if future serpentine veering by the first vehicle 48*k* (and/or by the first human driver) is abnormal enough for that particular vehicle and/or driver to justify notifying a law enforcement entity 85 and/or prompting the law enforcement entity 85 to pull over the driver. In some embodiments, multiple detection systems detect driving behaviors (e.g., serpentine veering) of a single vehicle and/or single driver on multiple roads to enable the vehicle monitoring system to characterize typical driving behavior such that the vehicle monitoring system can later detect abnormal driving behavior (which the communication system 39 can report).

In some embodiments, the first program instructions 32 are configured to determine a first veering threshold 83 for the first vehicle 48*k* at least partially based on the baseline veering profile 104. The vehicle monitoring system can comprise a second detection system 7*f* configured to be located remotely relative to the first vehicle 48*k* and configured to be located remotely relative to the first detection system 7*e*. The second detection system 7*f* can comprise at least one of a second camera, a second radar, and a second lidar. The second detection system 7*f* can be configured to use at least one of the second camera, the second radar, and the second lidar to detect a second serpentine path 51*k* of the first vehicle 48*k* as the first vehicle 48*k* travels along a second road 54*b* that is located remotely relative to the first road 54*a*.

In some embodiments, the vehicle monitoring system further comprises a communication system 39 and second program instructions 32*a* configured to cause the communication system 39 to send a first communication 86 in response to the second detection system 7*f* detecting, on the second road 54*b*, the second serpentine path 51*k* of the first vehicle 48*k* that exceeds the first veering threshold 83. The communication system 39 can comprise a transmitter configured to send the first communication 86 to a law enforcement entity 85. The first communication 86 can be a wireless communication. The communication system 39 can send the first communication 86 via intermediary communication systems 15.

In some embodiments, the first detection system 7*e* is mounted adjacent to the first road 54*a* and the second detection system 7*f* is mounted adjacent to the second road 54*b*. Detection systems can be mounted adjacent to roads by being mounted on towers, poles, and overpasses located by the roads. Detection systems can be mounted adjacent to roads without being mounted immediately next to the roads. For example, detection systems can be mounted adjacent to roads such that the detection systems can detect vehicles moving the roads.

In some embodiments, first program instructions 32 are configured to determine the first veering threshold 83 at least partially based on the baseline veering profile 104 and at least one curvature characteristic 90*b* of the second road 54*b*.

In some embodiments, the first detection system 7*e*, the second detection system 7*f*, and the communication system 39 are communicatively coupled with the computer system 34. The first detection system 7*e* and the second detection system 7*f* can be located remotely relative to each other such that they are configured to detect the first vehicle 48*k* on roads that are located remotely relative to each other (e.g., a first road 54*a* and a second road 54*b*). In some embodiments, the first road 54*a* and the second road 54*b* are located at least 100 feet apart, at least 300 feet apart, at least one mile apart, and/or at least 100 miles apart.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle can be any suitable vehicle. For example, the self-driving vehicle can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real-world driving data. In some embodiments, self-driving vehicles sometimes drive themselves, sometimes are driven remotely by a computer system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive itself (e.g., steer and control speed) (e.g., in response to a destination requested by the human).

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, the remote computing device is an iPhone made by Apple Inc. or an Android phone based on software made by Alphabet Inc. The remote computing device can comprise a speaker configured to emit sounds, a microphone configured to record sounds, and a display screen configured to display images. The remote computing device can comprise a battery configured to provide electrical power to operate the remote computing device.

The phrase "communicatively coupling" can include any type of direct and/or indirect coupling between various items including, but not limited to, a self-driving vehicle, a remote computing device, and a vehicle management system. For example, a remote computing device can be communicatively coupled to a vehicle management system via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, includes both native apps and mobile cloud apps (and Web apps). Native apps can be installed directly on remote computing devices, whereby developers can create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A vehicle monitoring system comprising:
a first detection system configured to be located remotely relative to a first vehicle and having at least one of a first camera, a first radar, and a first lidar, wherein the first detection system is configured to use at least one of the first camera, the first radar, and the first lidar to detect a first serpentine path of the first vehicle as the first vehicle travels along a first road on a first day; and
a computer system having first program instructions configured to numerically analyze first data indicative of the first serpentine path from at least one of the first camera, the first radar, and the first lidar to generate a first veering history associated with the first vehicle,
wherein the first detection system comprises at least one of the first radar and the first lidar configured to detect a speed of the first vehicle on a second day, and the first program instructions are configured to determine a first veering threshold for the first vehicle at least partially based on the first veering history and the speed.

2. The vehicle monitoring system of claim 1, wherein the vehicle monitoring system comprises a communication system and second program instructions configured to cause the communication system to send a first communication in response to the vehicle monitoring system detecting, on the second day, a second serpentine path of the first vehicle that exceeds the first veering threshold.

3. The vehicle monitoring system of claim 2, wherein the first communication comprises at least one of a picture of the first vehicle and first identifying data indicative of the first vehicle, and the communication system comprises a transmitter configured to send the first communication.

4. The vehicle monitoring system of claim 1, wherein the first program instructions are configured to determine the first veering threshold at least partially based on the first veering history and at least one road curvature characteristic.

5. The vehicle monitoring system of claim 1, wherein the first detection system comprises the first camera, the first program instructions are configured to cause the first camera to take a picture of the first vehicle, the vehicle monitoring system comprises an image analysis system configured to determine first identifying data by analyzing the picture, and the first program instructions are configured to update the first veering history in response to determining that the first identifying data is indicative of the first vehicle.

6. The vehicle monitoring system of claim 1, wherein the first detection system is mounted adjacent to the first road.

7. The vehicle monitoring system of claim 1, further comprising a second detection system configured to be located remotely relative to the first vehicle and relative to the first detection system, wherein the second detection system comprises at least one of a second camera, a second radar, and a second lidar, and the second detection system is configured to use at least one of the second camera, the second radar, and the second lidar to detect a second serpentine path of the first vehicle as the first vehicle travels along a second road,
the vehicle monitoring system further comprising a communication system and second program instructions configured to cause the communication system to send a first communication in response to the second detection system detecting that, on the second road, the second serpentine path of the first vehicle exceeds the first veering threshold.

8. The vehicle monitoring system of claim 7, wherein the first communication comprises first identifying data indicative of the first vehicle, and the first communication is configured to notify a law enforcement entity.

9. The vehicle monitoring system of claim 1, wherein the first program instructions are configured to numerically analyze the first data indicative of the first serpentine path from at least one of the first camera, the first radar, and the first lidar to generate a baseline veering profile specific to the first vehicle, wherein the computer system comprises a memory having the baseline veering profile.

10. The vehicle monitoring system of claim 9, wherein the first program instructions are configured to determine the first veering threshold for the first vehicle at least partially based on the baseline veering profile,
wherein the vehicle monitoring system comprises a communication system and second program instructions configured to cause the communication system to send a first communication in response to the vehicle monitoring system detecting, on the second day, a second serpentine path of the first vehicle that exceeds the first veering threshold.

11. The vehicle monitoring system of claim 10, wherein the first detection system comprises the first camera and at least one of the first radar and the first lidar, and the first program instructions are configured to numerically analyze the first data indicative of the first serpentine path from at least one of the first radar and the first lidar to generate the baseline veering profile.

12. The vehicle monitoring system of claim 9, wherein the first program instructions are configured to determine the first veering threshold for the first vehicle at least partially based on the baseline veering profile,
the vehicle monitoring system further comprising a second detection system configured to be located remotely relative to the first vehicle and relative to the first detection system, wherein the second detection system comprises at least one of a second camera, a second radar, and a second lidar, and the second detection system is configured to use at least one of the second camera, the second radar, and the second lidar to detect a second serpentine path of the first vehicle as the first vehicle travels along a second road,
the vehicle monitoring system further comprising a communication system and second program instructions configured to cause the communication system to send a first communication in response to the second detection system detecting that the second serpentine path of the first vehicle on the second road that exceeds the first veering threshold.

13. The vehicle monitoring system of claim 12, wherein the communication system comprises a transmitter configured to send the first communication.

14. The vehicle monitoring system of claim 12, wherein the first detection system is mounted adjacent to the first road and the second detection system is mounted adjacent to the second road.

15. The vehicle monitoring system of claim 1, wherein the first detection system comprises the first camera and at least one of the first radar and the first lidar, and the first detection system is configured to use the first camera and at least one of the first radar and the first lidar to detect the first serpentine path of the first vehicle as the first vehicle travels along the first road on the first day.

16. The vehicle monitoring system of claim 1, wherein the first program instructions are configured to determine the first veering threshold at least partially based on the first veering history associated with the first vehicle and the speed such that the first veering threshold is customized for the first vehicle.

17. A vehicle monitoring system comprising:
a first detection system configured to be located remotely relative to a first vehicle and having at least one of a first camera, a first radar, and a first lidar, wherein the first detection system is configured to use at least one of the first camera, the first radar, and the first lidar to detect a first serpentine path of the first vehicle as the first vehicle travels along a first road; and
a computer system having first program instructions configured to numerically analyze first data indicative of the first serpentine path from at least one of the first camera, the first radar, and the first lidar to generate a first veering history associated with the first vehicle,
wherein the first program instructions are configured to update the first veering history at least partially based on the first program instructions comparing the first serpentine path to at least a second serpentine path of a second vehicle along the first road and a third serpentine path of a third vehicle along the first road such that the first veering history is at least partially based on how the first vehicle veers on the first road relative to how the second vehicle and the third vehicle veer on the first road.

18. The vehicle monitoring system of claim 17, further comprising:
a second detection system having at least one of a second camera, a second radar, and a second lidar, wherein the second detection system is located and configured to use at least one of the second camera, the second radar, and the second lidar to detect a second serpentine path of the first vehicle as the first vehicle travels along a second road;
a communication system;
second program instructions configured to determine a first veering threshold for the first vehicle at least partially based on the first veering history; and
third program instructions configured to cause the communication system to send a first communication in response to the second detection system detecting that the second serpentine path of the first vehicle on the second road exceeds the first veering threshold.

19. The vehicle monitoring system of claim 17, wherein the first program instructions are configured to determine a first veering threshold for the first vehicle at least partially based on the first veering history,
wherein the vehicle monitoring system comprises a communication system and second program instructions configured to cause the communication system to send a first communication in response to the vehicle monitoring system detecting that the first serpentine path of the first vehicle that exceeds the first veering threshold.

20. The vehicle monitoring system of claim 19, wherein the communication system comprises a transmitter configured to send the first communication to a law enforcement entity.

21. The vehicle monitoring system of claim 19, wherein the first program instructions are configured to numerically analyze the first data to generate a baseline veering profile specific to the first vehicle such that the first veering threshold is customized for the first vehicle.

22. The vehicle monitoring system of claim 19, wherein the first program instructions are configured to numerically analyze the first data to generate a baseline veering profile specific to the first vehicle and generate the first veering history at least partially based on comparing the first serpentine path to the second serpentine path of the second vehicle and the third serpentine path of the third vehicle such that the first veering threshold is customized for the first vehicle.

23. The vehicle monitoring system of claim 17, wherein first detection system is configured to detect the first serpentine path along on the first road on a first day,
the first program instructions are configured to determine a first veering threshold for the first vehicle at least partially based on the first veering history, and
the vehicle monitoring system comprises a communication system and second program instructions configured to cause the communication system to send a first communication in response to the vehicle monitoring system detecting, on a second day, a fourth serpentine path of the first vehicle that exceeds the first veering threshold.

24. A vehicle monitoring system comprising:
a first detection system configured to be located remotely relative to a first vehicle and having at least one of a first camera, a first radar, and a first lidar, wherein the first detection system is configured to use at least one of the first camera, the first radar, and the first lidar to detect a first serpentine path of the first vehicle as the first vehicle travels along a first road on a first day; and a computer system having first program instructions configured to numerically analyze first data indicative of the first serpentine path from at least one of the first camera, the first radar, and the first lidar to generate a first veering history associated with the first vehicle, wherein the first program instructions are configured to determine a first veering threshold for the first vehicle at least partially based on the first veering history and at least partially based on comparing the first serpentine path to at least a second serpentine path of a second vehicle along the first road and a third serpentine path of a third vehicle along the first road, wherein the vehicle monitoring system comprises a communication system and second program instructions configured to cause the communication system to send a first communication in response to the vehicle monitoring system detecting, on a second day, a fourth serpentine path of the first vehicle that exceeds the first veering threshold.

25. A vehicle monitoring system comprising:

a first detection system configured to be located remotely relative to a first vehicle and having at least one of a first camera, a first radar, and a first lidar, wherein the first detection system is configured to use at least one of the first camera, the first radar, and the first lidar to detect a first serpentine path of the first vehicle as the first vehicle travels along a first road on a first day; and a computer system having first program instructions configured to numerically analyze first data indicative of the first serpentine path from at least one of the first camera, the first radar, and the first lidar to generate a baseline veering profile specific to the first vehicle, wherein the vehicle monitoring system comprises an image analysis system, the first detection system comprises a camera system having the first camera, and the first program instructions are configured to cause the camera system to take at least one picture of the first vehicle and are configured to cause the image analysis system to analyze the at least one picture to determine first identifying data and at least one identifying trait, wherein the first program instructions are configured to assign the baseline veering profile to the first vehicle in response to determining that the first identifying data is indicative of the first vehicle and the first program instructions are configured to assign the baseline veering profile to a driver of the first vehicle in response to determining that the at least one identifying trait is indicative of the driver.

* * * * *